(12) United States Patent
Maehara et al.

(10) Patent No.: US 8,869,950 B2
(45) Date of Patent: Oct. 28, 2014

(54) FLOATING DISC BRAKE, METHOD OF ASSEMBLING SAME, AND ASSEMBLIES CONSISTING OF PAD CLIPS AND RETURN SPRINGS

(75) Inventors: Toshifumi Maehara, Tokyo (JP); Daisuke Kobayashi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 110 days.

(21) Appl. No.: 13/638,711

(22) PCT Filed: Apr. 8, 2011

(86) PCT No.: PCT/JP2011/058949
§ 371 (c)(1),
(2), (4) Date: Oct. 1, 2012

(87) PCT Pub. No.: WO2011/126125
PCT Pub. Date: Oct. 13, 2011

(65) Prior Publication Data
US 2013/0025981 A1    Jan. 31, 2013

(30) Foreign Application Priority Data

| | | |
|---|---|---|
| Apr. 9, 2010 | (JP) | 2010-090770 |
| Oct. 6, 2010 | (JP) | 2010-226785 |
| Mar. 14, 2011 | (JP) | 2011-055045 |

(51) Int. Cl.
*F16D 55/22* (2006.01)
*F16D 55/227* (2006.01)
*F16D 65/097* (2006.01)
*F16D 55/00* (2006.01)

(52) U.S. Cl.
CPC .......... *F16D 65/0977* (2013.01); *F16D 55/227* (2013.01); *F16D 65/0976* (2013.01); *F16D 65/0978* (2013.01); *F16D 2055/0008* (2013.01); *F16D 65/0975* (2013.01); *F16D 65/0972* (2013.01)
USPC ...................................................... 188/73.38

(58) Field of Classification Search
USPC ........................................... 188/73.36–73.38
See application file for complete search history.

(56) References Cited

U.S. PATENT DOCUMENTS

| | | | | |
|---|---|---|---|---|
| 5,687,817 A | * | 11/1997 | Kobayashi et al. | 188/72.3 |
| 6,920,965 B2 | * | 7/2005 | Burgdorf et al. | 188/73.38 |
| 8,397,880 B2 | * | 3/2013 | Chelaidite | 188/73.38 |

FOREIGN PATENT DOCUMENTS

| | | |
|---|---|---|
| JP | 56-104636 | 8/1981 |
| JP | 56-127830 | 10/1981 |
| JP | 61-73929 | 5/1986 |
| JP | 61-21619 | 6/1986 |
| JP | 2-92130 | 7/1990 |
| JP | 5-14679 | 2/1993 |
| JP | 5-36141 | 5/1993 |

* cited by examiner

*Primary Examiner* — Christopher Schwartz
(74) *Attorney, Agent, or Firm* — Drinker Biddle & Reath LLP

(57) ABSTRACT

Disclosed is a structure such that when pad clips are to be mounted, it is possible to handle return springs and the pad clips as integral articles, thereby facilitating mounting work. Constraining sections are provided at both axial ends of each of the pad clips. Furthermore, the return springs are composed of inner spring elements and outer spring elements. These two types of spring elements are helical torsion springs provided with helical sections. Abutting sections are provided on the spring elements, respectively. The abutting sections are pressed against the inner surfaces of the constraining sections by elastic restoring forces. Moreover, the central axes of the coil sections are substantially oriented in the rotational direction of the rotor.

19 Claims, 56 Drawing Sheets

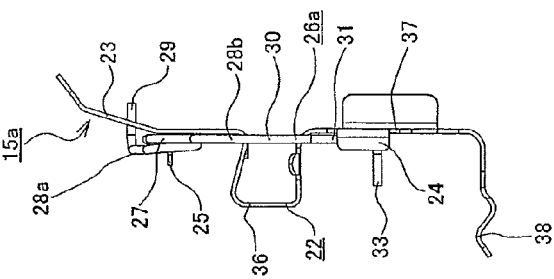
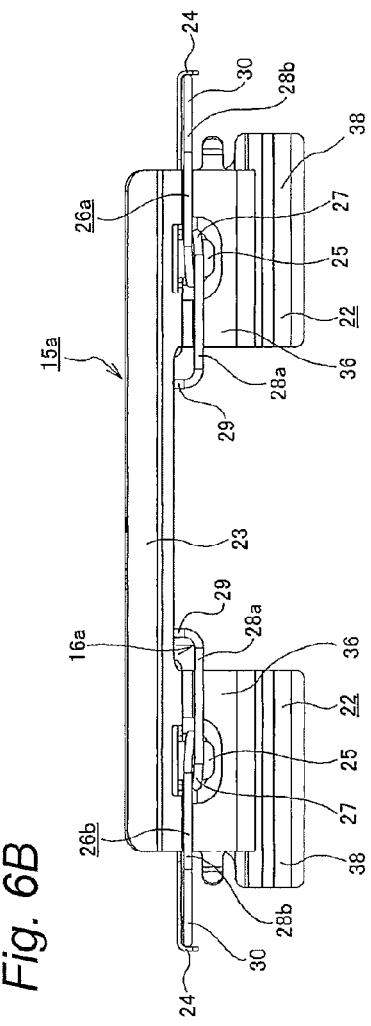
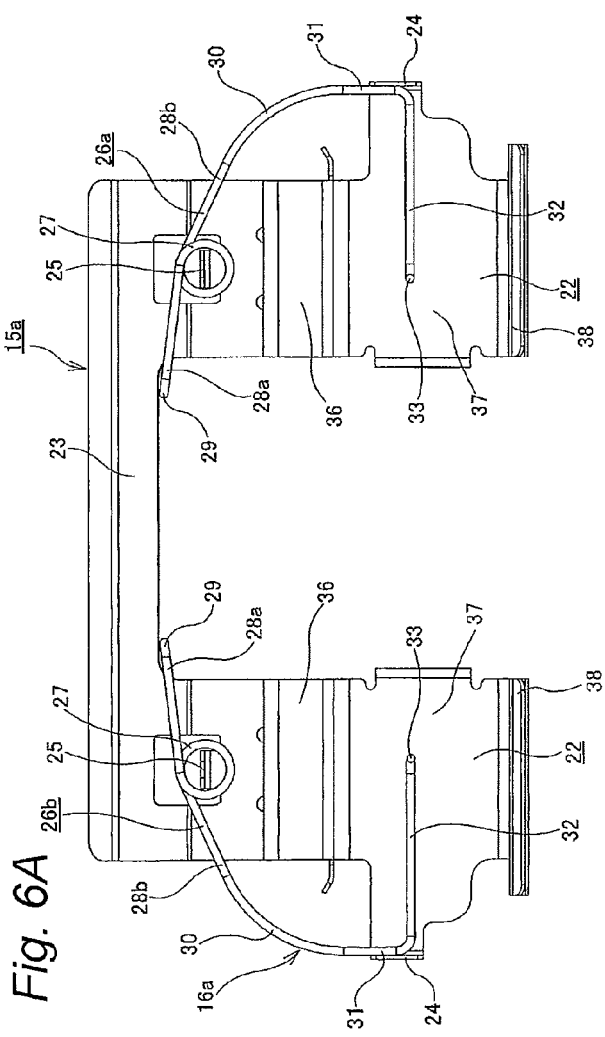

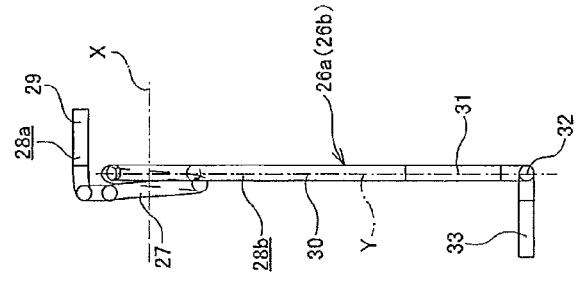
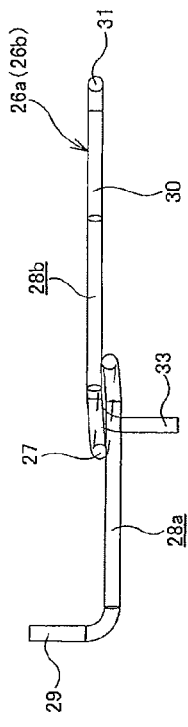
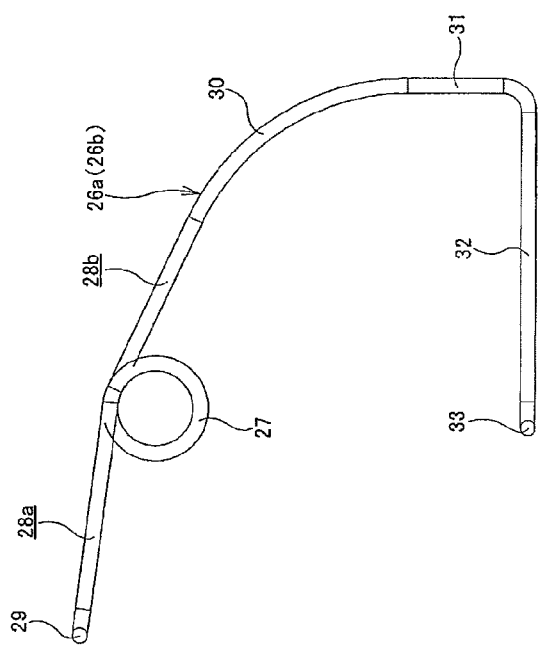

FLOATING DISC BRAKE, METHOD OF ASSEMBLING SAME, AND ASSEMBLIES CONSISTING OF PAD CLIPS AND RETURN SPRINGS

TECHNICAL FIELD

The invention relates to a floating disc brake, a method of assembling the same and an assembly of a pad clip and a return spring capable of smoothly returning a pad upon braking release to thus prevent friction between a lining of the pad and a side surface of a rotor upon non-braking, efficiently reducing a drag of the rotor upon non-braking and wear of the lining, improving assembling performance and reducing assembling cost.

BACKGROUND ART

Regarding a disc brake for braking a vehicle such as automobile, a floating disc brake has been widely known and has been actually used which supports a caliper so that it can displace in an axial direction (in the specification and the claims, an 'axial direction', a 'diametrical direction' and a 'circumferential direction' means an 'axial direction', a 'diametrical direction' and a 'circumferential direction' of a rotor, respectively) with respect to a support.

FIG. 57 shows a floating disc brake, which is a first example of the prior art disclosed in PTL1. The floating disc brake displaces a caliper 2 with respect to a rotor 1 rotating together with a wheel (not shown), upon braking. At a state where the brake is mounted to a vehicle, a support 3 that is provided in the vicinity of one side of the rotor 1 in an axial direction is fixed to a vehicle body (not shown). Also, the caliper 2 is supported to the support 3 so as to be axially displaceable.

Therefore, a pair of guide pins 4 that is provided at both end portions of the caliper 2 in a circumferential direction and a pair of guide holes 5 that is provided at both end portions of the support 3 in a circumferential direction are provided in parallel with a central axis of the rotor 1, respectively. The guide pins 4 are axially slidably inserted into the guide holes 5. Boots 6, 6, for dust-proof are provided between outer peripheries of base end portions of the guide pins 4 and openings of the guide holes 5.

Also, at both end portions of the support 3, rotation input side and rotation output side engaging sections 7, 8 are respectively provided at parts spaced from the rotor 1 in the circumferential direction. Both circumferential end portions of pressure plates 10a, 10b configuring pads 9a, 9b are engaged with the engaging sections 7, 8. Also, the caliper 2 having a cylinder section 11 and a claw section 12 is arranged so that it extends over the both the pads 9a, 9b. Also, the cylinder section 11 is fluid-tightly fitted with a piston 13 that presses the inner (upper side in FIG. 57 at a widthwise inner side of the vehicle) pad 9a to the rotor 1.

When braking the vehicle, a pressure oil is supplied into the cylinder section 11, so that a lining 14a of the inner pad 9a is pressed to an inner surface of the rotor 1 from the upper to the lower in FIG. 57 by the piston 13. Thus, as a reaction to the pressing force, the caliper 2 is displaced upward in FIG. 57, based on the sliding between the guide pins 4 and the guide holes 5, and the claw section 12 presses a lining 14b of the outer (lower side in FIG. 57 at a widthwise outer side of the vehicle) pad 9b to an outer surface of the rotor 1. As a result, the rotor 1 is strongly held from both inner and outer side surfaces, so that the braking is made.

Upon the non-braking of the disc brake configured and operating as described above, when the linings 14a, 14b of the respective pads 9a, 9b and the inner and outer side surfaces of the rotor 1 rub each other, drag torque (rotation resistance) of the rotor 1 is increased, so that the gas mileage performance is lowered and the linings 14a, 14b are unnecessarily worn. The unnecessary wear of the linings 14a, 14b lowers a mileage until the respective pads 9a, 9b are replaced, so that the driving cost is increased.

In order to solve the above problem, for example, PTLs 2 to 4 disclose a structure where a return spring is provided between the inner and outer pads and friction surfaces of the linings of the pads are separated from both side surfaces of the rotor as the braking is released. FIG. 58 shows a second example of the prior art disclosed in PTL2.

In the second example, between the support 3 and the pads 9a, 9b, a pad clip 15 for preventing the pads 9a, 9b from rattling is provided and a return spring 16 for applying an elastic urging force (returning force) to the pads 9a, 9b in a direction getting away from each other is provided. The return spring 16 has a substantial M shape that is a whole shape, and has a coil section 17 at a central portion thereof in an axial direction. Both end portions of the return spring 16 are engaged into engaging holes 18, 18 that are formed on outer peripheral edges of circumferential end portions of the pressure plates 10a, 10b, and the coil section 17 is engaged to a protruding pin 19 extending from an upper end edge of the pad clip 15. By the configuration as described above, the elastic urging force is applied to the pads 9a, 9b in the direction getting away from each other. Hence, upon the braking release, friction surfaces of the linings 14a, 14b of the pads 9a, 9b are separated from both side surfaces of the rotor 1.

In the second example of the prior art, upon the non-braking, it is possible to prevent the friction between the linings 14a, 14b of the pads 9a, 9b and the side surfaces of the rotor. However, the assembling operation is troublesome and the assembling cost is thus increased. That is, in the second example, it is not possible to support the return spring 16 to the pad clip 15 with sufficient support force. Hence, when mounting the pad clip 15, it is not possible to handle the pad clip 15 and the return spring 16 as an integral article, so that it is necessary to separately perform the mounting operations. Also, just after mounting the return spring 16, the elastic urging force is applied to the pads 9a, 9b in the direction getting away from each other. Hence, it is necessary to configure the pads 9a, 9b so that they are not separated and deviated from the support 3 in the axial direction. Also, even when separating the caliper upon the replace of the pads 9a, 9b, since the elastic urging force of the return spring 16 is being applied to the respective pads 9a, 9b, it is necessary to configure the respective pads 9a, 9b so that they are not separated. Such assembling operation or replacing operation is troublesome, so that the assembling cost is increased.

Also, in the second example, both end portions of the return spring 16 are engaged to the outer peripheral edges of the respective pads 9a, 9b. Hence, at a state where the braking is released, the pads 9a, 9b are more apt to be inclined in a direction coming close to the rotor at the inner diameter sides (inner peripheral edges). Therefore, the side surfaces of the rotor and the inner peripheral edges of the linings 14a, 14b of the pads 9a, 9b easily rub each other.

Also, the magnitudes of the elastic urging force applied to the pads 9a, 9b by the return spring 16 are the same. Therefore, an amount of wear of the lining 14b of the outer pad 9b of the pads 9a, 9b may be larger than that of the lining 14a of the inner pad 9a. That is, upon the braking release, the supply of the pressure oil into the cylinder section is stopped, so that the force of pressing the inner pad 9a toward the rotor is lost. Therefore, the inner pad 9a can be relatively easily displaced in a direction getting away from the inner side surface of the rotor. Compared to this, while the outer pad 9b is displaced in a direction getting away from the outer side surface of the rotor, the friction (for example, sliding friction to be applied between the guide pin and the guide hole) that is applied to the sliding section of the caliper acts as resistance. Accordingly, the outer pad 9b is difficult to be displaced in a direction getting away from the outer side surface of the rotor. As a result, as described above, an amount of wear of the lining 14b of the outer pad 9b may be larger than that of the lining 14a of the inner pad 9a. Also, a thickness of the rotor may be varied due to the wear, which causes judder.

PTLs 2 to 4 do not describe or suggest a configuration for solving the above problems.

Also, as shown in FIG. 59, PTL5 discloses a structure where a return spring 56, which is formed by bending a wire rod and has a pair of coil sections 55, 55 at a central portion thereof, is engaged to an anti-rattle spring 57. In the structure disclosed in PTL5, each of the coil sections 55, 55 is provided so that a direction of a central axis and a diametrical direction are substantially matched. Therefore, as the coil sections 55, 55 are put on, a size of the support 3 in a circumferential direction is increased, so that it is difficult to secure a gap between the support 3 and an inner periphery of a wheel (not shown), regarding a layout. Also, outer end portions of the pads 9a, 9b in the diametrical direction are pressed by pressing sections (engaging sections) 58, 58 provided to the return spring 56. Thereby, as the braking is released, the diametrically outer sides are widened each other, i.e., the pads 9a, 9b are easily fallen. Even when it is intended to press the diametrically central portions of the respective pads 9a, 9b, a length (whole length) from each of the coil sections 55, 55 to each of the pressing sections 58, 58 is lengthened and the coil sections 55, 55 and the pressing sections 58, 58 are largely deviated in the diametrical direction (a diametrical length is increased). Hence, it is not possible to effectively use the elastic deformation of the coil sections 55, 55 as the returning force of separating the pads 9a, 9b from the rotor. Also, in the structure disclosed in PTL5, after the anti-rattle spring 57 is mounted to the support 3 and the respective pads 9a, 9b are then mounted thereto, the return spring 56 is simply mounted. That is, PTL5 does not consider at all that the return spring 56 is mounted to the anti-rattle spring 57 before the respective pads 9a, 9b are mounted and that the anti-rattle spring 57 and the return spring 56 are handled as an integral article (assembly).

CITATION LIST

Patent Literatures

[PTL1] JP-Y-61-21619
[PTL2] JP-U-5-36141
[PTL3] JP-U-5-14679
[PTL4] JP-U-2-92130
[PTL5] JP-A-56-127830

SUMMARY OF INVENTION

Technical Problem

The invention has been made to solve the above problems. The invention implements a structure where when mounting a pad clip, it is possible to handle the pad clip and a return spring as an integral article (subassembly), thereby facilitating a mounting operation. Also, the invention implements a structure where it is possible to effectively use elastic deformation of a coil section configuring the return spring as a returning force of separating a pad from a rotor. Also, the invention implements a structure where the returning force, which is applied to an inner pad and an outer pad upon braking release, is made to be different, as required.

Solution to Problem

The invention provides a floating disc brake, a method of assembling the same and an assembly of a pad clip and a return spring. Like the floating disc brake that has been well known and has been described above, the floating disc brake of the invention has a support, a pair of pads, a caliper, pad clips and return springs.

The support is fixed to a vehicle body in the vicinity of a rotor rotating together with wheels.

Also, each of the pads has a lining provided on a surface (surface of both axial side surfaces facing an axial side surface of the rotor) of a pressure plate (it doesn't care whether the pressure plate and the lining are separate members or integrally formed). Both the pads are arranged at both axial sides of the rotor and are moveably guided in an axial direction of the rotor by the support.

Also, the caliper is axially displaceable in the axial direction of the rotor with being supported to the support.

Also, the pad clips are provided between the respective pads and the support and prevent the respective pads from moving with respect to the support.

Also, the return springs press the pad toward a direction getting away from the rotor.

Particularly, in the floating disc brake of the invention, at a state before both the pads are mounted, a part of the pad clip is provided with a constraining section receiving an elastic urging force of the return spring to thus support the return spring so as to enable the return spring to be mounted to the pad clip.

Also, the pad clip is arranged between the support and the pressure plate configuring the pad and has a leg section having the constraining section provided at a part thereof.

Also, the return spring is formed by bending a wire rod and has an abutting section that is abutted to the constraining section by an elastic restoring force thereof, an extension arm section extending toward the rotor-side, a returning section provided at a rotor-side end portion of the extension arm section, an engaging section that is engaged to a part of the pad clip and receives a reactive force to the pressing of the returning section to the pad and a coil section that is provided between the returning section and the engaging section and has a central axis substantially oriented in a rotational direction of the rotor.

The returning section contacts a surface of a part of a circumferential end portion of the pressure plate, the part protruding in a circumferential direction more than a circumferential end edge of the lining, and the surface facing a side surface of the rotor.

In the meantime, a trajectory of the returning section is preferably parallel with the central axis of the rotor as much as possible until the pads (linings) are almost worn from a state of new products. To this end, for example, when mounting the pads, the extension arm section can be arranged to be substantially parallel with the central axis of the rotor. In the meantime, the configuration of "substantially parallel" means a state close to parallel so that the elastic urging force of the return spring can be efficiently transferred to the pressure plate of the pad. An angle of the extension arm section changes as the lining of the pad is worn. Thus, the configuration of "substantially parallel" is not limited to the completely parallel configuration. For example, at a state close to parallel, i.e., at a state of the pad mounting, irrespective of a thickness (a degree of the wear) of the lining, the configuration of "substantially parallel" means a state where an inclined angle of the extension arm section with respect to the central axis is within ±15°, preferably within ±10°, more preferably within ±50.

Also, the state where the central axis of the coil section is substantially oriented in the rotational direction of the rotor means a state where the rotational direction (tangential direction) at the circumferentially central portion of the pad and the central axis are matched. However, the state is not limited to a case where the rotational direction and the direction of the central axis are completely matched and includes a case where the directions are slightly deviated (for example, within ±20°, preferably within ±10°).

According to the floating disc brake configured as described above, when mounting the pad clips, it is possible to handle the pad clips and the return springs as integral articles (assemblies, subassemblies), thereby facilitating the mounting operation.

That is, according to the invention, the pad clips are provided at parts thereof with the constraining sections, so that it is possible to receive the elastic urging force of the return springs and to thus support the return springs to the pad clips with the sufficient supporting force corresponding to the elastic urging force. Therefore, it is possible to handle the pad clips and the return springs as integral articles, so that it is possible to perform the operations of mounting the pad clips and the return springs at the same time, thereby facilitating the mounting operation. As a result, it is possible to improve the assembling performance, thereby reducing the assembling cost.

Also, it is possible to easily handle the assemblies of the pad clips and the return springs, and the burden on the management in the assembling factory of the disc brake is reduced by a half, compared to a case where the pad clips and the return springs are handled as separate articles. Also, it is possible to reduce the number of preparing processes, to prevent the mounting mismatch and to reduce the number of mounting processes. Also, it is possible to easily sale a part for replacement and the like in markets.

Also, according to the invention, since the return spring is provided with the coil section, it is possible to lower a constant of spring, compared to a configuration where the return spring is configured by a wire spring having no coil section. Therefore, even when amounts of wear of the linings of the pads are varied and amounts of axial movement of the pads are thus varied upon the braking, it is possible to lower the change in the elastic urging force to be applied to the pads. Also, since the central axis of the coil section is arranged in the rotational direction of the rotor, the coil section can be provided in a gap between an end portion of the pressure plate of the pad and the support. Also, it is possible to efficiently transfer the elastic urging force of the coil section to the returning section and engaging section of the return spring. Therefore, it is possible to further lower the elastic coefficient of the return spring, so that it is possible to further suppress the change in the elastic urging force with which the returning section presses the pad, which change is caused as the lining of the pad undergoes the wear.

When implementing the floating disc brake as described above, preferably, at least a part of the returning section is positioned on a virtual plane passing through the coil section of virtual planes orthogonal to the central axis of the coil section. In other words, the circumferential positions of the coil section and the part of the returning section are matched (the positions are made to overlap each other in the circumferential direction).

According to this configuration, the circumferential positions of the coil section and the part of the returning section are matched, so that the coil section is elastically deformed in a torsion direction (rolling-in direction). Therefore, it is possible to effectively use the elastic deformation (elastic urging force) of the coil section as a restoring force separating the pad from the rotor.

Also, when implementing the floating disc brake of the invention, preferably, the coil section and the returning section overlap each other in the axial direction of the rotor. More preferably, the central axis of the coil section and the returning section are made to overlap each other in the axial direction of the rotor. In this case, at a state where a new pad is mounted, the coil section and the returning section preferably overlap each other in the axial direction of the rotor.

According to this configuration, an operating direction of the returning force by the returning section is substantially matched with the axial direction that is a moving direction of the rotor. Therefore, it is possible to effectively separate the pad from the rotor.

Also, when implementing the floating disc brake of the invention, preferably, a diametrical position of the returning section substantially matches with a friction center of the pad. In this case, the configuration "substantially match" is not limited to a completely matched state, although the completely matched state is most preferable. That is, a state where the position is deviated from the completely matched state in the diametrical direction within ±10% (more preferably, ±5%) of a width size of a friction surface (surface of the lining, which is frictionally engaged with the side surface of the rotor upon the braking) of the pad in the diametrical direction is also the substantially matched state. Actually, a diametrical position of the returning section is constrained so that it is within a range of a protruding part (engaging protruding piece) that is provided at a circumferential end portion of the pressure plate and circumferentially protrudes more than a circumferential end edge of the lining (more specifically, the diametrical position of the returning section is constrained to a diametrically inner position of the most circumferentially protruding part of the engaging protruding piece). When the diametrical position is constrained as described above, the diametrical position of the returning section is substantially matched with the friction center of the pad.

According to the above configuration, at a state where the braking is released, it is possible to effectively prevent the pad from being inclined to the rotor and any one peripheral edge of inner and outer peripheral edges of the pad from rubbing with the side surface of the rotor.

Also, when implementing the invention, preferably, a position at which the returning section and the pressure plate contact and a position of the engaging section substantially match in a circumferential direction of the rotor. Meanwhile, in this case, the configuration "substantially match" means that both the positions are matched in the circumferential direction so that the moment of a direction rotating about the diametrical axis of the rotor is not caused in the return spring by a couple of force of a force that is applied to the return spring from a contact part between the returning section and the pressure plate and a force that is applied to the return spring from an engaged part of the engaging section and the pad clip or the moment is negligibly small even though it is caused. For example, the returning section and the pressure plate contact within a somewhat length range in the circumferential direction. Therefore, when the position of the engaging section is within the length range, the moment is not caused. This state is a state where the contact position and the position of the engaging section are matched.

According to the above configuration, the elastic urging force in a direction getting away from the rotor is applied to the pad by the return spring, so that the moment of a direction rotating about the diametrical axis is not caused in the return spring or the moment is negligibly small even though the moment occurs. Therefore, even when the return spring is configured by the inner spring element and the outer spring element, which are separate elements, it is possible to prevent both the spring elements from inadvertently separating from the pad clip.

Also, when implementing the invention, preferably, a direction along which the returning section presses the pressure plate and a direction along which the engaging section presses the pad clip are the substantially axial direction of the rotor and are the opposite directions each other. Meanwhile, in this case, the substantially axial direction includes a case where the direction of the force with which the respective sections press the other sections completely matches with the axial direction of the rotor and also a case where a difference between the pressing direction and the axial direction is small (45° or smaller, preferably 30° or smaller) and an axial component force of component forces of the force with which the respective sections press the other sections is large (70% or larger, preferably 85% or larger).

According to the above configuration, it is possible to effectively transfer the elastic urging force of the return spring to the pad, as the force separating the pads from the rotor (separating both the pads). Therefore, even though a return spring (for example, a thick wire rod) having particularly high elastic urging force is not used, it is possible to securely separate the pads. Since it is not necessary to particularly increase the elastic urging force of the return spring, it is possible to suppress the processing cost of the return spring and to facilitate the mounting operation of the return spring. This invention is also effective in a case where it is combined with the structure where the return spring is configured by the inner spring element and the outer spring element, which are separate elements.

Also, when implementing the invention, preferably, the leg section of the pad clip is provided at a diametrically central portion thereof with a positioning step section having a substantially U-shaped section and protruding toward the pad in a circumferential direction, and the positioning step section is elastically fitted onto an outer side of a protrusion section formed on a part of the support. The positioning step section holds the protrusion section, thereby positioning the pad clip in a diametrical direction. Also, the engaging section of the return spring is engaged into an engaging hole that is formed at a part of a leading end portion of the positioning step section, the part protruding more than a leading end surface of the protrusion section. That is, instead of a configuration where both inner surfaces (both diametrically side surfaces) of the positioning step section and both outer surfaces (both diametrically side surfaces) of the protrusion section are contacted over the substantial entire width in the axial direction of the rotor, the leading end portion of the positioning step section is made to protrude in the circumferential direction of the rotor slightly more than the leading end portion of the protrusion section, so that a gap is formed between the inner surface of the leading end portion of the positioning step section and the leading end surface of the protrusion section. The engaging section is inserted into the gap through the engaging hole.

According to the above configuration, it is possible to bring the positioning step section of the pad clip-side into contact with the protrusion section of the support-side over the substantial entire width. Therefore, it is possible to increase the support rigidity of the pad clip to the support. Also, it is possible to bring the provision position of the engaging section of the return spring close to the circumferentially central portion of the support, thereby easily implementing the structure of the invention.

Also, when implementing the invention, preferably, a concave recess in which the returning section can be housed is formed on the surface of the circumferential end portion of the pressure plate to which surface the returning section is contacted. Then, the returning section is housed in the concave recesses.

According to the above configuration, even when an amount of wear of the lining configuring each pad is increased (until the lining is completely worn), it is possible to reduce the sliding between the returning section and the side surface of the rotor, so-called the drag. Therefore, while effectively using (source saving) the lining, it is possible to reduce the relative sliding, thereby reducing the wear of the rotor sliding surface.

Also, when implementing the invention, preferably, an axially central portion of the extension arm section is inserted into the recess in the axial direction of the rotor, which recess is formed at the circumferential end edge of the pressure plate.

According to the above configuration, it is possible to realize a structure where the returning section is brought into contact with the circumferential end portion side surface (surface facing the rotor), without unnecessarily complicating the shapes of the return spring, the pad clip and the like.

Also, when implementing the invention, preferably, the constraining section and the abutting section are offset toward an opposite side to the pad in the circumferential direction more than a surface of the pad clip circumferentially facing a circumferential end surface of the pressure plate.

Also, when implementing the invention, preferably, the constraining section extends from a torque receiving section of the leg section toward an opposite side to the rotor in the axial direction of the rotor, the torque receiving section being provided so as to elastically press a circumferential end portion of the pad in a circumferential direction.

Also, when implementing the invention, preferably, the constraining section extends from a step section of the leg section toward an opposite side to the rotor in the axial direction of the rotor, the step section being provided so as to be engaged with a part of the support and thus to diametrically position the pad clip with respect to the support.

Also, when implementing the invention, preferably, the pad clip has a pair of leg sections each of which is arranged between the support and each of the pads. Also, the return spring has an abutting section, an extension arm section, a returning section and a coil section in a pair, respectively.

Also, when implementing the invention, preferably, both end portions of the pad clip are provided with constraining sections, and at a state where the abutting sections of the return spring are abutted to both the constraining sections, both the constraining sections engage a central portion of the return spring. A part of the return spring except for the returning sections is prevented from being inclined to thus protrude toward a center of the support in a circumferential direction of the rotor, so that both the pads are enabled to be easily mounted to the support (the mounting property of the pad is favorably made).

According to the above configurations, when mounting the pads, it is possible to effectively prevent the pressure plate, the constraining section and the abutting section from interfering with each other, so that it is possible to improve the operation efficiency of the mounting operation of the pads.

Also, when implementing the invention, preferably, the return spring is formed by bending one wire rod, the engaging section is omitted and the coil sections are connected by a connection arm section provided to extend over the rotor.

According to the above configuration, it is possible to reduce the number of parts and the number of mounting processes of the return spring to the pad clip (one mounting is sufficient).

Alternatively, the return spring has an inner spring element and an outer spring element, which are separate elements. Each of the inner and outer spring elements is provided with the abutting section, the extension arm section, the returning section, the engaging section and the coil section, respectively.

According to the above configuration, the shapes, the line diameters and the like are different between both the spring elements. Thereby, it is possible to easily make the elastic urging force to be applied to the inner pad and the outer pad different. Therefore, the elastic urging force to be applied to the outer pad is made to be larger than the elastic urging force to be applied to the inner pad, so that it is possible to lower the amount of wear of the lining of the outer pad in which the amount of wear thereof is apt to increase.

Also, when implementing the invention, preferably, the pad clip has an inner clip element and an outer clip element that have the constraining section, respectively, and are separate elements.

According to the above configuration, it is possible to make the pad clip (clip elements) smaller/lighter, compared to a configuration where the entire pad clip is integrally formed (for example, a portal in which a pair of leg sections is connected by a connection section). Therefore, it is possible to improve the handling property of the pad clip, thereby improving the mounting operability of the pad clip. Also, it is possible to reduce the material cost for forming the pad clip. Also, irrespective of the thickness (axial size) of the rotor to be combined and used, it is possible to use the pad clip (it is possible to commonalize the pad clip elements).

Compared to this, for a portal in which a pair of leg sections is connected by a connection section, it is possible to improve the mounting property to the support (the number of mounting operations is reduced) and to enable the mounting (clamp) to the support with good precision. For example, by using a processing surface of a part (rotor pass part) of the support, which is provided to extend over the rotor, it is possible to maintain (to position) the backside of the connection section of the pad clip with good precision.

Also, when implementing the invention, preferably, the return spring has a pair of coil sections, which is separated from each other in the axial direction of the rotor, and a pair of outer arm sections extending from the respective coil sections toward an opposite side to the rotor in the axial direction of the rotor and having an abutting section at a part thereof, respectively.

In the meantime, the pad clip is configured so that the diametrically outer end portions of the pair of leg sections are connected by a connection section having an engaging notch or engaging hole into which a part of the return spring can be engaged. Also, each leg section is provided with a step section that is engaged with a part of the support and positions the pad clip with respect to the support in the diametrical direction.

The abutting section that is provided at the part of each outer arm section is enabled to abut on the constraining section with the elastic urging force being applied toward the direction separating from the rotor in the axial direction of the rotor, and the engaging section (engaging section provided to the inner arm section extending from the coil section toward the rotor in the axial direction of the rotor or the connection arm section having a shape connecting a pair of the inner arm sections), which is provided between both the coil sections of the return spring in the axial direction of the rotor, is engaged into the engaging notch or engaging hole with the elastic urging force being applied in the diametrically outer side so that the engaging section cannot be axially displaced.

At this state, the diametrically inner end portion of each coil section is elastically pressed to the diametrically outer surface of each positioning step section toward the diametrical inner side.

Alternatively, when implementing the invention, preferably, the return spring has an inner spring element and an outer spring element which have a coil section and a pair of arm sections, respectively, and are separate elements.

Also, each leg section configuring the pad clip is provided with a step section that is engaged with a part of the support to thus position the pad clip with respect to the support in a diametrical direction and a folding section that is formed by folding a diametrically central portion of the step portion into a substantial U shape with bent at a substantial right angle from a diametrically outer surface of the step section toward a diametrically outer side.

The abutting section provided to a part of an outer arm section of the arm sections configuring the inner and outer spring elements is abutted to each constraining section with an elastic urging force being applied in a direction getting away from the rotor in the axial direction of the rotor, the outer arm section extending from each coil section to an opposite side to the rotor in the axial direction of the rotor.

The engaging section, which is provided to a part of an inner arm section extending from each coil section toward the rotor in the axial direction of the rotor, is engaged to a part of the pad clip with an elastic urging force being applied toward the rotor in the axial direction of the rotor.

Also, at the above state, each coil section is mounted to a part surrounded by the diametrically outer surface of each step portion and each folding section.

According to the above configuration, it is possible to stabilize a posture (shape) of the return spring. Therefore, it is possible to effectively prevent the return spring from separating from the pad clip or the mounting position from deviating. Therefore, it is possible to improve the operability of the mounting operation of the pad clip and the return spring to the support. Also, at a state where the pad clip and the return spring are mounted to the support, it is possible to easily apply the desired elastic urging force (returning force) to the pad by the return spring.

Also, when implementing the invention, preferably, the engaging section provided to the leading end portion of each inner arm section is engaged into the engaging hole formed on the diametrically outer surface of each step section.

Also, a method of assembling a floating disc brake according to the invention is a method of assembling the floating disc brake. After elastically deforming the return spring, the elastic deformation is released to abut the abutting section provided to a part of the return spring to a constraining section of the pad clip by an elastic restoring force of the return spring, and the return spring is mounted to the pad clip. After that, the pad clip and the return spring are mounted to the support at the same time. Then, both the pads are mounted to the support.

Also, an assembly of a pad clip and a return spring according to the invention includes a pad clip and a return spring.

The pad clip has a leg section that is arranged between a support and a pad configuring a disc brake and a constraining section that is formed at a part of the leg section.

Also, the return spring is formed by bending a wire rod and has a coil section, an abutting section that is provided at a part of an arm section extending from the coil section and a returning section that is provided at a leading end portion of the arm section and contacts a part of the pad to thus press the pad in a direction getting away from the rotor.

The coil section is arranged so that a central axis thereof is substantially perpendicular to both surfaces (a surface facing the pad in the circumferential direction and an opposite surface thereto) of the leg section, and the abutting section is abutted to the constraining section by an elastic restoring force of the return spring. Thereby, the return spring is supported (mounted) to the pad clip, thereby configuring the assembly of the pad clip and the return spring.

Meanwhile, in the assembly of the pad clip and the return spring, the return spring may be supported to the pad clip, and the return spring may be supported at a state before the pad clip is mounted to the support or after the pad clip is mounted to the support.

BRIEF DESCRIPTION OF DRAWINGS

FIGS. 6A to 6C show a state (assembly) where the return spring is mounted to the pad clip shown in FIG. 1, in which FIG. 6A is a front view, FIG. 6B is a plan view and FIG. 6C is a side view.

FIGS. 7A to 7C show only one spring element configuring the return spring shown in FIG. 1 and elastically deformed to a mounted state to the pad clip, in which FIG. 7A is a front view, FIG. 7B is a plan view and FIG. 7C is a side view.

FIGS. 17A and 17B show a state (assembly) where the return spring is mounted to the pad clip shown in FIG. 10, in which FIG. 17A is a front view and FIG. 17B is a plan view.

FIGS. 26A to 26C show a state (assembly) where one spring element is mounted to one clip element shown in FIG. 25, in which FIG. 26A is a front view, FIG. 26B is a plan view and FIG. 26C is a side view.

DESCRIPTION OF EMBODIMENTS

First Embodiment

Figure 1:
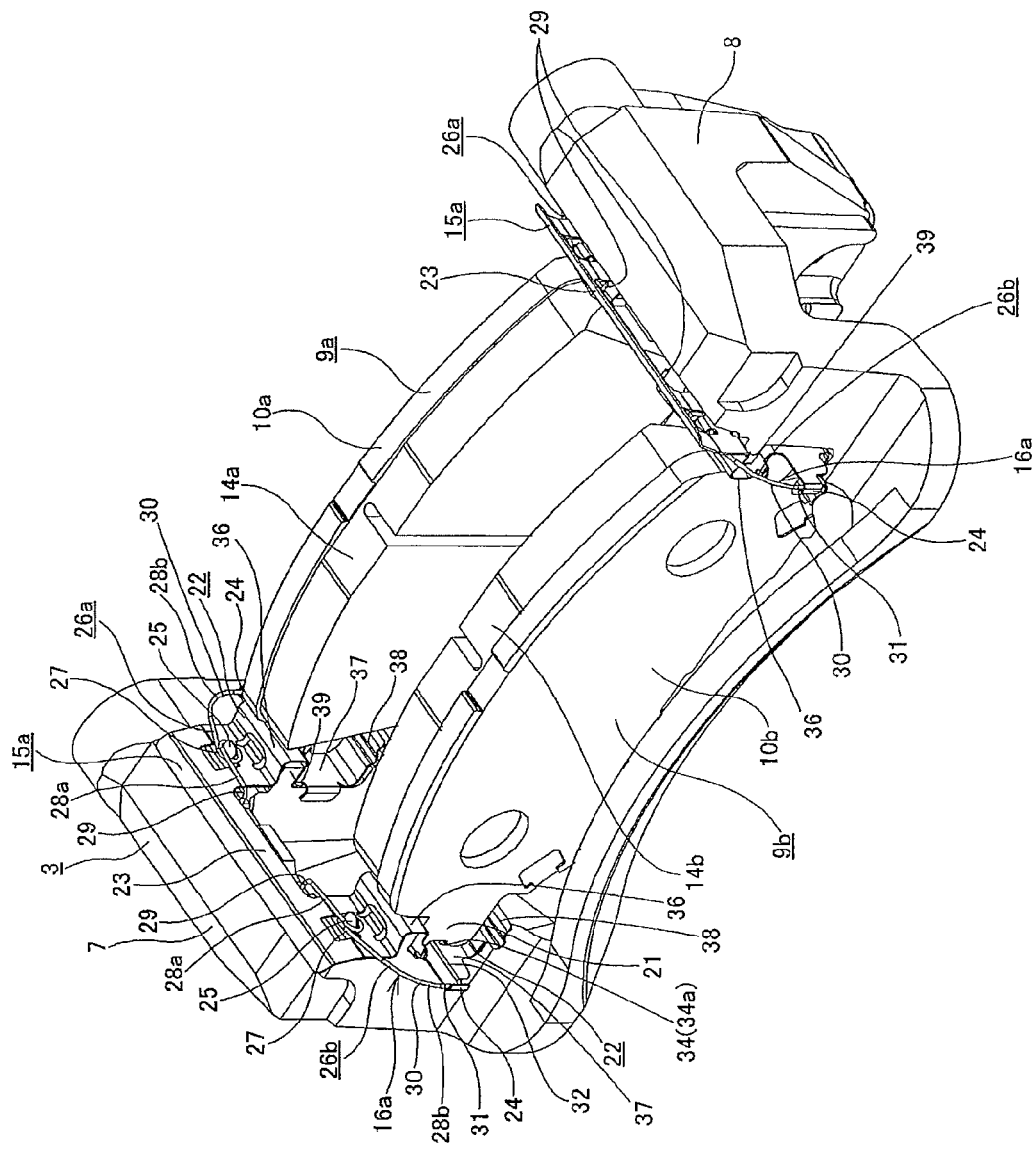
FIG. 1 is a perspective view of a floating disc brake according to a first embodiment of the invention, which is seen from an outer diameter side and an outer side with a caliper being omitted.

FIGS. 1 to 9 show a first embodiment of the invention. In the meantime, a feature of the invention relates to a structure of a pad clip 15a and a return spring 16a so as to easily perform a mounting operation of the pad clip 15a and the return spring 16a, including a structure of the first embodiment. The other structures and operational effects are the substantially same as those of the first example of the prior art. Thus, the illustration and description of the equivalent parts will be omitted or simplified. Hereinafter, features of the first embodiment of the invention will be described.

Also in the first embodiment, engaging protruding pieces 21, 21 that are provided at both circumferential end portions of pressure plates 10a, 10b configuring inner and outer pads 9a, 9b are engaged to engaging recesses 20, 20 that are formed at rotation input side and rotation output side engaging sections 7, 8, which are provided at both circumferential end portions of a support 3. Thereby, the pads 9a, 9b are axially displaceably supported. Also, the pad clips 15a, 15b are respectively interposed between the respective engaging recesses 20, 20 and the respective engaging protruding pieces 21, 21. Each of the pad clips 15a, 15a is formed by bending a metal plate having elasticity and corrosion resistance such as stainless spring steel and has a pair of axially spaced leg sections 22, 22 and a connection section 23 connecting diametrically outer end portions of the leg sections.

Each leg section 22 has a positioning step section 36, a torque receiving section 37 and a bent section 38, which are continuous in the diametrical direction. The positioning step section 36 circumferentially protrudes at a diametrically central portion of the leg section 22 toward each pad 9a, 9b, has a substantially U-shaped section and is engaged with a protrusion section 39 formed at a part of the support 3 (the protrusion section 39 is elastically fitted/held at an outer side of the positioning step section) to thus position each pad clip 15a in the diametrical direction. Also, the torque receiving section 37 is bent at a substantially right angle from a diametrically inner surface of the positioning step section 36 toward a diametrically inner side and elastically presses each engaging protruding piece 21 provided at the circumferential end portion of each of the pads 9a, 9b. Also, the bent section 38 is circumferentially bent from a diametrically inner end portion of the torque receiving section 37 toward each of the pads 9a, 9b and elastically contacts a diametrically inner surface of each engaging protruding piece 21.

In particular, in the first embodiment of the invention, both axial end portions of each of the pad clips 15a, 15a are provided with a pair of constraining sections 24, 24 at parts more axially spaced from the rotor 1 (refer to FIG. 2) than the pressure plates 10a, 10b configuring the respective pads 9a, 9b. Each of the constraining sections 24, 24 is formed by bending a central portion of the torque receiving section toward each of the pads 9a, 9b in the circumferential direction with extending in a direction axially separating from each of the torque receiving sections 37, 37 provided at inner-diametrically biased parts of the respective leg sections 22, 22. The constraining sections 24, 24 having the above configuration are provided so as to mount the return spring 16a to each pad clip 15a (so as to configure an assembly of the pad clip 15a and the return spring 16a) before both pads 9a, 9b are mounted, receive an elastic urging force (returning force) of each return spring 16a and supports each return spring 16a. Also, protruding pieces 25, 25 are provided at outer-diametrically biased parts of the leg sections 22, 22, i.e., at parts bent at a substantially right angle from diametrically outer surfaces of the respective positioning step sections 36, 36 toward a diametrically outer side. Each of the protruding pieces 25, 25 is formed by forming a U-shaped slit at the outer-diametrically biased part of each of the leg sections 22, 22 and bending an inner side of the slit toward the caliper (direction coming close to each other).

The pad clips 15a, 15a having the above configuration are respectively provided at an anchor side (a brake torque receiving side) of the disc brake and at an opposite side to the anchor. The leg sections 22, 22 configuring each of the pad clips 15a, 15a are arranged between outer surfaces of the engaging protruding pieces 21, 21 provided at the end portions of the respective inner and outer pads 9a, 9b and inner surfaces of the engaging recesses 20, 20 formed at the rotation input side and rotation output side engaging sections 7, 8. By the torque receiving sections 37, 37 of the respective leg sections 22, 22, the respective engaging protruding pieces 21, 21 are elastically pressed in the circumferential direction, so that the respective pads 9a, 9b are prevented from rattling with respect to the support 3. Also, at this state, the connection section 23 is positioned at the diametrically outer side of the outer periphery of the rotor 1 and connects the diametrically outer end portions of the leg sections 22, 22.

Also, in order to separate friction surfaces of linings 14a, 14a configuring the respective pads 9a, 9b from both side surfaces of the rotor 1 as the braking is released, the return springs 16a, 16a are provided at both circumferential end portions of the respective pads 9a, 9b. In the first embodiment, each of the return springs 16a, 16a is configured by an inner spring element 26a and an outer spring element 26b, which are separate elements. As shown in FIG. 7, each of the spring elements 26a, 26b is a torsion coil spring that is formed by bending a wire rod of stainless spring steel such as piano line and in which base sections of a pair of arm sections 28a, 28b (inner arm section 28a, outer arm section 28b) continue from a coil section 27 provided at an axially central portion.

Figure 2:
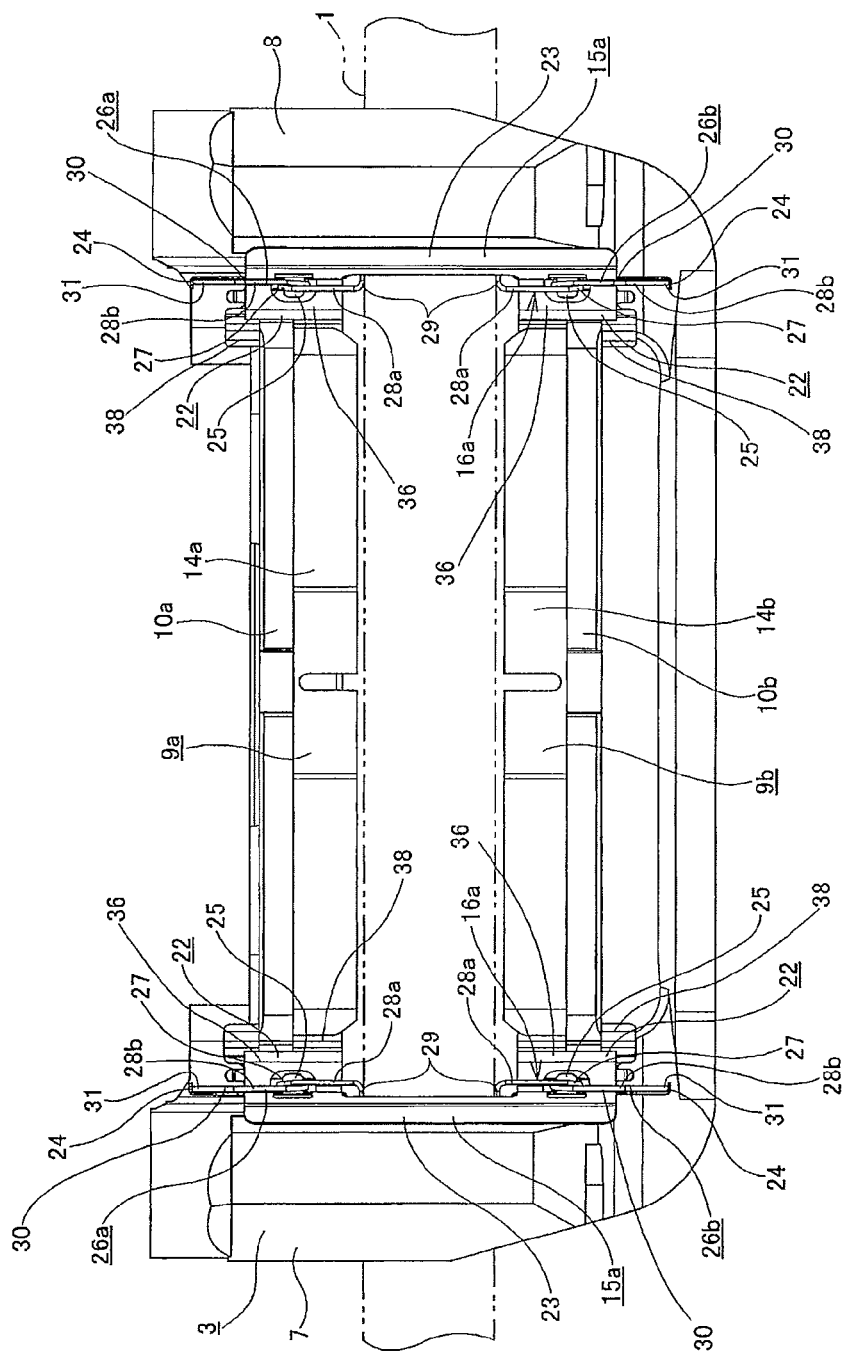
FIG. 2 is an orthographic view of the floating disc brake shown in FIG. 1, which is seen from an outer diameter side.
Figure 3:
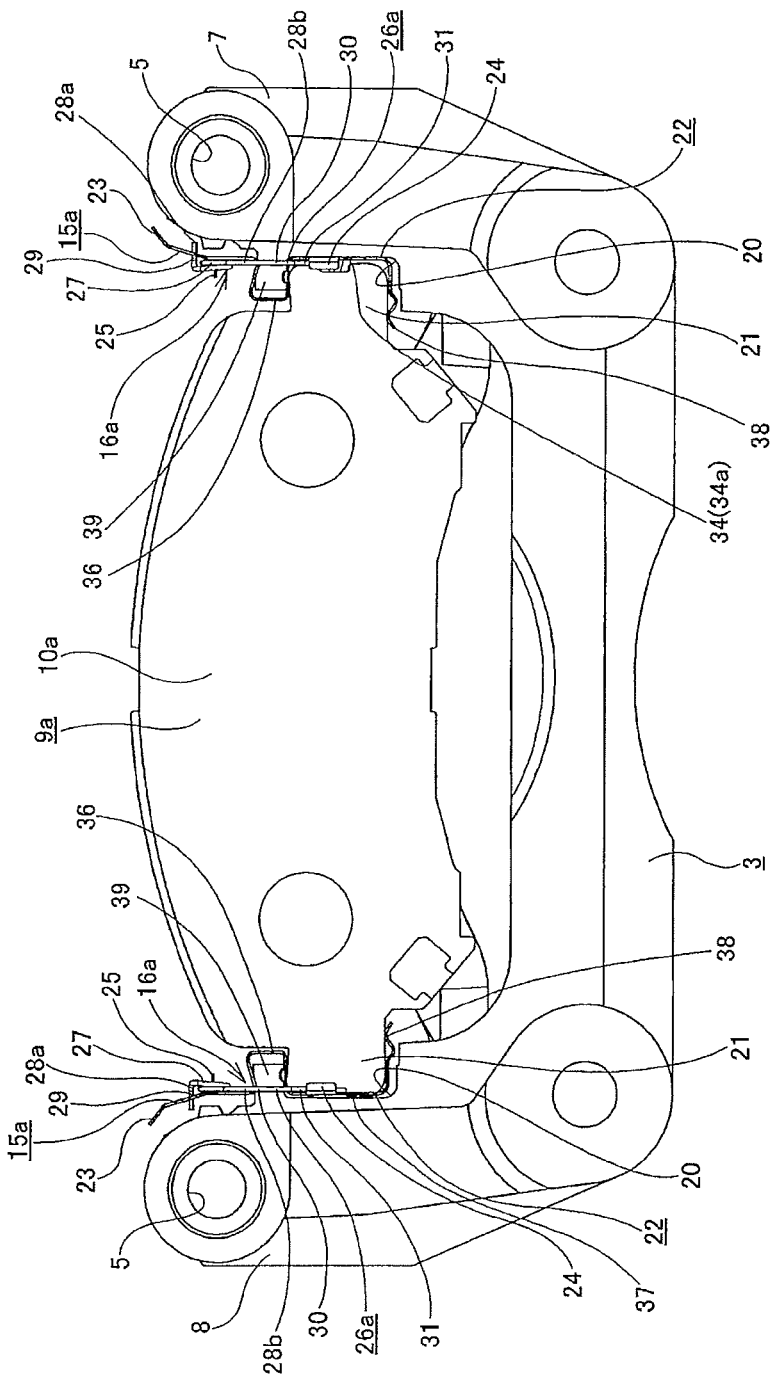
FIG. 3 is an orthographic view of the floating disc brake shown in FIG. 1, which is seen from an inner side.

The coil section 27 has an inner diameter enabling the protruding piece 25 of the pad clip 15a to insert therein and has a central axis that is substantially oriented in a rotational direction of the rotor 1 (which is a rotational direction (tangential direction) of the rotor 1 at the circumferentially central portion of the pads 9a, 9b, is perpendicular to both surfaces of the leg section 22 and is a left-right direction of FIG. 2).

Also, a leading end portion of the inner arm section 28a axially extending toward the rotor 1 of both the arm sections 28a, 28b is circumferentially bent toward the pad clip 15a (opposite side to the pads 9a, 9b) and serves as an engaging section 29. Also, as required, as shown with the dashed-two dotted line in FIG. 5, leading end portions of the respective engaging portions 29, 29 are folded in the diametrically outer direction to thus configure deviation preventing pieces 40, 40. The respective deviation preventing pieces 40, 40 are engaged on a backside of the connection section 23 to thus prevent each of the return springs 16a from deviating from the pad clip 15a.

Compared to this, the outer arm section 28b extending toward an opposite side to the rotor 1 has a substantial L shape, when seen from the front, and has a curved section 30, an abutting section 31, an extension arm section 32 and a returning section 33 in order from a base end portion-side toward a leading end portion-side thereof. The abutting section 31 is a part that abuts on a surface (inner surface) of the constraining section 24, 24 configuring the pad clip 15a, which surface faces the side surface of the rotor 1, by the elastic restoring force of each spring element 26a (26b). In the first embodiment of the invention, the abutting section is linear and extends perpendicularly from an inner diameter-side end portion of the curved section 30 toward the diametrically inner side.

Figure 8A:
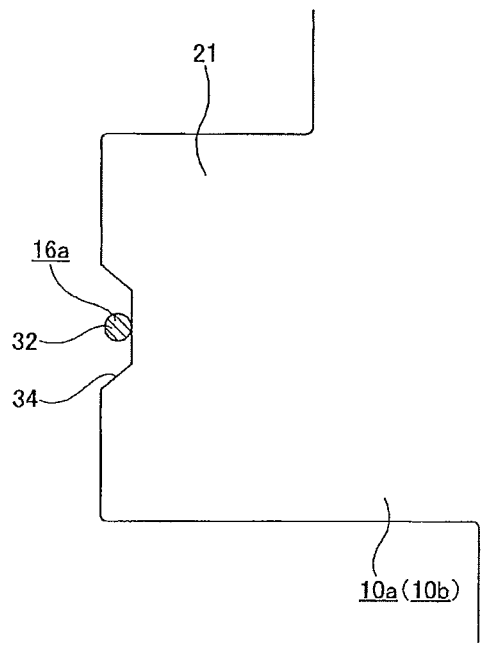
FIGS. 8A and 8B show two examples of a recess that is formed at an engaging protruding piece of a pressure plate shown in FIG. 1.
Figure 8B:
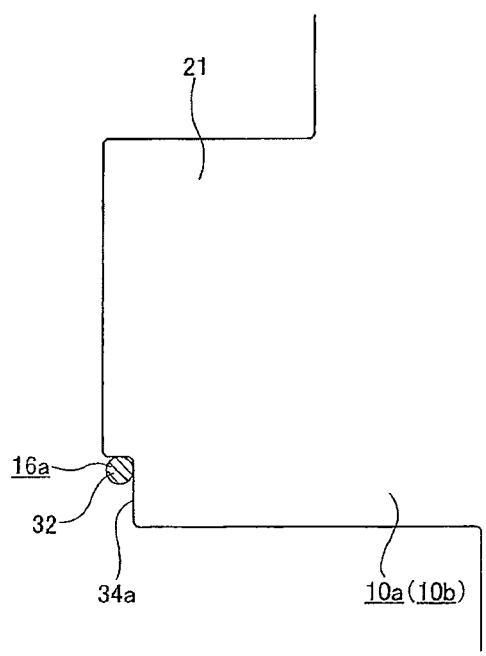

Also, the extension arm section 32 is bent at a substantial right angle from a diametrically inner end portion of the abutting section 31 in a direction coming close to the rotor 1 and is oriented so that it is substantially parallel with the central axis of the rotor 1. Therefore, in the first embodiment, in order to prevent the extension arm section 32 and an circumferential end edge of each of the pressure plates 10a, 10b from interfering with each other, the engaging protruding pieces 21, 21 of the respective pressure plates 10a, 10b are provided at the circumferential end edges thereof with recesses 34 (34a). An axially central portion of the extension arm section 32 is axially inserted into each recess 34 (34a). Specifically, the axially central portion of the extension arm section 32 is inserted into the recess 34 that is opened in the circumferential direction only, as shown in FIG. 8A, or inserted into the recess 34 that is opened in the circumferential direction and diametrical direction (inner side), as shown in FIG. 8B. Also, in the first embodiment, an axial length of the extension arm section 32 is constrained as follows. That is, the axial length of the extension arm section 32 is made to be larger than an axial thickness of each of the pads 9a, 9b and is made to be a length enabling the returning section 33 to contact the surface (inner surface) of each of the engaging protruding pieces 21, 21 facing the side surface of the rotor 1 with the abutting section 31 and the inner surface of the constraining section 24 being contacted each other at a state where both pads 9a, 9b are mounted (at the axial position of each of the pads 9a, 9b upon the non-braking).

Also, the returning section 33 is bent from a leading end portion (end portion of the rotor 1-side) of the extension arm section 32 in a direction circumferentially separating from each pad clip 15a (in an opposite side to the engaging section 29) and contacts the inner surface of each of the engaging protruding pieces 21, 21. Also, a part (a based end portion, in the shown example) of the returning section 33 is positioned on a virtual plane (refer to the dotted-dashed line Y in FIG. 7C) passing through the coil section 27 of virtual planes orthogonal to the central axis (refer to the dotted-dashed line X in FIG. 7C) of the coil section 27. Also, the returning section 33 is located at a position (the lower part in FIG. 7C) overlapping with the coil section 27 in the axial direction of the rotor 1 at a state where the return spring 16a is mounted to the pad clip 15a (at the state where the pads 9a, 9b are mounted). Also, a diametrical position of the returning section 33 is the substantially same as a diametrical position of a friction center of each of the linings 14a, 14b configuring the respective pads 9a, 9b.

Also, in the first embodiment, although not shown in the drawings, both the spring elements 26a, 26b may have different line diameters or shapes. Specifically, of the spring elements 26a, 26b, it is possible to make load (returning force) of the outer spring element 26b (applying the elastic urging force to the outer pad 9b) arranged at the outer side of the rotor 1 larger than load (returning force) of the inner spring element 26a (applying the elastic urging force to the inner pad 9a) arranged at the inner side. Also, it is possible to make the load (returning force) of the spring element, which is provided at an opposite side (entrance side, rotation input side) to the anchor, larger than the load (returning force) of the spring element, which is provided at the anchor side (exit side, rotation output side).

Figure 4:
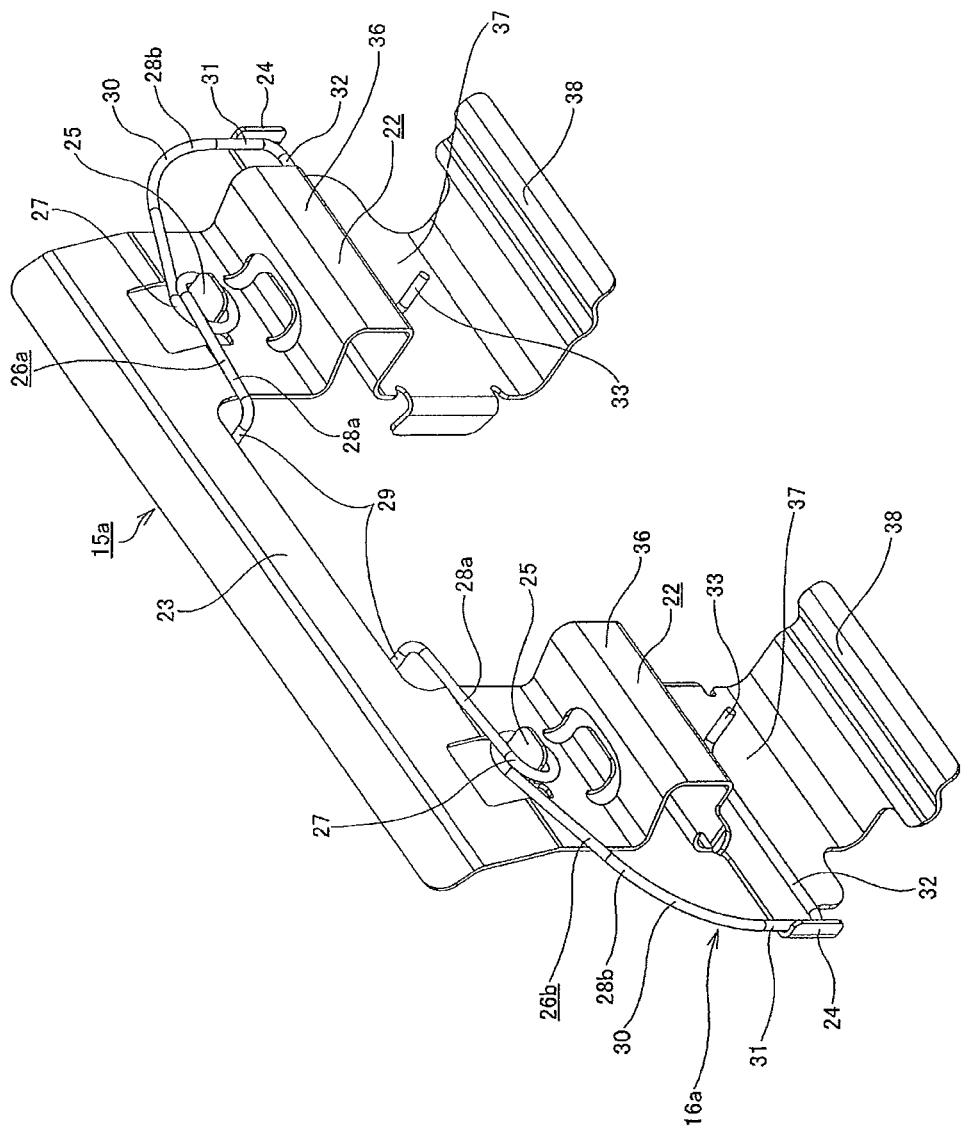
FIG. 4 is a perspective view showing a state (assembly) where a return spring is mounted to a pad clip shown in FIG. 1, which is seen from an outer diameter side and a front side.
Figure 5:
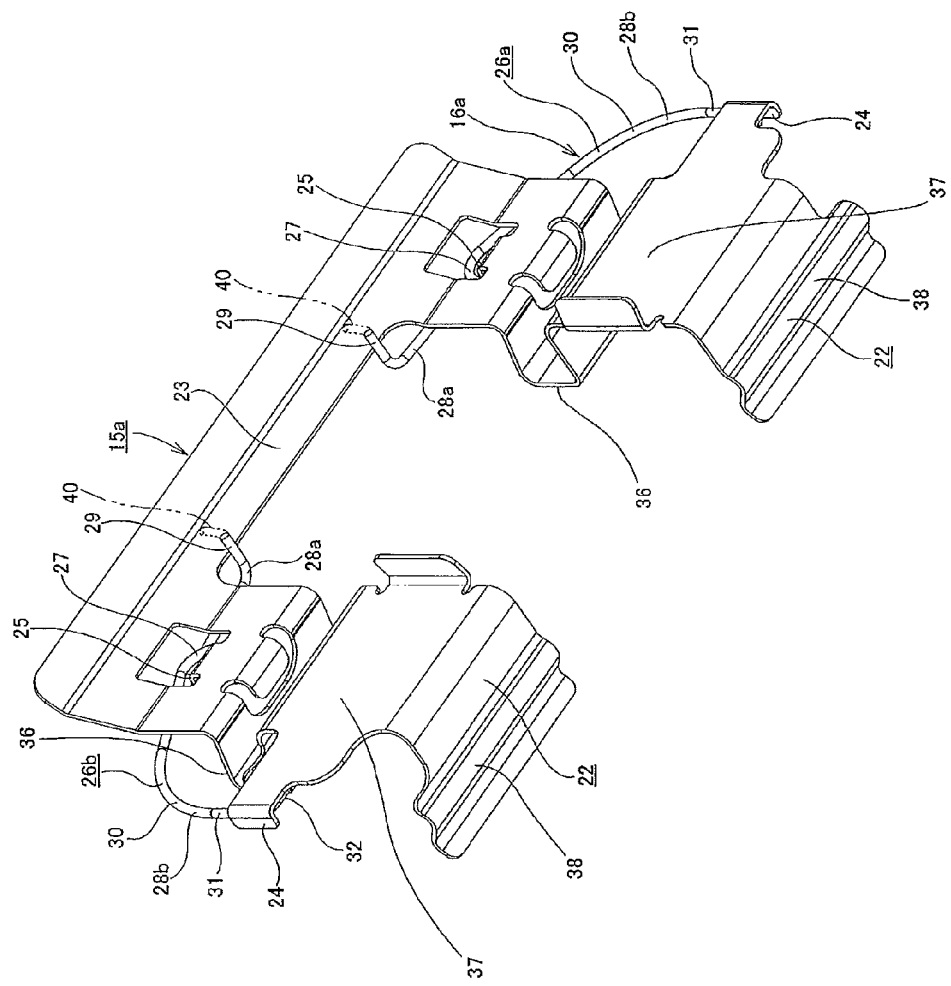
FIG. 5 is a perspective view showing a state (assembly) where the return spring is mounted to the pad clip shown in FIG. 1, which is seen from an inner diameter side and a backside.

In the first embodiment having the pad clips 15a and the return springs 16a, when assembling the floating disc brake, the return springs 16a are mounted (preset) to the pad clips 15a, as shown in FIGS. 4 to 6, at a state before the respective pads 9a, 9b are mounted to the support 3. That is, as shown in FIGS. 4 to 6, an assembly of the pad clip 15a and the return spring 16a is configured. To this end, specifically, at a state where the arm sections 28a, 28b configuring each of the spring elements 26a, 26b are elastically deformed in the direction coming close to each other, the protruding piece 25 is inserted into the coil section 27 and then the arm sections 28a, 28b are elastically returned (the elastic deformation is released). Thereby, the engaging section 29 provided at the leading end portion of the inner arm section 28a is engaged on the inner peripheral edge of the connection section 23 with the elastic urging force being applied in the diametrically outer side, and the abutting section 31 provided at the outer arm section 28b is enabled to abut on the inner surface of the constraining section 24 with the elastic urging force being axially applied in the direction separating from the rotor 1. In other words, both the arm sections 28a, 28b of each of the spring elements 26a, 26b extend between the inner peripheral edge of the connection section 23 configuring the pad clip 15a and the inner surface of the constraining section 24. Thereby, the inner peripheral surface of the coil section 27 is pressed to the protruding piece 25 toward the rotor 1 in the diametrically inner side and axial directions. At this state, both the spring elements 26a, 26b (return spring 16a) are mounted to the pad clip 15a. Also, the inner peripheral surface of the coil section 27 is pressed to the protruding piece 25, so that the respective spring elements 26a, 26b are positioned with respect to the pad clip 15a in the diametrical and axial directions.

In the meantime, the operation of mounting the return spring 16a to the pad clip 15a may be performed at an assembling factory of the disc brake or may be performed in advance at a supply source of parts (for example, a factory at which the pad clip 15a and the return spring 16a are manufactured). When performing the mounting operation at a supply source of parts, the assemblies of the pad clips 15a and the return springs 16a are carried, prepared and assembled in the assembling factory of the disc brake.

After the return spring 16a is mounted to the pad clip 15a (or after the mounted assembly is prepared) as described above, the assemblies of the pad clips 15a and the return springs 16a are mounted to the support 3 and then both the pads 9a, 9b are mounted to the support 3, as shown in FIGS. 1 to 4. In the first embodiment, at the state where both the pads 9a, 9b are mounted, the elastic urging force from the return springs 16b is not applied to both the pads 9a, 9b yet. At a state where a caliper (not shown) is being mounted, both the pads 9a, 9b are made to slightly come close to each other (for example, 1 mm or smaller) and the elastic urging force in the direction getting away from each other is applied to both the pads 9a, 9b. At this state, the respective abutting sections 31, 31 are slightly moved upward from the respective constraining sections 24, 24.

The floating disc brake of the first embodiment assembled as described above operates upon the braking and upon the braking release, as follows.

First, upon the braking, the pressure oil is supplied into a cylinder section provided to the caliper (not shown) and the lining 14a of the inner pad 9a is pressed to the inner surface of the rotor 1 from the upper to the lower in FIG. 2. Thus, as a reaction to the pressing force, the caliper 2 is displaced upward in FIG. 2, based on the sliding between both the guide pins and both the guide holes 5, 5, and the claw section presses the lining 14b of the outer (a widthwise outer side of the vehicle and lower side in FIG. 2) pad 9b to the outer surface of the rotor 1. As a result, the rotor 1 is strongly held from both the inner and outer side surfaces, so that the braking is made. At this time, the returning sections 33, 33 configuring the respective return springs 16a, 16a are pushed by the inner surfaces of the respective engaging protruding pieces 21, 21 and are thus axially displaced along the direction approaching the rotor 1. At the same time, the respective extension arm sections 32, 32 are axially displaced and the respective abutting sections 31, 31 are separated from the inner surfaces of the respective constraining sections 24, 24. As a result, an amount of bending of the respective outer arm sections 28b, 28b (an amount of elastic deformation of the coil section 27) is increased, compared to the non-braking.

Upon the braking release, the respective returning sections 33, 33 are pressed to the inner surfaces of the respective engaging protruding pieces 21, 21, based on the elastic restoring force of the respective return springs 16a, 16a, and the elastic urging force is applied to both the pads 9a, 9b in the direction getting away from each other (the direction of separating the respective pads 9a, 9b from the rotor 1). Thereby, the friction surfaces of the linings 14a, 14b of both the pads 9a, 9b are separated from both the side surfaces of the rotor 1. Particularly, in the first embodiment of the invention, the elastic urging force is applied to both the pads 9a, 9b until the respective abutting sections 31, 31 abut on the inner surfaces of the respective constraining sections 24, 24, so that the elastic urging force is not applied when the abutting is made.

As clearly seen from the above descriptions, in the first embodiment, when mounting the respective pad clips 15a, it is possible to handle the respective pad clips 15a and the respective return springs 16a as integral articles (assemblies, subassemblies), thereby facilitating the mounting operation.

That is, in the first embodiment, as described above, the respective pad clips 15a are provided with the constraining sections 24, 24, so that it is possible to receive the elastic urging force of the respective return springs 16a (spring elements 26a, 26b) and to thus support the respective return springs 16a to the respective pad clips 15a with the sufficient supporting force corresponding to the elastic urging force. Therefore, it is possible to handle the respective pad clips 15a and the respective return springs 16a as integral articles (assemblies), so that it is possible to perform the operations of mounting the respective pad clips 15a and the respective return springs 16a at the same time, thereby facilitating the mounting operation. As a result, it is possible to improve the assembling performance, thereby reducing the assembling cost. Also, since it is possible to mount the respective return springs 16a to the respective pad clips 15a in a wide space in which the operation space is not limited, it is also possible to facilitate the mounting operation.

Also, in the first embodiment, at a state just after both the pads 9a, 9b are mounted (the caliper is not mounted yet), the elastic urging force is not applied to both the pads 9a, 9b. Thus, it is not necessary to consider a configuration of preventing both the pads 9a, 9b from separating axially from the support 3. Also, the respective constraining sections 24, 24 are engaged with the engaging protruding pieces 21, 21 of the respective pads 9a, 9b, so that it is possible to prevent the respective pads 9a, 9b from separating from the support 3. Accordingly, the assembling operation or conveying operation is not troublesome. Also, since it is possible to handle the respective pad clips 15a and the respective return springs 16a as integral articles, it is possible to reduce the part management cost.

Also, the operation of mounting the respective return springs 16a to the respective pad clips 15a may be performed in advance at the supply source of the parts, and the assemblies of the respective return springs 16a and the respective pad clips 15a may be delivered in the assembling factory of the disc brake. In this case, the burden on the management (delivery management, management of boxes and the like, number management, stock management, ordering management, storage place and the like) and the like is reduced by a half, compared to a case where the respective return springs 16a and the respective pad clips 15a are handled as separate articles. Also, it is possible to reduce the number of preparing processes, to prevent the mounting mismatch and to reduce the number of mounting processes.

Also, in the first embodiment, the inner peripheral surfaces of the respective coil sections 27 are elastically pressed to the respective protruding pieces 25, so that it is possible to stabilize the postures (shapes) of the respective spring elements 26a, 26b. Therefore, it is possible to effectively prevent the respective return springs 16a (spring elements 26a, 26b) from separating from the respective pad clips 15a or the mounting positions from deviating. Therefore, it is possible to improve the operability of the mounting operation of the respective pad clips 15a and the respective return springs 16a to the support 3.

Also, it is possible to easily apply the desired returning force to both the pads 9a, 9b due to the respective return springs 16a. Also, the respective return springs 16a are composed of the torsion coil springs having the respective coil sections 27, so that it is possible to lower a constant of the spring, compared to a configuration where a wire spring having no coil section is used. Therefore, even when the amounts of wear of the linings 14a, 14a of both the pads 9a, 9b are varied and amounts of axial movement of both the pads 9a, 9b are thus increased upon the braking, it is possible to lower (stabilize) the change in the elastic urging force to be applied to both the pads 9a, 9b. That is, it is possible to make the elastic urging force to be applied to both the pads 9a, 9b constant until the linings 14a, 14b are almost worn from a state of new products. Also, in the first embodiment, the part of each returning section 33 is positioned on the virtual plane Y passing through each coil section 27 of the virtual planes orthogonal to the central axis X of each coil section. Hence, the circumferential positions of the coil section 27 and the part (base end portion) of the returning section 33 are matched, so that the respective coil sections 27 are elastically deformed in a torsion direction (rolling-in direction) upon the braking. Therefore, it is possible to effectively use the elastic deformation (elastic urging force) of the respective coil sections 27 as the returning force of separating the respective pads 9a, 9b from the rotor 1. Also, since the respective coil sections 27 and the respective returning sections 33 overlap with each other in the axial direction of the rotor 1, it is possible to substantially match the operational direction of the returning force by the respective returning sections 33 with the axial direction of the rotor 1 that is the moving direction of the respective pads 9a, 9b. Accordingly, it is possible to effectively separate the respective pads 9a, 9b from the rotor 1.

Also, in the first embodiment, the respective extension arm sections 32 are oriented in substantially parallel with the central axis of the rotor 1 and the diametrical positions of the respective returning sections 33 are matched with the diametrical positions of the friction centers of the linings 14a, 14b configuring the respective pads 9a, 9b. Accordingly, at the state where the braking is released, it is possible to effectively prevent both the pads 9a, 9b from being inclined to the rotor 1 and any one of both the inner and outer peripheral edges of both the pads 9a, 9b from rubbing with the side surface of the rotor 1. Also, since the respective extension arm sections 32 are oriented in substantially parallel with the central axis of the rotor 1, it is possible to easily make trajectories of the respective returning sections 33, 33 parallel until the respective pads 9a, 9b (linings 14a, 14b) are almost worn from a state of new products. Also, the circumferential end edges of the respective engaging protruding pieces 21, 21 are formed with the recesses 34 (34a) and the respective extension arm sections 32 are axially inserted into the respective recesses 34 (34a). Hence, it is possible to realize a structure where the respective returning sections 33, 33 are brought into contact with the inner surfaces of the respective engaging protruding pieces 21, 21, without unnecessarily complicating the shapes of the respective return springs 16a (spring elements 26a, 26b), the respective pad clips 15a and the like.

Also, in the first embodiment, the respective return springs 16a are composed of the inner spring element 26a and the outer spring element 26b. Thus, for example, it is possible to make the line diameter of the outer spring element 26b smaller than the line diameter of the inner spring element 26a. Therefore, it is possible to make the elastic urging force to be applied to the outer pad 9b larger than the elastic urging force to be applied to the inner pad 9a, so that it is possible to effectively lower the amount of wear of the lining 14b of the outer pad 9b in which the amount of wear thereof is apt to increase. Also, it is possible to suppress the thickness variation of the rotor 1, so that it is possible to effectively prevent the judder from occurring. In addition to the configuration where the line diameters are different between the inner and outer spring elements 26a, 26b, the shapes at a free state and the windings of the coil section 27 may be made to be different, so that it is possible to make the elastic urging force to be applied to the outer pad 9b and the elastic urging force to be applied to the inner pad 9a different.

Meanwhile, when implementing the invention, concave recesses may be formed on the inner surfaces of the engaging protruding pieces 21, 21 and the respective returning sections 33 may be housed in the concave recesses. According to this configuration, even when the amounts of wear of the linings 14a, 14b are increased (until the linings are completely worn), it is possible to prevent the respective returning sections 33, 33 and the side surfaces of the rotor 1 from rubbing each other.

Second Embodiment

Figure 9:
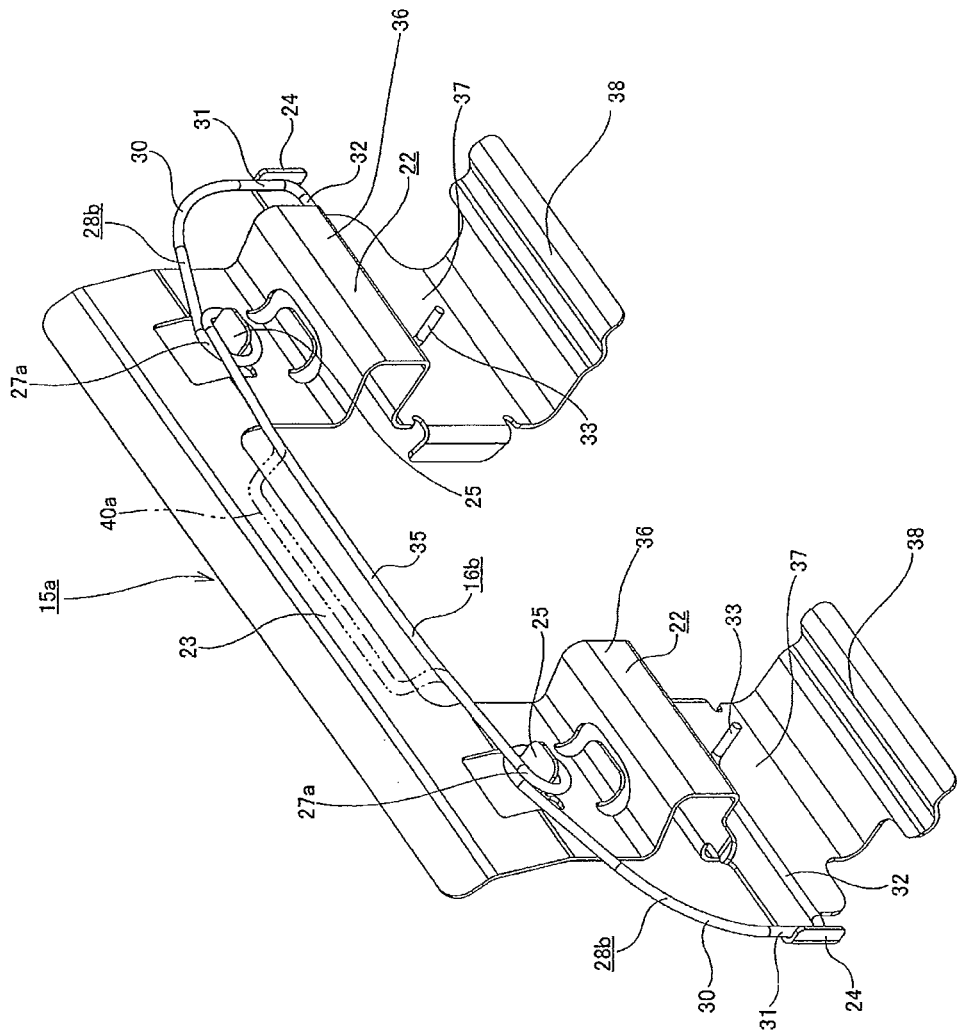
FIG. 9 is a perspective view showing a state (assembly) where a return spring according to a second embodiment of the invention is mounted to the pad clip, which is seen from an outer diameter side and a front side.

FIG. 9 shows a second embodiment of the invention. In the second embodiment, the return spring 16b is integrally formed by bending one wire rod, differently from the first embodiment. The return spring 16b has a shape connecting the leading end portion of the inner arm section 28a of inner spring element 26a and the leading end portion of the inner arm section 28a (for example, refer to FIG. 4) of the outer spring element 26b of the first embodiment. Specifically, the return spring 16b has a connection arm section 35 provided at an axially central portion with being put on the rotor 1 (refer to FIG. 2, for example), a pair of coil sections 27a, 27a continuing from both axial end portions of the connection arm section 35 and outer arm sections 28b, 28b having base portions continuing from the respective coil sections 27a, 27a. The configurations of the coil section 27a and the outer arm section 28b are the same as those of the first embodiment.

Figure 27:
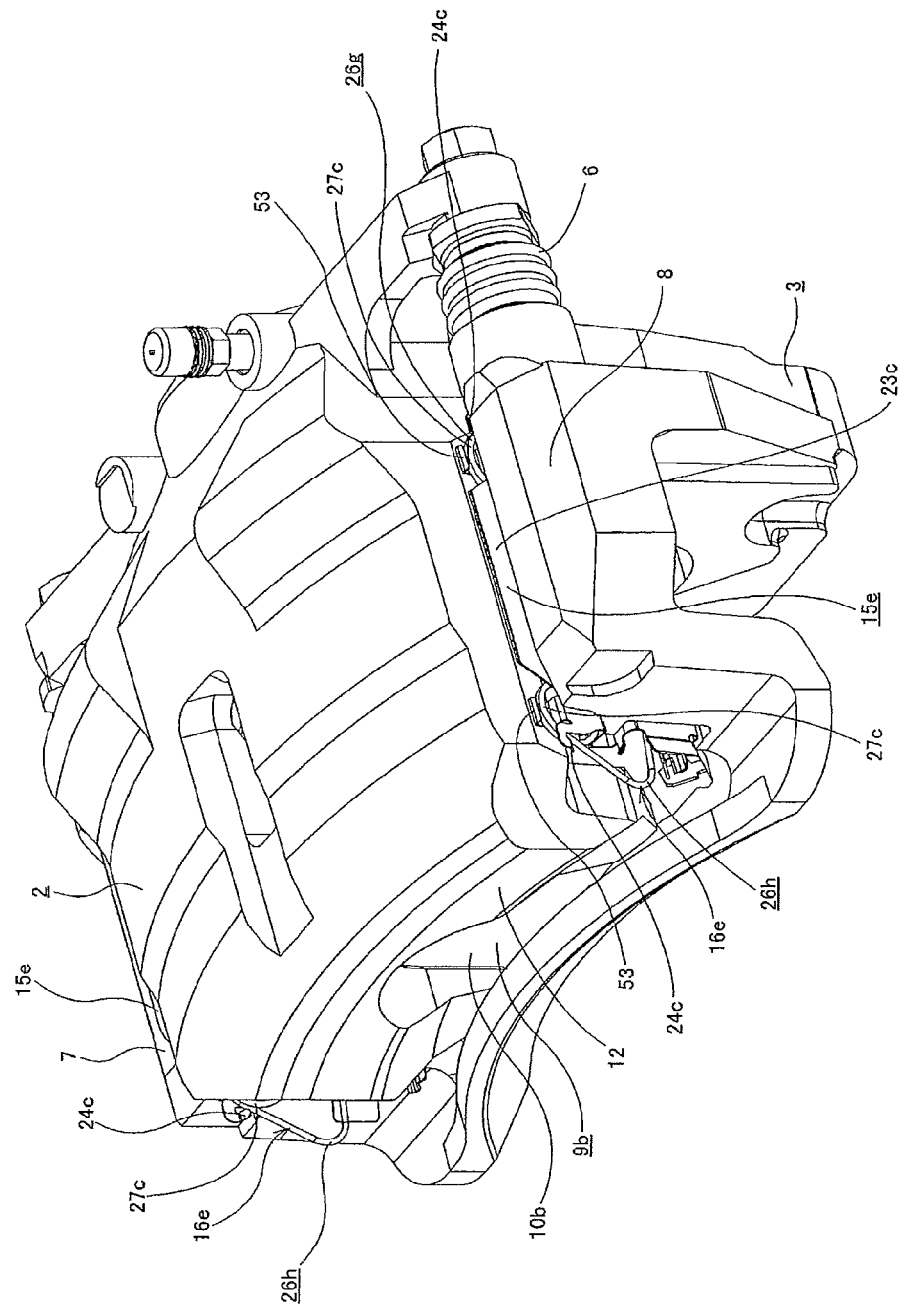
FIG. 27 is a perspective view of a floating disc brake according to a sixth embodiment of the invention, which is seen from an outer side and a diametrically outer side with a rotor being omitted.
Figure 28:
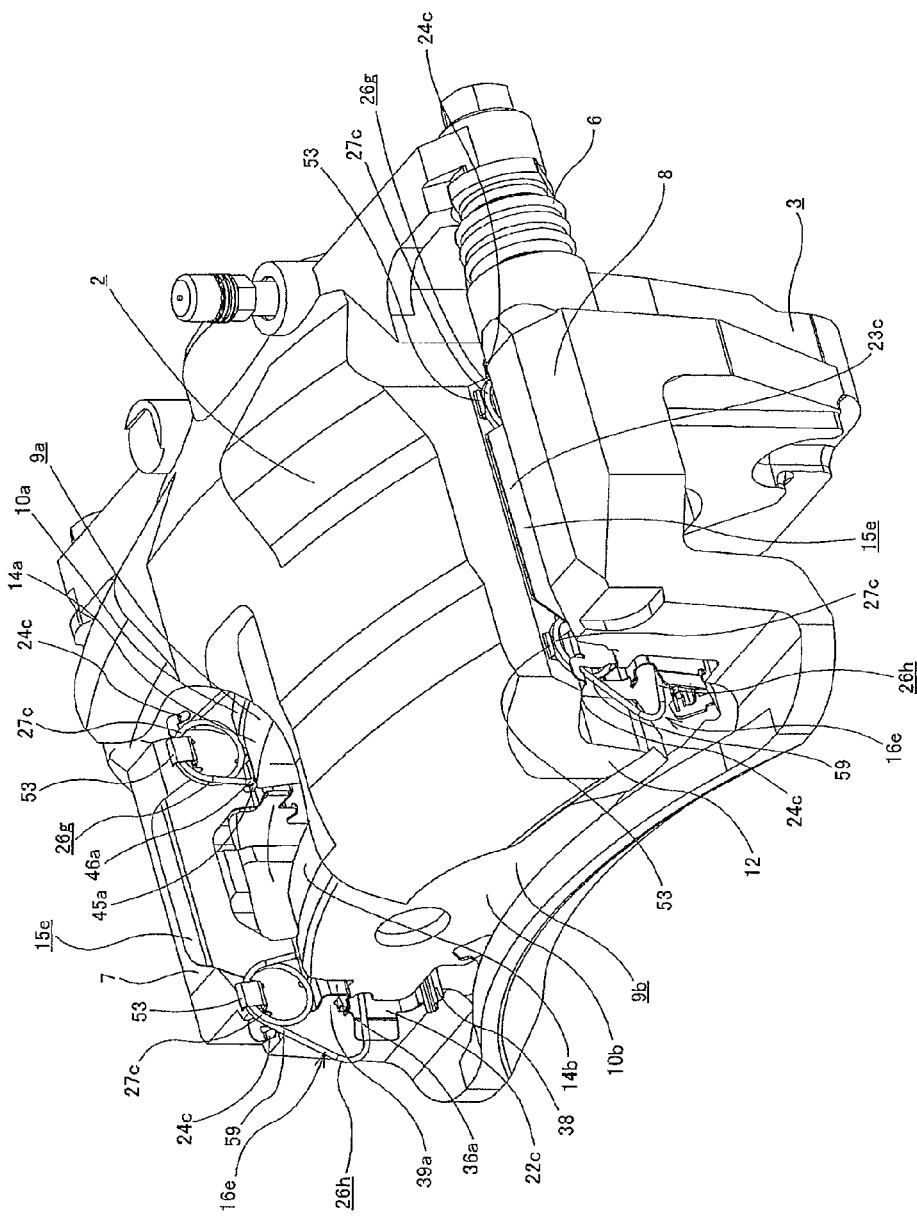
FIG. 28 is a perspective view showing a caliper of FIG. 27 with a part thereof being cut.
Figure 29:
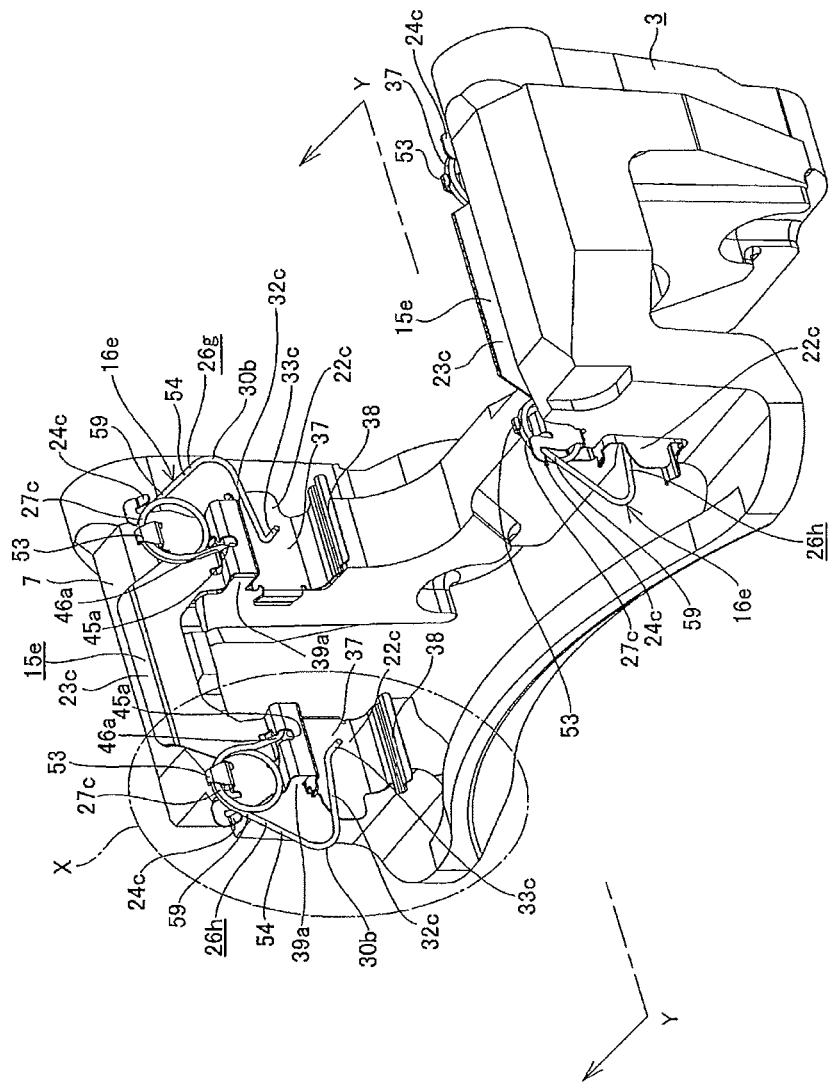
FIG. 29 is a perspective view showing a state where each spring element is elastically deformed to a mounted state to a pad except for the caliper and pad shown in FIG. 27.
Figure 30:
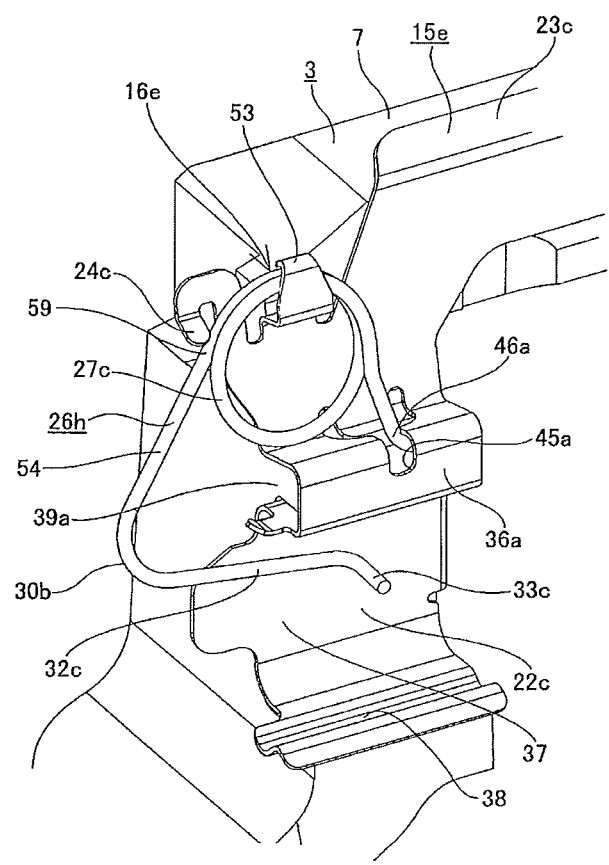
FIG. 30 is an enlarged view of an X part shown in FIG. 29.
Figure 57:
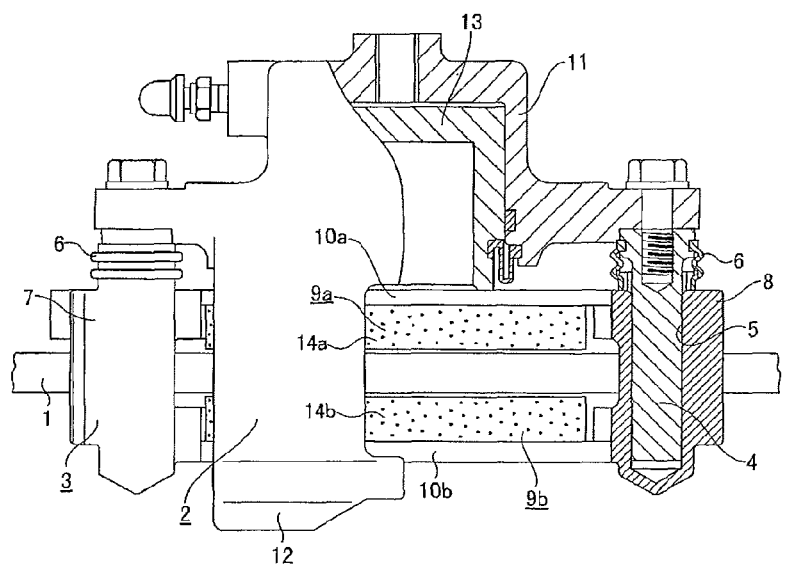
FIG. 57 is a partially sectional view of a first example of a floating disc brake according to the prior art, which is seen from an outer diameter side.
Figure 58:
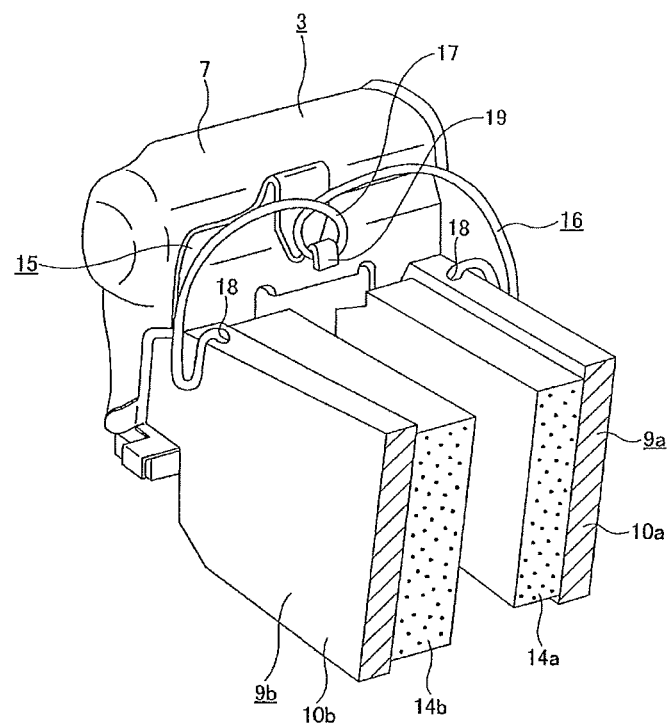
FIG. 58 is a partially cut perspective view of a second example of the prior art.
Figure 59:
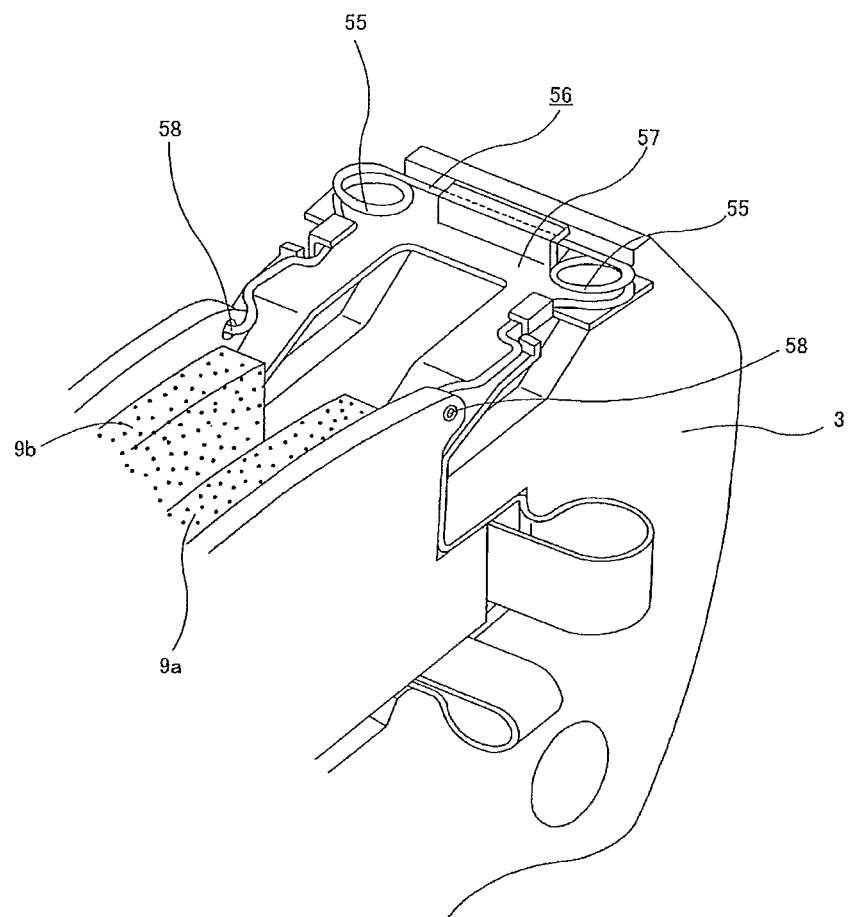
FIG. 59 is a perspective view of a third example of the prior art with parts being removed.

Also in the second embodiment using the return spring 16b having the above configuration, when assembling the floating disc brake, the return spring 16b is mounted to the pad clip 15a by using the constraining sections 24, 24 provided at both axial end portions of the pad clip 15a. That is, as shown in FIG. 9, an assembly of the pad clip 15a and the return spring 16a (inner spring element 26a and outer spring element 26b) is configured. To this end, specifically, at a state where both the outer arm sections 28b, 28b configuring the return spring 16b are elastically deformed in the approaching direction each other, the protruding pieces 25, 25 formed at the pad clip 15a are respectively inserted into the coil sections 27a, 27a without rattling and then the outer arm sections 28b, 28b are elastically returned (the elastic deformation is released). Thereby, the pair of abutting sections 31, 31 configuring the return spring 16b are elastically abutted on the inner surfaces of the respective constraining sections 24, 24 by the elastic restoring force of the return spring 16b. In other words, both the abutting sections 31, 31 are made to extend between the inner surfaces of the respective constraining sections 24, 24. At this state, the return spring 16b is mounted to the pad clip 15a. Also in the second embodiment, the assemblies of the pad clips 15a and the return springs 16b are mounted to the support 3 (refer to FIG. 1, for example) and then both the pads 9a, 9b (refer to FIG. 1, for example) are mounted to the support 3. Also in the second embodiment, as required, as shown with the dashed-two dotted line in FIG. 9, the axially central portion of the connection arm section 35 configuring the return spring 16b is made to protrude in a circumferential direction getting away from the caliper 2 (refer to FIGS. 27, 28 and 57) and in the diametrically outer side, thereby forming a deviation preventing piece 40a. The deviation preventing piece 40a is engaged on the backside of the connection section 23 configuring the pad clip 15a to thus prevent the return spring 16b from separating from the pad clip 15a. When the deviation preventing piece 40a is provided, the deviation preventing piece 40a is inserted between the leg sections 22, 22RL with being inclined with respect to the pad clip 15a and the posture of the return spring 16b is then returned to thus mount the return spring 16b to the pad clip 15a.

In the second embodiment using the return spring 16b having the above described configuration and capable of performing the mounting operation as described above, the return spring 16b is integrally formed. Thereby, compared to the case where the separate structures are adopted, like the first embodiment, it is possible to reduce the number of parts and the number of mounting processes to the pad clip 15a. Also, both the coil sections 27, 27 are connected by the connection arm section 35, so that it is possible to omit the engaging sections 29 (refer to FIGS. 4 to 7, for example) for receiving the reactive force to the pressing of the returning sections 33, 33 to the respective pads 9a, 9b. Therefore, it is possible to perform the assembling operation (the operation of mounting the pad clips 15a and the return springs 16b) more simply.

The other configurations and operational effects are the same as those of the first embodiment.

Third Embodiment

FIGS. 10 to 18 show a third embodiment of the invention. The features of this embodiment are that the support structure of a return spring 16c to the pad clip 15b is different from the first embodiment. Since the basic structures of the pad clip 15b and the return spring 16c are the substantially same as those of the first embodiment, the description of the common parts are omitted or simplified. Hereinafter, the features of the third embodiment are described.

Figure 16:
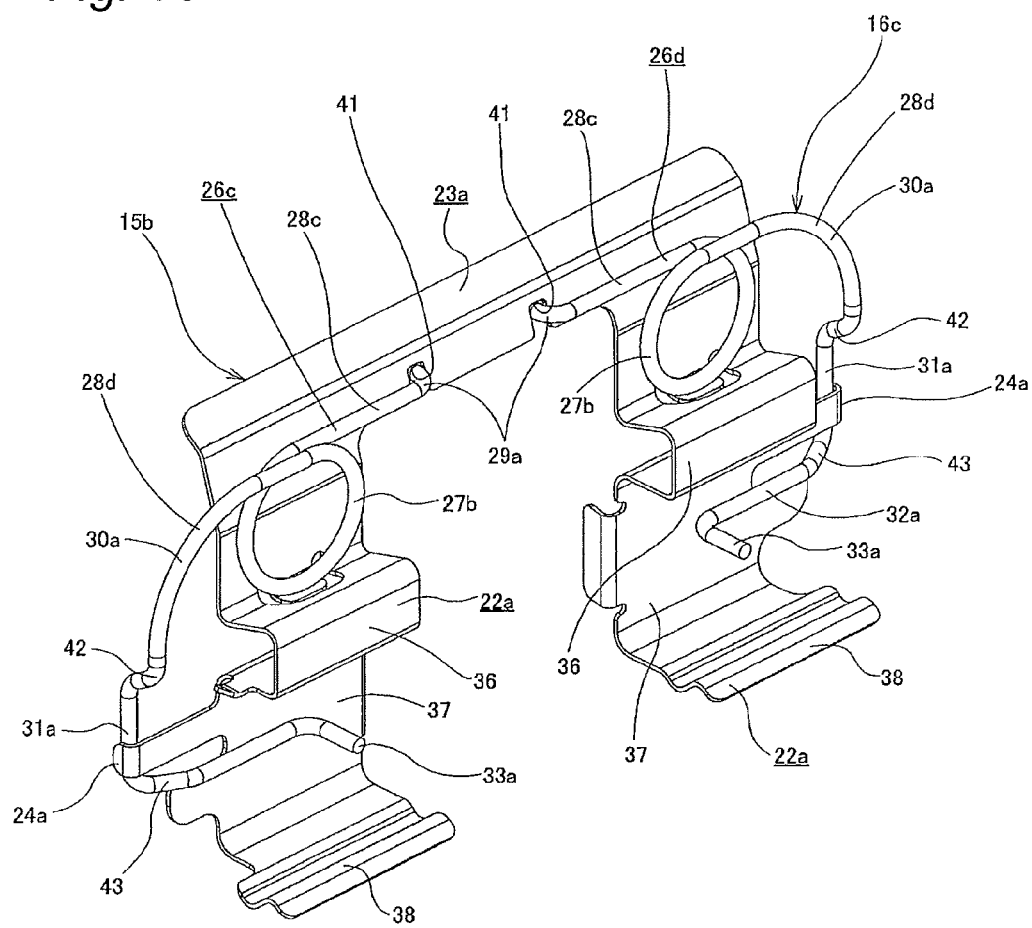
FIG. 16 is a perspective view showing a state (assembly) where a return spring is mounted to a pad clip shown in FIG. 10, which is seen from an outer diameter side and a front side.

As shown in FIG. 16, also in the third embodiment, the pad clip 15b is configured by connecting diametrically outer end portions of a pair of axially spaced leg sections 22a, 22a by a connection section 23a. Particularly, in the third embodiment, the connection section 23a is formed with a pair of engaging notches 41, 41 for engaging parts (engaging sections 29a that will be described later) of the respective return springs 16c. The respective engaging notches 41, 41 are opened to a diametrically inner end edge of the connection section 23a and are spaced in the axial direction. Also, a diametrical depth of each of the engaging notches 41, 41 is twice as large as the line diameter of the return spring 16c and an axial width thereof is slightly larger than the line diameter. In the meantime, although not shown, instead of the engaging notches 41, 41, the connection section 23a may be formed with a pair of engaging holes penetrating the connection section 23a in the circumferential direction (plate thickness direction) and the engaging sections 29a, 29a that will be described later may be engaged into the respective engaging holes.

Also, in the third embodiment, while the connection section 23a are formed with the engaging notches 41, 41, the outer-diametrically biased parts of the respective leg sections 22a, 22a, i.e., the parts bent from the diametrically outer surfaces of the respective positioning step sections 36, 36 toward a diametrically outer side are configured by simple flat surfaces. That is, in the third embodiment, the protruding pieces 25 (refer to FIGS. 1 and 7, for example) of the first and second embodiments are omitted.

Also, a pair of constraining sections 24a, 24a is provided at both axial end portions of each of the pad clips 15b so as to mount the respective return springs 16c to the respective pad clips 15b at a state before the inner and outer pads 9a, 9b are mounted. Particularly, in the third embodiment, each of the constraining sections 24a, 24a is formed by bending a part of the torque receiving section, which is biased to the leading end side, toward an opposite side to the pads 9a, 9b in the circumferential direction with extending in a direction axially separating from each of the torque receiving sections 37, 37 provided at inner-diametrically biased parts of the respective leg sections 22a, 22a. Thereby, in the third embodiment, the respective constraining sections 24a, 24a are provided (offset) at the opposite sides to the pads 9a, 9b in the circumferential direction than the inner surfaces (surfaces circumferentially facing the circumferential end surfaces of the engaging protruding pieces 21, 21) of the respective torque receiving sections 37, 37.

Also, in order to separate the friction surfaces of the linings 14a, 14b configuring the respective pads 9a, 9b from both side surfaces of the rotor 1 (refer to FIG. 11) as the braking is released, the respective return springs 16c, 16c are provided at both circumferential end portions of the respective pads 9a, 9b. Also in the third embodiment, each of the return springs 16c is configured by an inner spring element 26c and an outer spring element 26d, which are separate elements. As shown in FIG. 18, each of the spring elements 26c, 26d is a torsion coil spring that is formed by bending a wire rod of stainless spring steel such as piano line and in which base sections of a pair of arm sections 28c, 28d (inner arm section 28c, outer arm section 28d) continue from a coil section 27b provided at an axially central portion of a diametrically outer end-biased part.

Figure 18A:
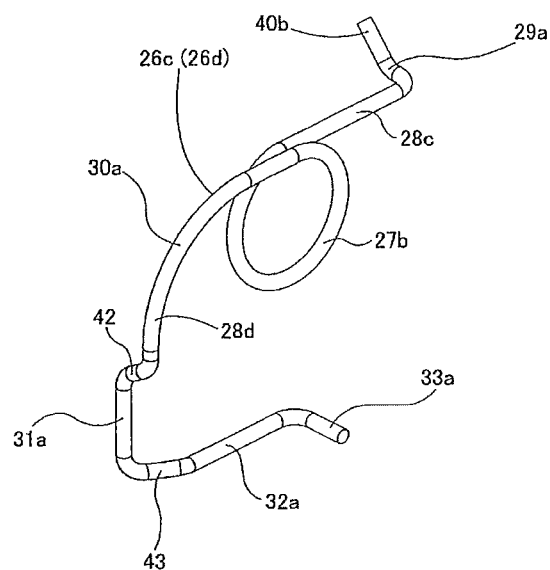
FIGS. 18A and 18B show two examples of one spring element configuring the return spring shown in FIG. 10.
Figure 18B:
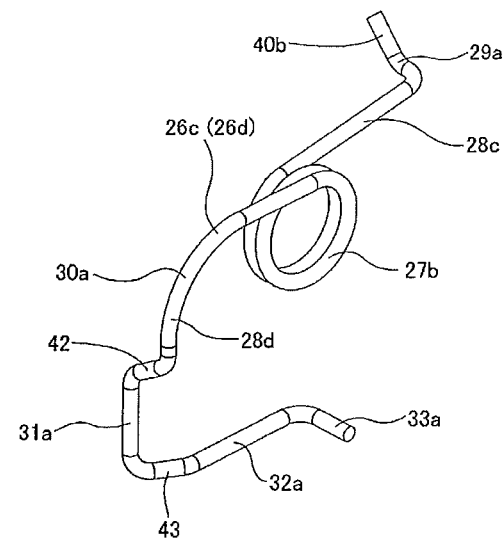

Particularly, in the third embodiment, a diameter of the coil section 27b is made to be larger than the diameter of the coil section 27 (27a) configuring the return spring 16a (16b) used in the first and second embodiments. Thereby, at a state where the respective return springs 26c, 26d are mounted to the respective pad clips 15b, it is possible to bring the diametrically inner end portions of the respective coil sections 27b into contact with the diametrically outer surfaces of the respective positioning step sections 36 provided at the diametrically central portions of the respective leg sections 22a. In the meantime, when implementing the third embodiment, the number of windings of the respective coil sections 27b is not particularly problematic. As shown in FIG. 18A, the coil section may be wound one time, or as shown in FIG. 18B, the coil section may be wound twice or more. Also, the number of windings of the coil section 27b may be different between the inner spring element 26c and the outer spring element 26d. In this case, preferably, the number of windings of the coil section 27b configuring the outer spring element 26d is made to be larger than that of the coil section 27b configuring the inner spring element 26c and the wire rod configuring the outer spring element 26d is made to be thicker than the wire rod configuring the inner spring element 26c. Thereby, the returning force to be applied to the outer pad 9b is made to be larger than the returning force to be applied to the inner pad 9a, without increasing the constant of spring.

Also, regarding both the arm sections 28c, 28d, the leading end portion of the inner arm section 28c axially extending toward the rotor 1 is circumferentially bent toward the pad clip 15b (opposite side to the pads 9a, 9b) and thus forms the engaging section 29a. The engaging sections 29a are engaged into the respective engaging notches 41 of the connection section 23a without the rattling. Specifically, the respective engaging sections 29a are engaged with the respective engaging notches 41 with the elastic urging force being applied toward the diametrically outer side so that the respective engaging sections cannot be axially displaced. Also, the leading end portion of each of the engaging sections 29a is bent toward the diametrically outer side, thereby forming a deviation preventing piece 40b. The respective deviation preventing pieces 40b are engaged on the backside of the connection section 23a, thereby preventing the respective return springs 16c from separating from the respective pad clips 15b.

The outer arm section 28d extending toward the opposite side to the rotor 1 has a substantial U shape, when seen from the front, and has a curved section 30a, an outer diameter-side bent section 42, an abutting section 31a, an inner diameter-side bent section 43, an extension arm section 32a and a returning section 33a in order from a base end side toward the leading end portion. The curved section 30a has a quadrant shape and is bent in a diametrically inner direction as it is directed toward the leading end. Also, the outer diameter-side bent section 42 is circumferentially bent at a substantial right angle from an inner diameter-side end portion of the curved section 30a toward the opposite side to the pads 9a, 9b. Also, the abutting section 31a is a part that abuts on a surface (inner surface) of each of the constraining sections 24a, 24a configuring the respective pad clips 15b, which surface faces the side surface of the rotor 1, by the elastic restoring force of each spring element 26c (26d), is linear and extends perpendicularly from an inner diameter-side end portion of the outer diameter-side curved section 42 toward the diametrically inner side. Also, the inner diameter-side bent section 43 is bent from an inner diameter-side end portion of the abutting section 31a toward the respective pads 9a, 9b in the circumferential direction and toward the rotor 1 in the axial direction. By this configuration, the abutting section 31a is provided (offset) at the opposite side to the pads 9a, 9b in the circumferential direction than the inner surfaces (surfaces circumferentially facing the circumferential end surfaces of the engaging protruding pieces 21, 21) of the respective torque receiving sections 37, 37.

Also, the extension arm section 32a is linear, extends from the leading end portion of the inner diameter-side bent section 43 in the direction coming close to the rotor 1 and is oriented in substantially parallel with the central axis of the rotor 1. Therefore, also in the third embodiment, in order to prevent the extension arm section 32a and an circumferential end edge of each of the pressure plates 10a, 10b from interfering with each other, the engaging protruding pieces 21, 21 of the respective pressure plates 10a, 10b are provided at the circumferential end edges with the recesses 34 (34a). An axially central portion of the extension arm section 32a is axially inserted into each recess 34 (34a). Also, the returning section 33a is bent from the leading end portion of the extension arm section 32a in a direction (opposite side to the engaging section 29a) circumferentially separating from the pad clip 15a and is contacted on the inner surface of each of the engaging protruding pieces 21, 21. Also, the diametrical position of the returning section 33a is the substantially same as the diametrical position of the friction center of each of the linings 14a, 14b configuring the respective pads 9a, 9b.

Figure 17B:
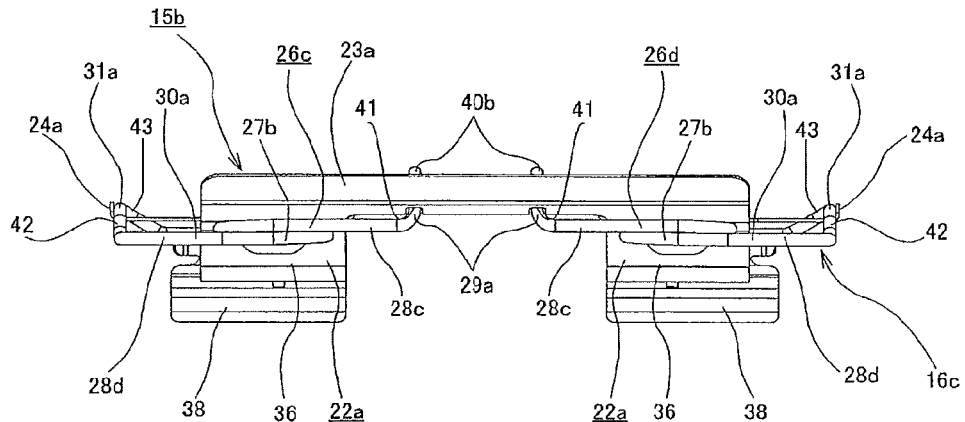
Figure 17A:
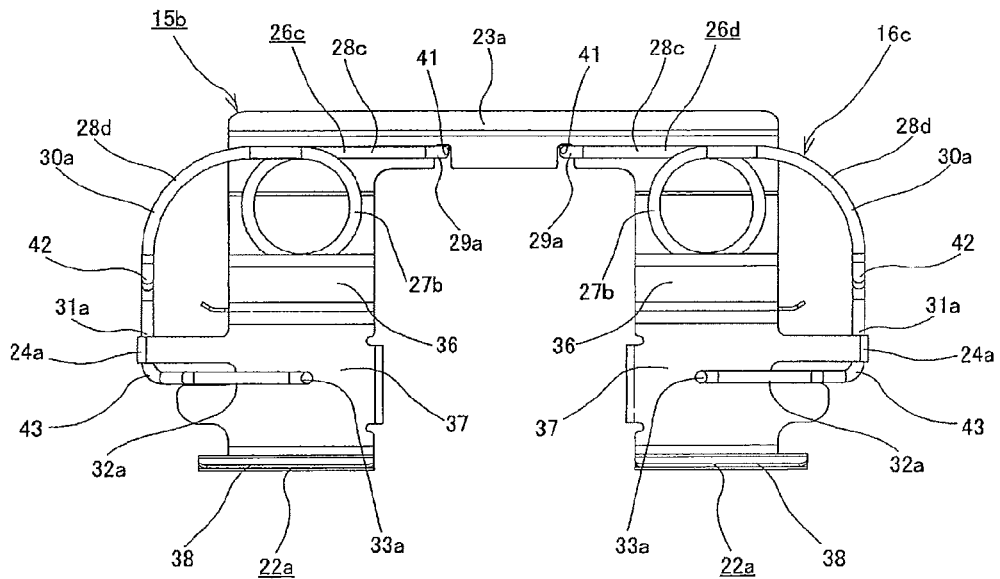

In the third embodiment having the pad clips 15b and the return springs 16c, when assembling the floating disc brake, the return springs 16c are mounted (preset) to the pad clips 15b, as shown in FIGS. 16 and 17, at a state before the respective pads 9a, 9b are mounted to the support 3. That is, as shown in FIGS. 16 and 17, an assembly of the pad clip 15b and the return spring 16c (inner spring element 26c and outer spring element 26d) is configured. To this end, for example, at a state where the engaging sections 29a provided at the leading end portions of the inner arm sections 28c configuring the respective spring elements 26c, 26d are inserted (engaged) into the engaging notches 41 of the connection section 23a, the outer arm sections 28d are elastically deformed in the approaching direction toward the inner arm sections 28c and then the outer arm sections 28d are elastically returned (the elastic deformation is released). Thereby, the engaging section 29 is engaged into the engaging notch 41 with the elastic urging force being applied in the diametrically outer side so that the respective engaging sections cannot be axially displaced, and the abutting section 31a is enabled to abut on the inner surface of the constraining section 24a with the elastic urging force being axially applied in the direction separating from the rotor 1. Also, at this state, the inner diameter-side end portion of the coil section 27b is elastically pressed to the outer diameter-side surface of each positioning step section 36 toward the diametrical inner side. As a result, in the third embodiment, both the spring elements 26c, 26d (return spring 16c) are mounted to the pad clip 15b with being positioned in the diametrical and axial directions (an assembly of the pad clip 15b and the return spring 16c is configured). Also, in the third embodiment, since the deviation preventing pieces 40b and the abutting sections 31a of both the spring elements 26c, 26d are arranged on the backside of the pad clip 15b and the remaining sections are arranged on the front face side, both the spring elements 26c, 26d are circumferentially positioned with respect to the pad clip 15b.

Figure 10:
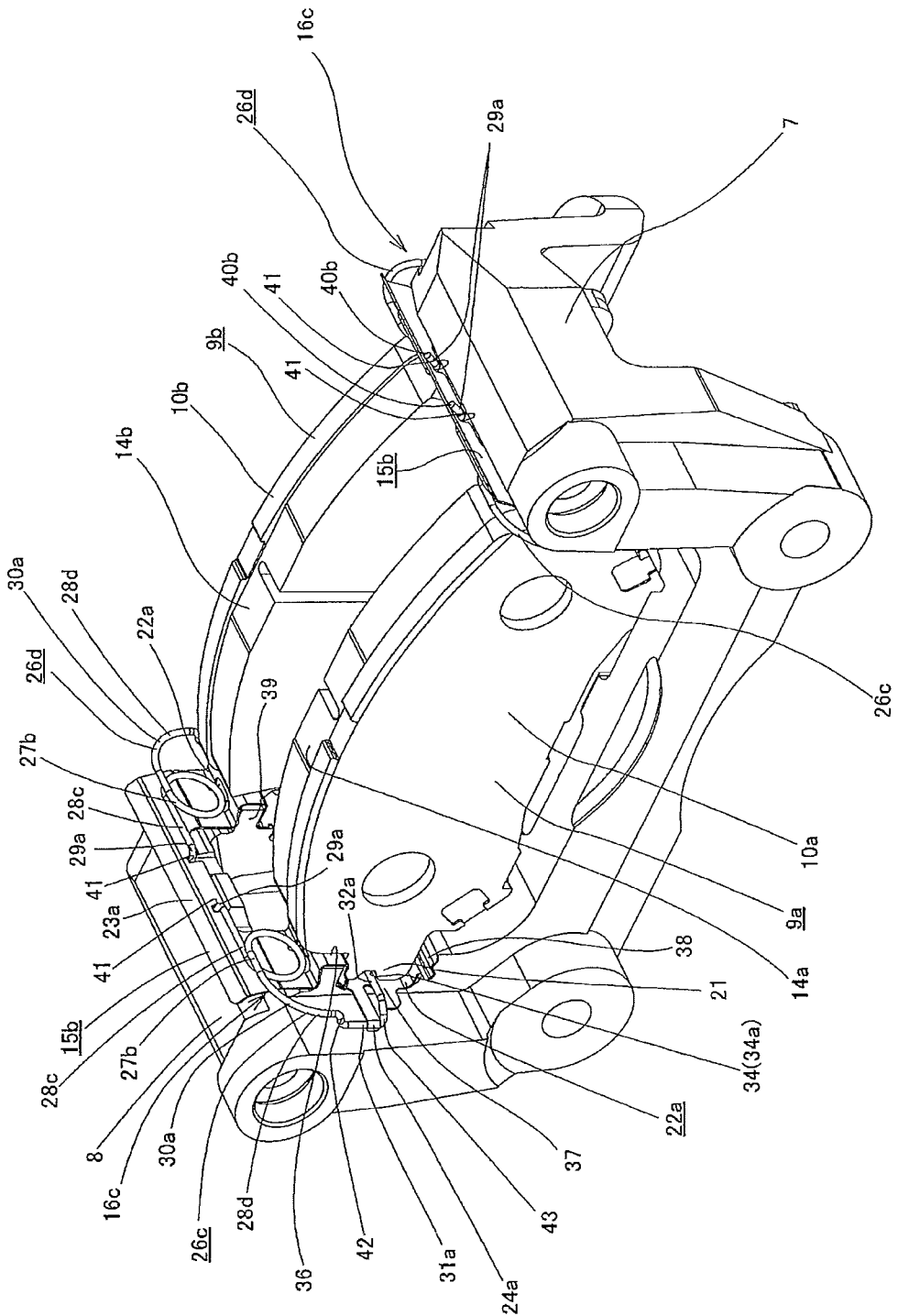
FIG. 10 is a perspective view of a floating disc brake according to a third embodiment of the invention, which is seen from an outer diameter side and an inner side with a caliper being omitted.
Figure 11:
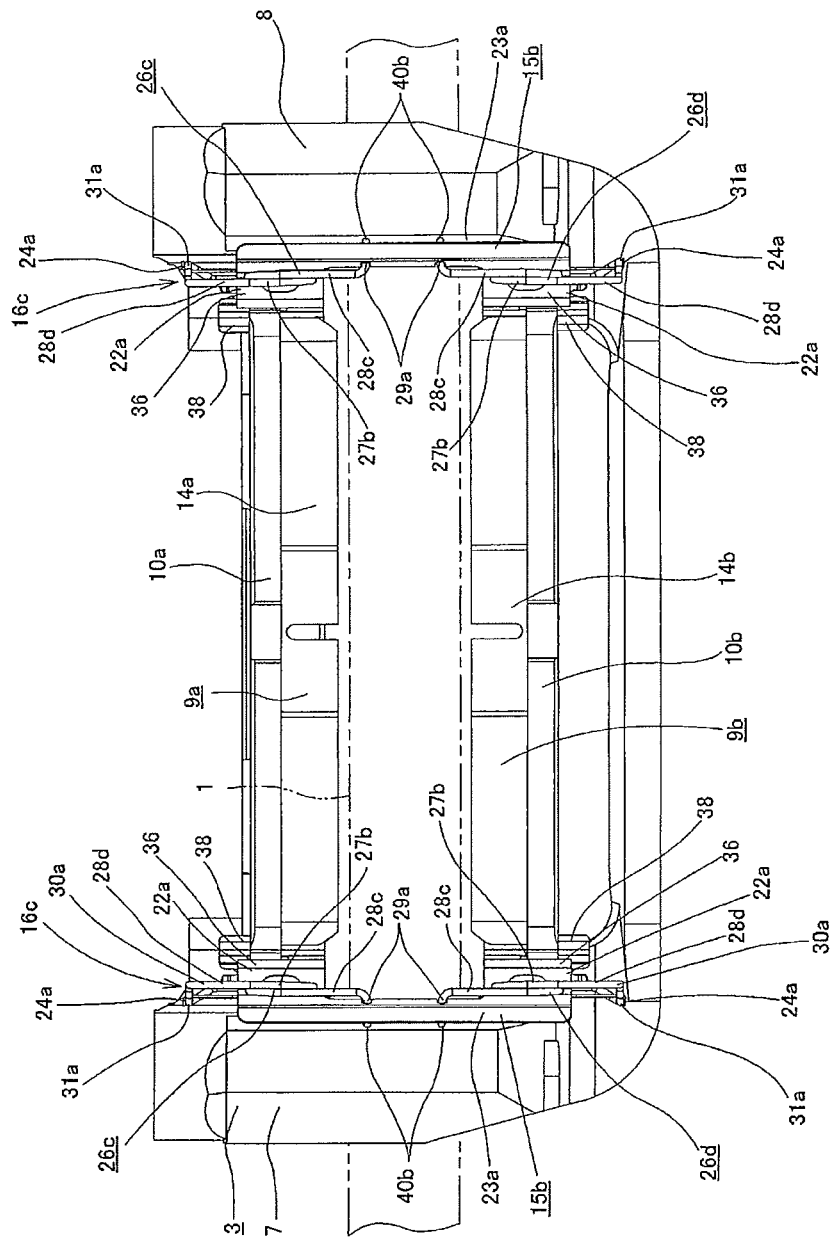
FIG. 11 is an orthographic view of the floating disc brake shown in FIG. 10, which is seen from an outer diameter side.
Figure 12:
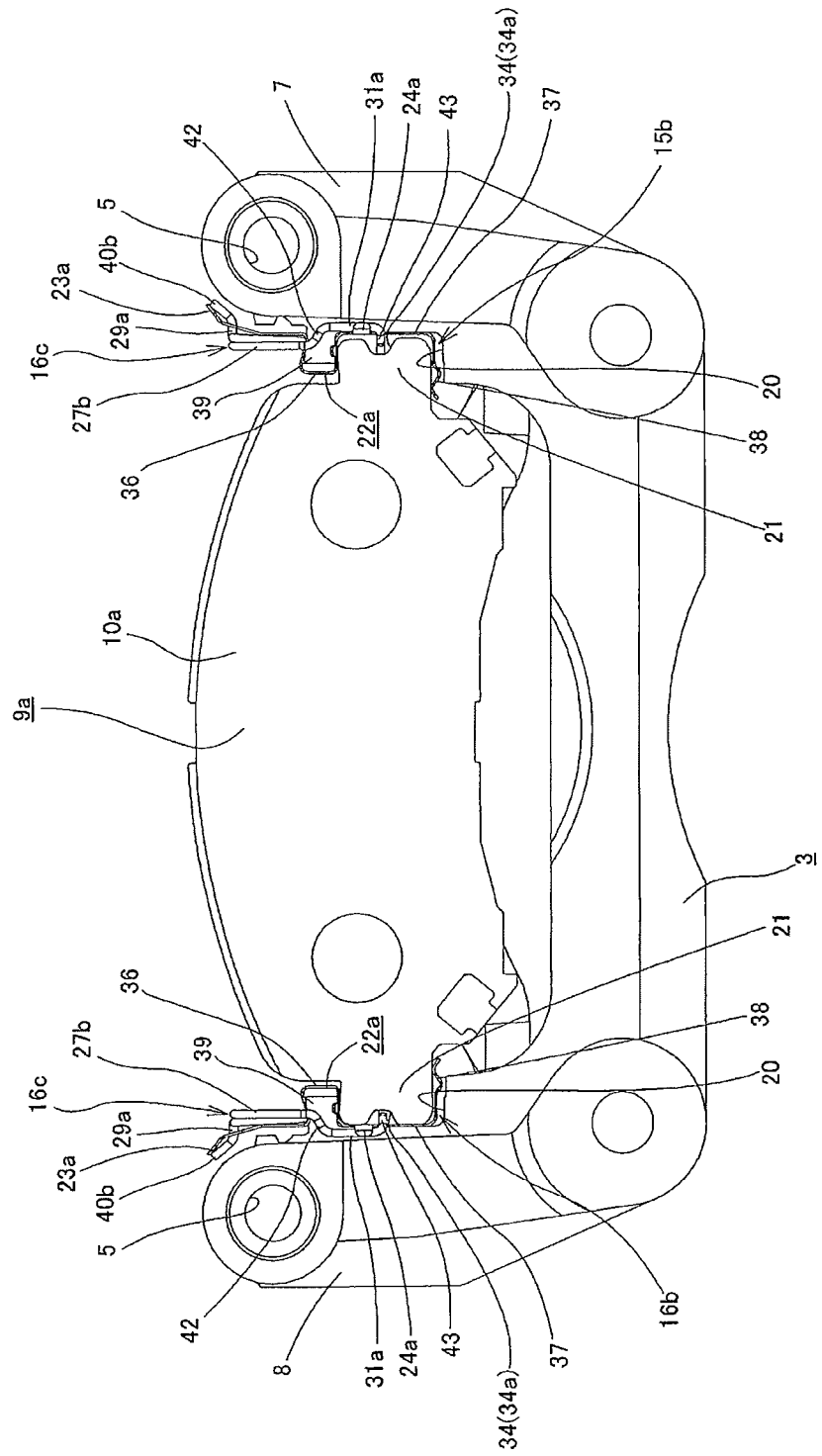
FIG. 12 is an orthographic view of the floating disc brake shown in FIG. 10, which is seen from an inner side.
Figure 13:
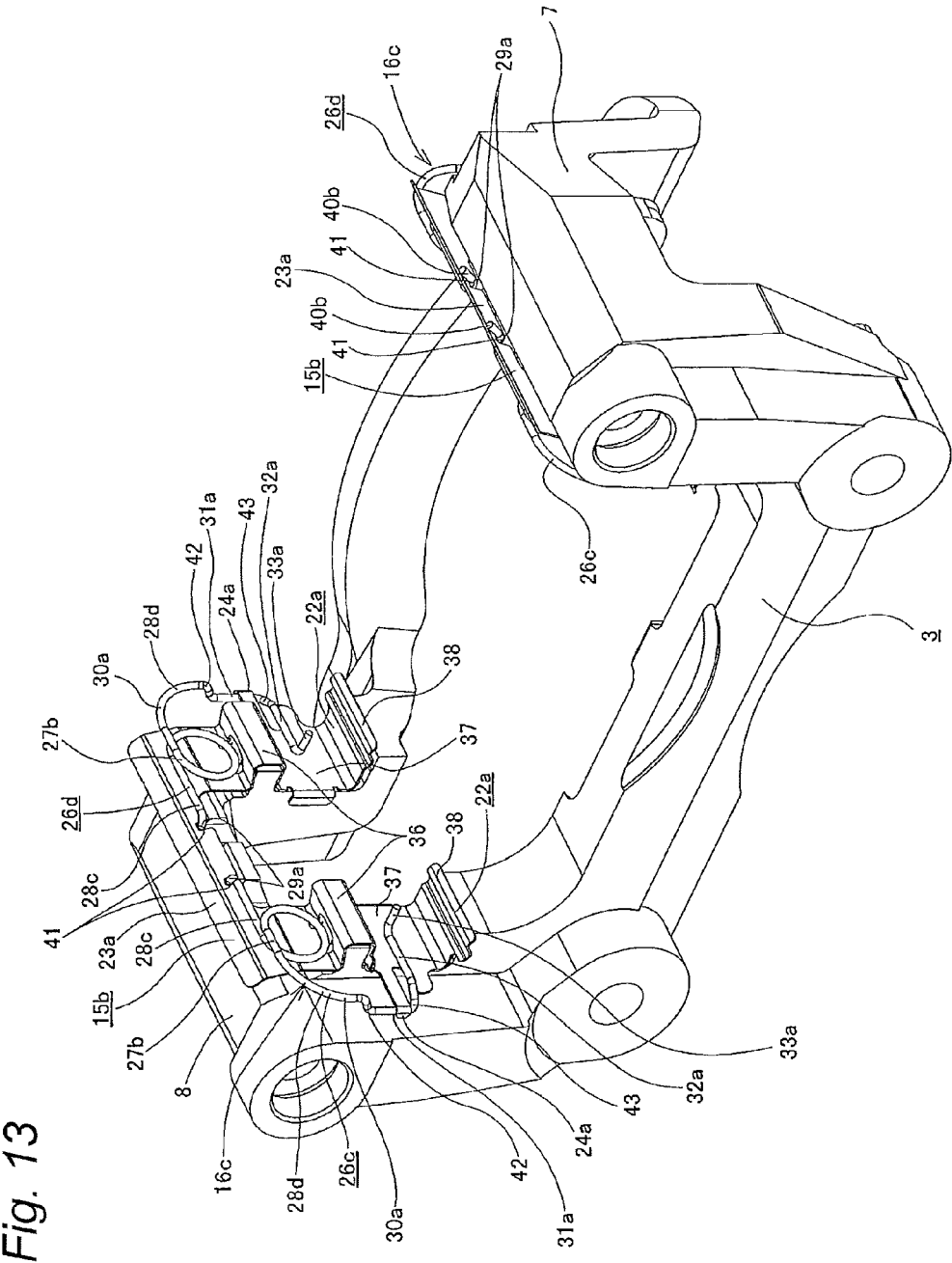
FIG. 13 is a perspective view showing the floating disc brake shown in FIG. 10 before a pad is mounted.
Figure 14:
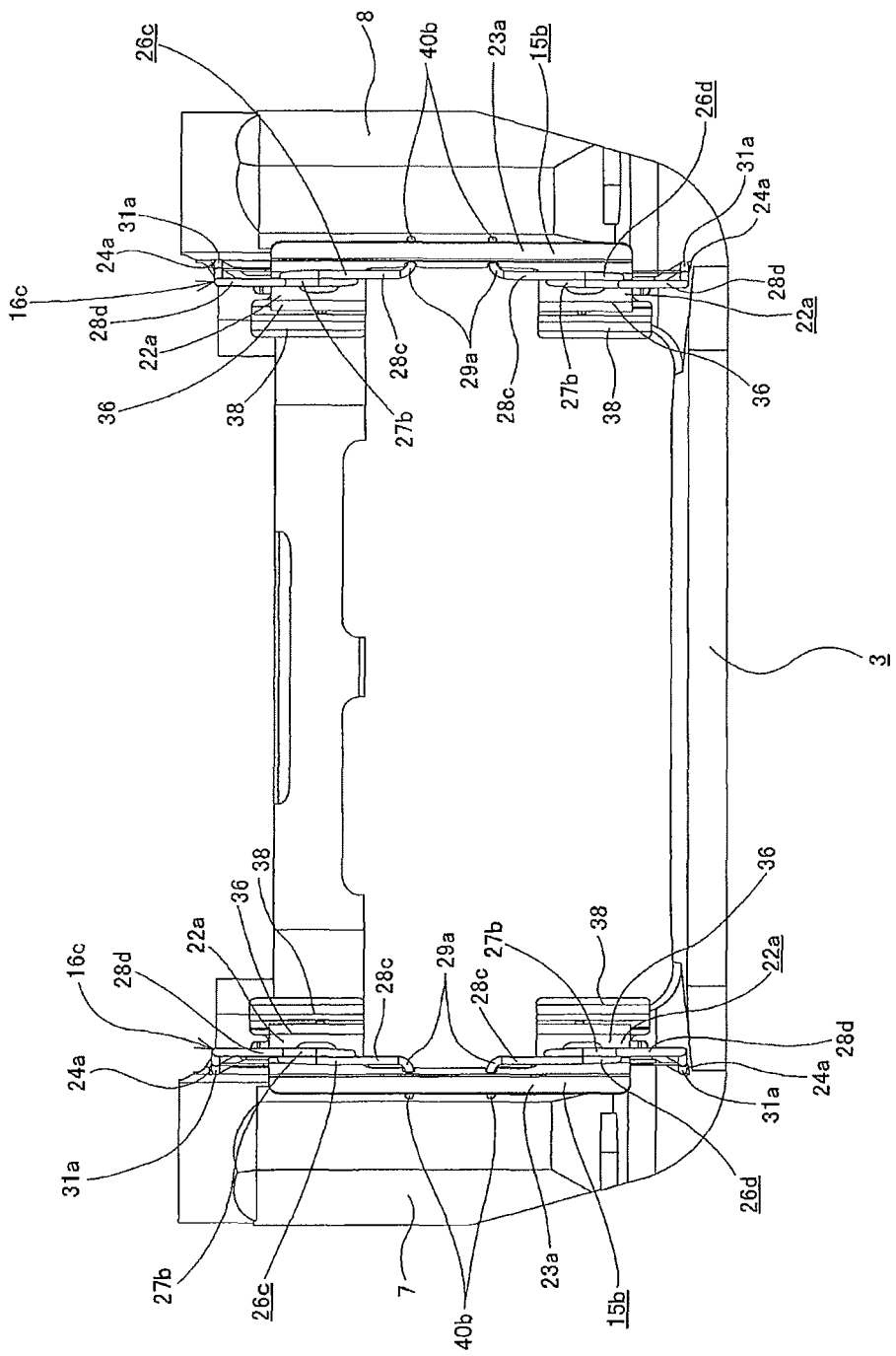
FIG. 14 is an orthographic view of the floating disc brake shown in FIG. 10, which is seen from an outer diameter side.
Figure 15:
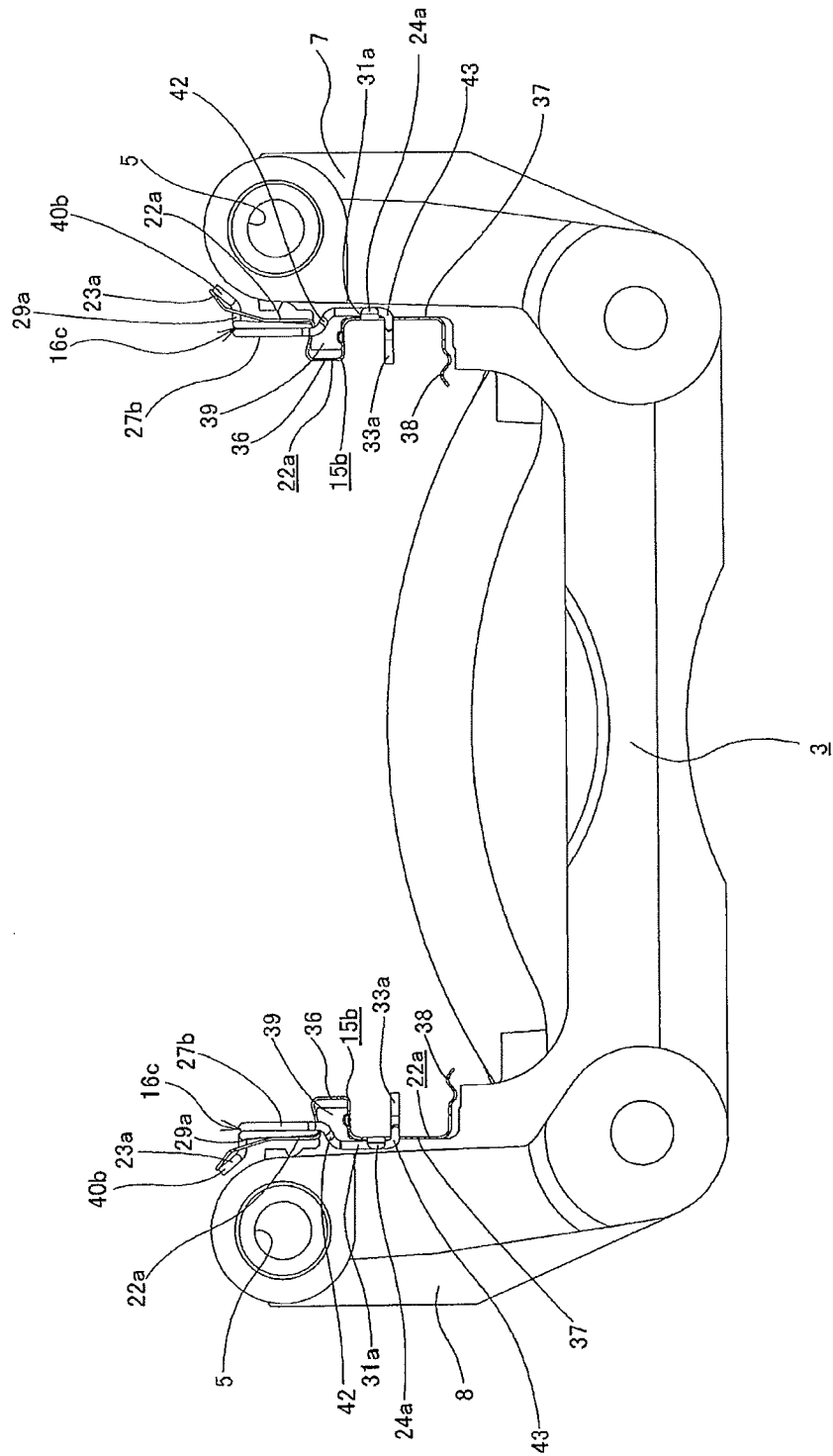
FIG. 15 is an orthographic view of the floating disc brake shown in FIG. 10, which is seen from an inner side.

After the return springs 16c are mounted to the pad clips 15b as described above, the assemblies of the pad clips 15b and the return springs 16c are mounted to the support 3 (refer to FIGS. 13 to 15) and then both the pads 9a, 9b are mounted to the support 3, as shown in FIGS. 10 to 12. Also, at the state where both the pads 9a, 9b are mounted to the support 3, the elastic urging force from the return springs 16c is not applied to both the pads 9a, 9b yet.

Also in the floating disc brake of the third embodiment having the above configuration and assembled as described above, when mounting the respective pad clips 15b, it is possible to handle the respective pad clips 15b and the return springs 16c as integral articles (assemblies, subassemblies), like the first and second embodiments. Therefore, it is possible to perform the operations of mounting the respective pad clips 15a and the respective return springs 16a at the same time, thereby facilitating the mounting operation. As a result, it is possible to improve the assembling performance, thereby reducing the assembling cost. Also, at a state just after both the pads 9a, 9b are mounted (the caliper is not mounted yet), the elastic urging force is not applied to both the pads 9a, 9b. Thus, it is not necessary to consider a configuration of preventing both the pads 9a, 9b from separating axially from the support 3. Accordingly, the assembling operation or conveying operation is not troublesome. Also, since it is possible to handle the respective pad clips 15a and the respective return springs 16a as integral articles (assemblies), it is possible to reduce the part management cost.

Also, in the third embodiment, the respective spring elements 26c, 26d are positioned in the axial, diametrical and circumferential directions with the respective return springs 16c being mounted to the respective pad clips 15b. Therefore, it is possible to stabilize the postures (shapes) of the respective spring elements 26c, 26d. Therefore, it is possible to effectively prevent the respective return springs 16c (spring elements 26c, 26d) from separating from the respective pad clips 15a or the mounting positions from deviating. As a result, it is possible to improve the operability of the mounting operation of the respective pad clips 15a and the respective return springs 16a to the support 3. Also, it is possible to apply the stable returning force to the respective pads 9a, 9b by the respective return springs 16c.

Also, the respective constraining sections 24a, 24a and the respective abutting sections 31a, 31a are circumferentially offset toward the opposite side to the pads 9a, 9b than the inner surfaces of the respective torque receiving sections 37, 37 (surfaces facing the circumferential end surfaces of the engaging protruding pieces 21, 21). Therefore, it is possible to perform the mounting operation of both the pads 9a, 9b just by parallel moving both the pads 9a, 9b in the axial direction. Thus, the mounting operation is easy, so that it is possible to improve the operation efficiency.

The other configurations and operational effects are the same as those of the first embodiment.

Fourth Embodiment

FIGS. 19 to 23 show a fourth embodiment of the invention. The features of the fourth embodiment are that the support structure of a return spring 16d to a pad clip 15c is different from the first to third embodiments. Since the basic structures of the pad clip 15c and the return spring 16d are the substantially same as those of the first embodiment, the description of the common parts are omitted or simplified. Hereinafter, the features of the fourth embodiment are described.

Also in the fourth embodiment, each pad clip 15c is configured by connecting diametrically outer end portions of a pair of axially spaced leg sections 22b, 22b by a connection section 23b. Particularly, in the fourth embodiment, the respective leg sections 22b, 22b are provided at the diametrically outer end portions with folding sections 44, 44 for supporting the coil sections 27c, 27c configuring the return spring 16d. Specifically, the folding sections 44, 44 are formed by circumferentially folding a diametrically central portion into a substantial U shape toward the pads 9a, 9b with being bent at a substantial right angle from the diametrically outer surfaces of the positioning step sections 36, 36 in the diametrically outer side. In the meantime, a diametrical size between the diametrically inner surfaces of the folding sections 44, 44 and the diametrically outer surfaces of the positioning step sections 36, 36 is slightly larger than a diameter of each coil section 27c. Also, a gap between both side surfaces of each of the folding sections 44, 44, which side surfaces face each other in the circumferential direction, is slightly larger than a thickness of each coil section 27c.

Also in the fourth embodiment, a pair of constraining sections 24b, 24b is provided at both axial end portions of each of the pad clips 15c. Particularly, in the fourth embodiment, each of the constraining sections 24b, 24b is formed by bending a leading end portion (end portion at the opposite rotor-side) toward the opposite side to the pads 9a, 9b in the circumferential direction with extending from a part biased to the diametrically outer surface of each of the positioning step sections 36, 36 and the diametrically inner end side of each of the folding sections 44, 44 toward the opposite side to the rotor in the axial direction. Also in the fourth embodiment, the respective constraining sections 24b, 24b are offset toward the opposite side to the pads 9a, 9b in the circumferential direction than the inner surfaces (surfaces facing the circumferential end surfaces of the engaging protruding pieces 21, 21) of the torque receiving sections 37, 37.

Also, in the fourth embodiment, the diametrically outer surfaces of the positioning step sections 36, 36 configuring the respective leg sections 22b, 22b are formed with engaging holes 45, 45 for engaging parts (leading end portions of inner arm sections 28e of spring elements 26e, 26f) of the return springs 16d, with penetrating in the diametrical direction.

Figure 23:
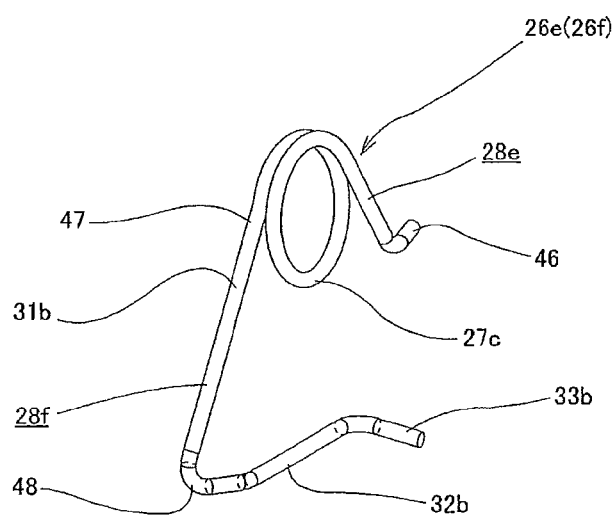
FIG. 23 is a perspective view showing only one spring element configuring the return spring shown in FIG. 19 and elastically deformed to a mounted state to the pad clip.

Also, in order to separate the friction surfaces of the linings 14a, 14a configuring the pads 9a, 9b from both side surfaces of the rotor 1 (refer to FIG. 20) as the braking is released, the respective return springs 16d, 16d are provided at both circumferential end portions of the respective pads 9a, 9b. Each of the return springs 16d, 16d is composed of an inner spring element 26e and an outer spring element 26f, which are separate elements. As shown in FIG. 23, each of the spring elements 26e, 26f is a torsion coil spring that is formed by bending a wire rod of stainless spring steel such as piano line and in which base sections of a pair of arm sections 28e, 28f continue from a coil section 27c provided at an axially central portion of a diametrically outer end side-biased part.

Particularly, in the fourth embodiment, each coil section 27c is mounted to a part surrounded by the diametrically outer surface of each abutting step section 36 and each folding section 44 without the rattling. Also, of both the arm sections 28e, 28f, the leading end portion of the inner arm section 28e extending toward the rotor 1 in the axial direction and toward the inner side in the circumferential direction is bent toward the rotor 1, thereby configuring an engaging section 46. The respective engaging sections 46 are engaged in the engaging holes 45 formed at the positioning step sections 36 from the diametrically outer side. Also, at this state, the leading end-biased part of each inner arm section 28e is abutted in an opening of each engaging hole 45 with the elastic urging force being axially applied toward the rotor 1.

Also, the outer arm section 28f extending to the opposite side to the rotor 1 has a substantial L shape, when seen from the front, and has a base end portion 47, a curved section 48, an extension arm section 32b and a returning section 33b in order from a base end side toward the leading end portion. The base end portion 47 has an abutting section 31b at its diametrically central portion and is linear. Also, the abutting section 31b is a part that abuts on a side edge (inner side edge) of the constraining section 24b, 24b configuring the pad clip 15c, which edge faces the side surface of the rotor 1, with the elastic urging force axially applied to the opposite side to the rotor 1, by the elastic restoring force of each of the spring elements 26e, 26f (coil sections 27c, 27c). Also, the bent section 48 is bent from the inner diameter-side end portion of the base end portion 47 toward the respective pads 9a, 9b in the circumferential direction and toward the rotor 1 in the axial direction.

Also, the extension arm section 32b is linear, extends from the leading end portion of the bent section 48 in the direction coming close to the rotor 1 and is oriented in substantially parallel with the central axis of the rotor 1. Therefore, also in the fourth embodiment, in order to prevent the extension arm section 32b and the circumferential end edge of each of the pressure plates 10a, 10b from interfering with each other, the engaging protruding pieces 21, 21 of the respective pressure plates 10a, 10b are provided at the circumferential end edges thereof with the recesses 34 (34a). An axially central portion of the extension arm section 32b is axially inserted into each recess 34 (34a). Also, the returning section 33b is bent from the leading end portion of the extension arm section 32b in a direction circumferentially separating from each pad clip 15a and is contacted on the inner surface of each of the engaging protruding pieces 21, 21. Also, the diametrical position of the returning section 33b is the substantially same as the diametrical position of the friction center of each of the linings 14a, 14b configuring the respective pads 9a, 9b.

Figure 22:
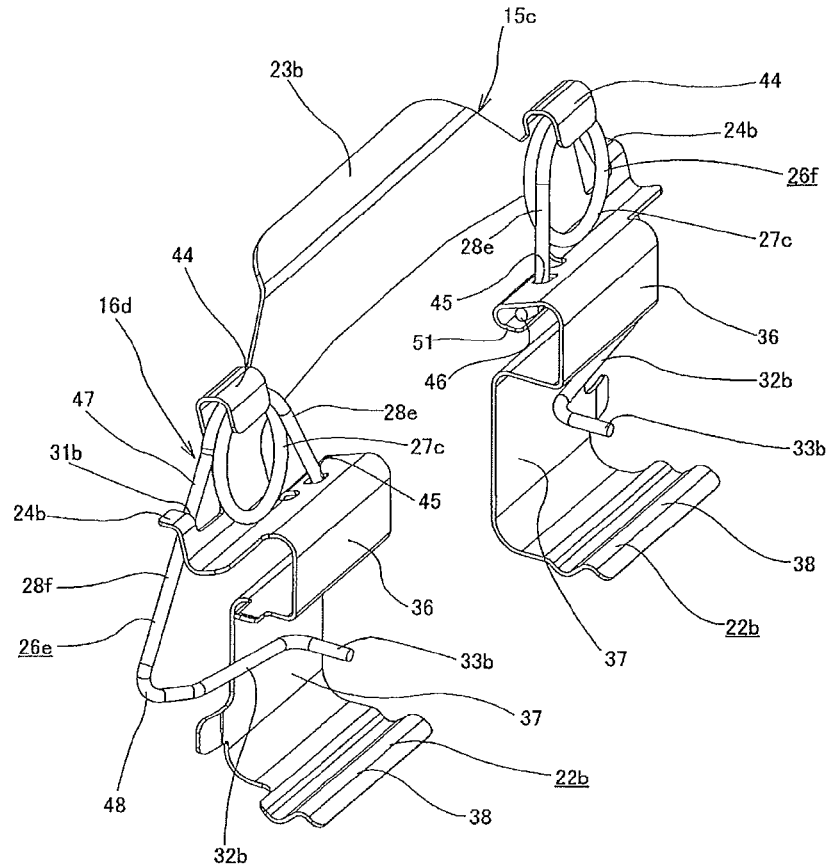
FIG. 22 is a perspective view showing a state (assembly) where a return spring is mounted to a pad clip shown in FIG. 19, which is seen from an outer diameter side and a front side.

In the fourth embodiment having the pad clips 15c and the return springs 16d, when assembling the floating disc brake, the return spring 16d is mounted (preset) to the pad clip 15c, as shown in FIG. 22, at a state before the respective pads 9a, 9b are mounted to the support 3. That is, as shown in FIG. 22, an assembly of the pad clip 15c and the return spring 16d (inner spring element 26e and outer spring element 26f) is configured. To this end, for example, the coil sections 27c configuring the respective spring elements 26e, 26f are mounted to the parts surrounded by the diametrically outer surfaces of the respective positioning step sections 36 and the respective folding sections 44. Then, at a state where the engaging sections 46 provided at the leading end portions of the inner arm sections 28e are engaged into the engaging holes 45 formed on the diametrically outer surfaces of the positioning step sections 36, the outer arm sections 28f are elastically deformed in the approaching direction toward the inner arm sections 28e and then the outer arm sections 28f are elastically returned (the elastic deformation is released). Thereby, the leading end side biased parts of the inner arm sections 28e are abutted in the openings of the respective engaging holes 45 with the elastic urging force being axially applied toward the rotor 1-side, and the abutting sections 31a are enabled to abut on the side edges of the constraining sections 24b with the elastic urging force being axially applied in the direction separating from the rotor 1 and toward the diametrically outer side. As a result, in the fourth embodiment, both the spring elements 26e, 26f (return spring 16d) are mounted to the pad clip 15c with being positioned in the diametrical, circumferential and axial directions (an assembly of the pad clip 15c and the return spring 16d is configured).

Figure 19:
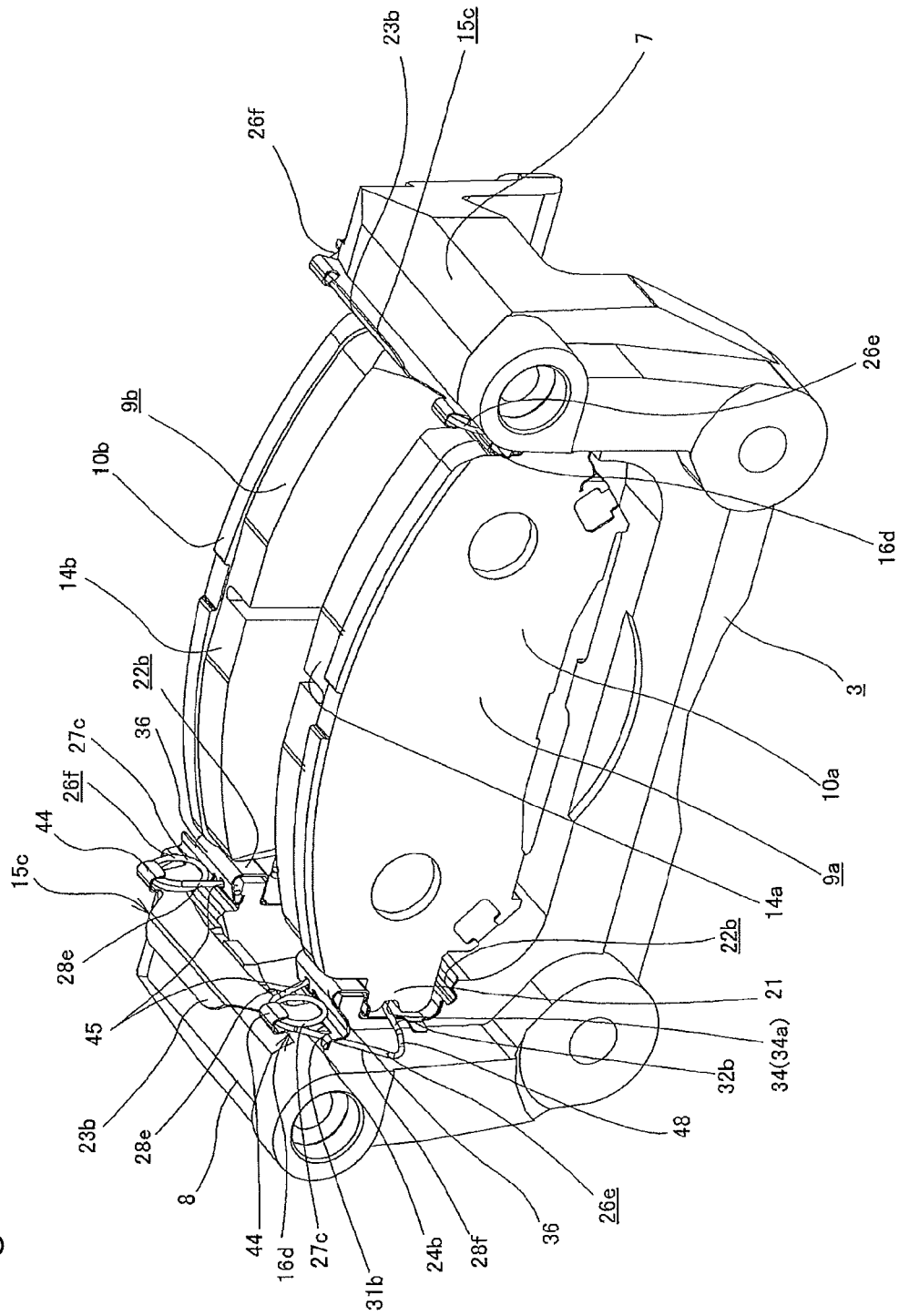
FIG. 19 is a perspective view of a floating disc brake according to a fourth embodiment of the invention, which is seen from an outer diameter side and an inner side with a caliper being omitted.
Figure 20:
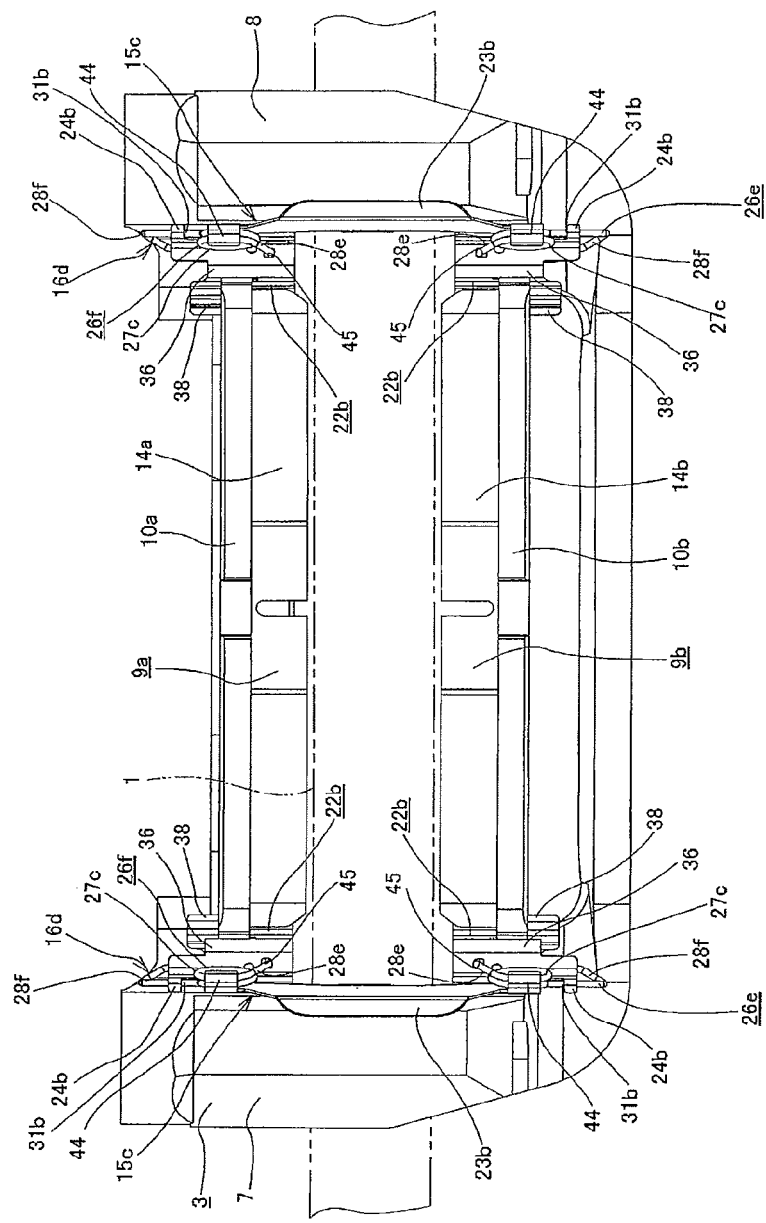
FIG. 20 is an orthographic view of the floating disc brake shown in FIG. 19, which is seen from an outer diameter side.
Figure 21:
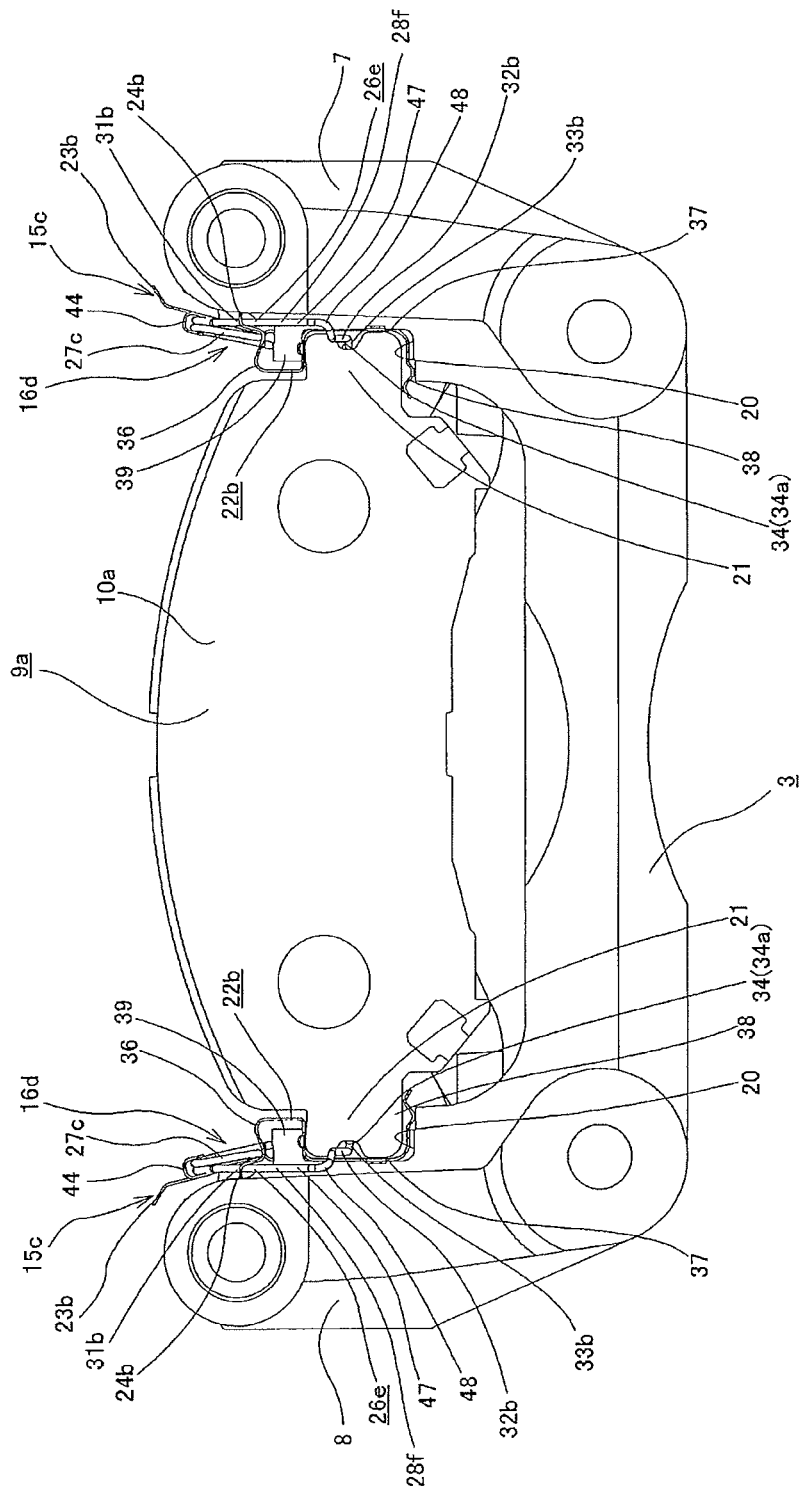
FIG. 21 is an orthographic view of the floating disc brake shown in FIG. 19, which is seen from an inner side.

After the return springs 16d are mounted to the pad clips 15c as described above, the assemblies of the pad clips 15c and the return springs 16d are mounted to the support 3 and then both the pads 9a, 9b are mounted to the support 3, as shown in FIGS. 19 to 21. Also in the fourth embodiment, at the state where both the pads 9a, 9b are mounted to the support 3, the elastic urging force from the return springs 16d is not applied to both the pads 9a, 9b yet.

Also in the floating disc brake of the fourth embodiment having the above configuration and assembled as described above, when mounting the respective pad clips 15b, it is possible to handle the respective pad clips 15b and the return springs 16c as integral articles (assemblies, subassemblies), like the first to third embodiments. Therefore, it is possible to perform the operations of mounting the respective pad clips 15a and the respective return springs 16a at the same time, thereby facilitating the mounting operation. As a result, it is possible to improve the assembling performance, thereby reducing the assembling cost. Also, at a state just after both the pads 9a, 9b are mounted (the caliper is not mounted yet), the elastic urging force is not applied to both the pads 9a, 9b yet. Thus, it is not necessary to consider a configuration of preventing both the pads 9a, 9b from separating axially from the support 3. Accordingly, the assembling operation or conveying operation is not troublesome. Also, since it is possible to handle the respective pad clips 15a and the respective return springs 16a as integral articles (assemblies), it is possible to reduce the part management cost.

Also, in the fourth embodiment, the respective spring elements 26e, 26f are positioned in the axial, circumferential and diametrical directions with the respective return springs 16d being mounted to the respective pad clips 15c. Therefore, it is possible to stabilize the postures (shapes) of the respective spring elements 26e, 26f. Therefore, it is possible to effectively prevent the respective return springs 16d (spring elements 26e, 26f) from separating from the respective pad clips 15c or the mounting positions from deviating. As a result, it is possible to improve the operability of the mounting operation of the respective pad clips 15c and the respective return springs 16d to the support 3. Also, it is possible to apply the stable returning force to the respective pads 9a, 9b by the respective return springs 16d with being mounted to the support 3 as described above. Also, in the pad clips 15c of the fourth embodiment, since the respective constraining sections 24c, 24c are provided at the diametrically outer surface parts of the positioning step sections 36, 36, it is possible to reduce the material cost, compared to the pad clips 15 (15a, 15b) of the first to third embodiments. That is, in the pad clips 15 (15a, 15b) of the first to third embodiments, the constraining sections 24, 24a are provided to axially extend from the torque receiving sections 36 in the direction getting away from each other, so that the amount of the extension is larger than that of the fourth embodiment. Therefore, the width size of the pad clip 15 (15a, 15b) upon the developing before bending the respective constraining sections 24, 24a is increased. Compared to this, in the pad clip 15c of the fourth embodiment, since it is possible to reduce the width size upon the developing, it is possible to suppress the material cost.

The other configurations and operational effects are the same as those of the first and third embodiments.

Fifth Embodiment

Figure 24:
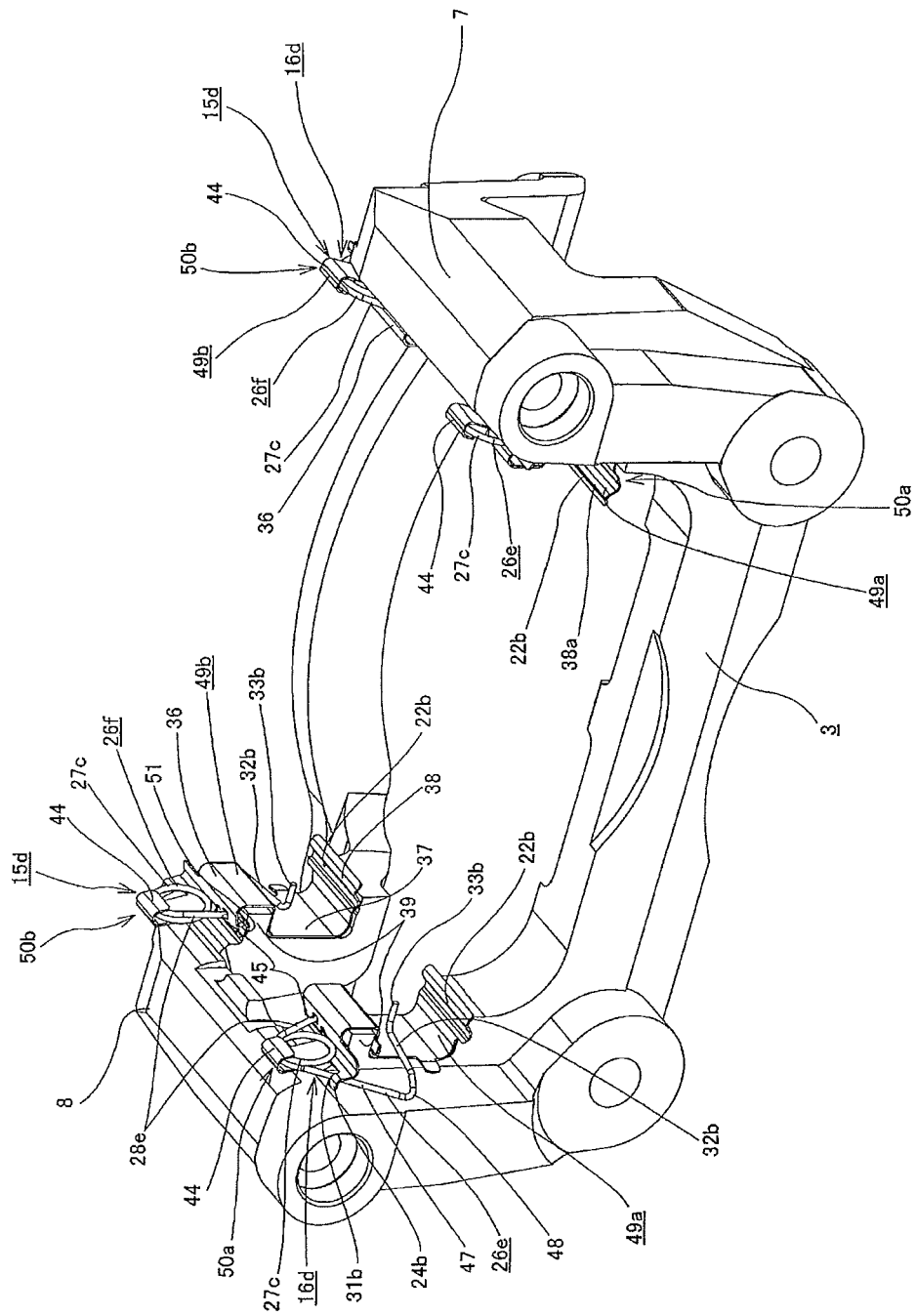
FIG. 24 is a perspective view showing a floating disc brake according to a fifth embodiment of the invention before a pad is mounted, which is seen from an outer diameter side and an inner side.
Figure 25:
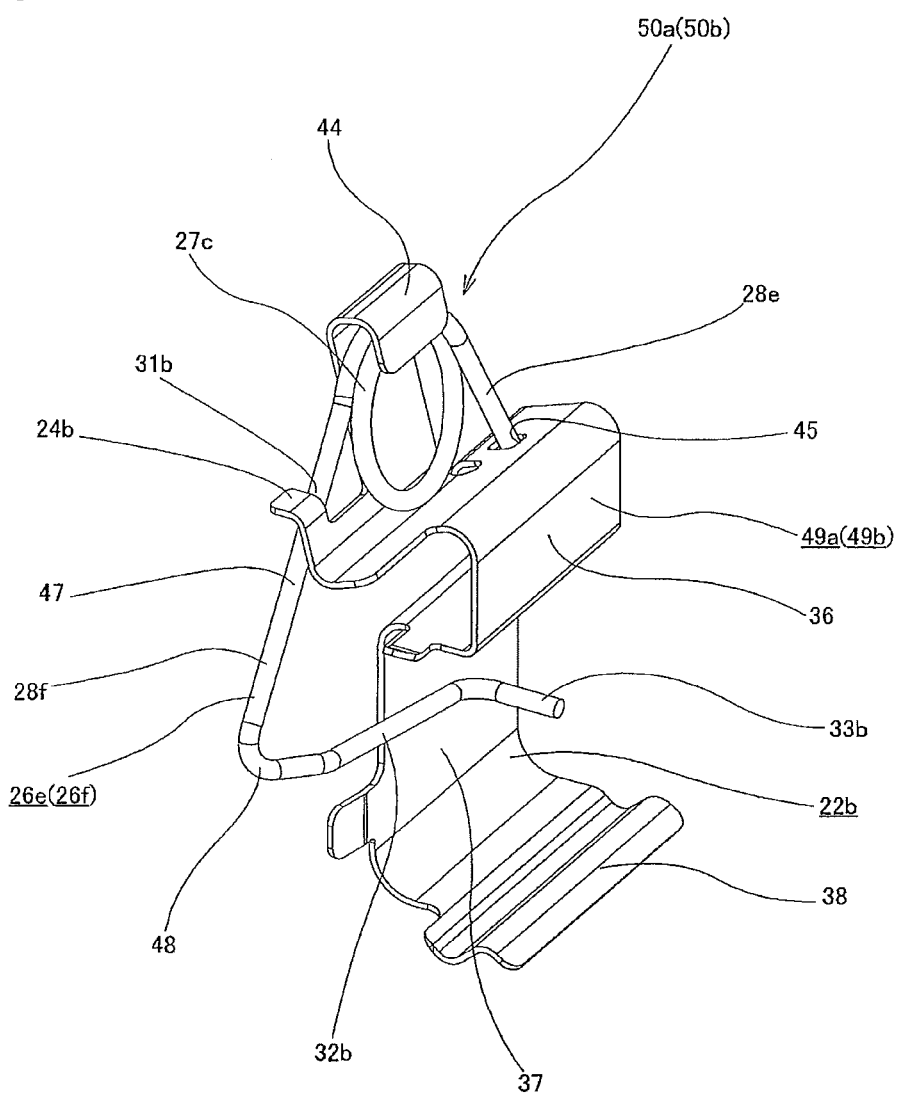
FIG. 25 is a perspective view showing a state (assembly) where one spring element configuring a return spring is mounted to one clip element configuring a pad clip shown in FIG. 24.
Figure 26B:
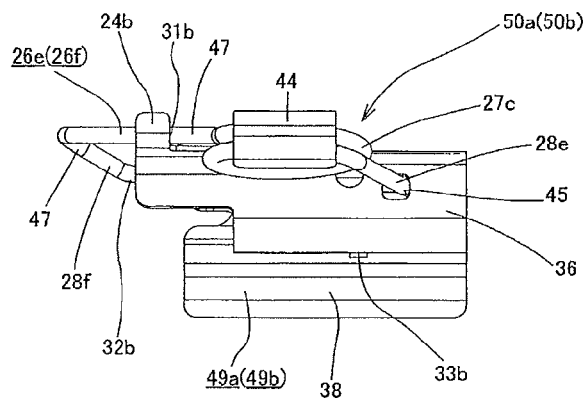
Figure 26A:
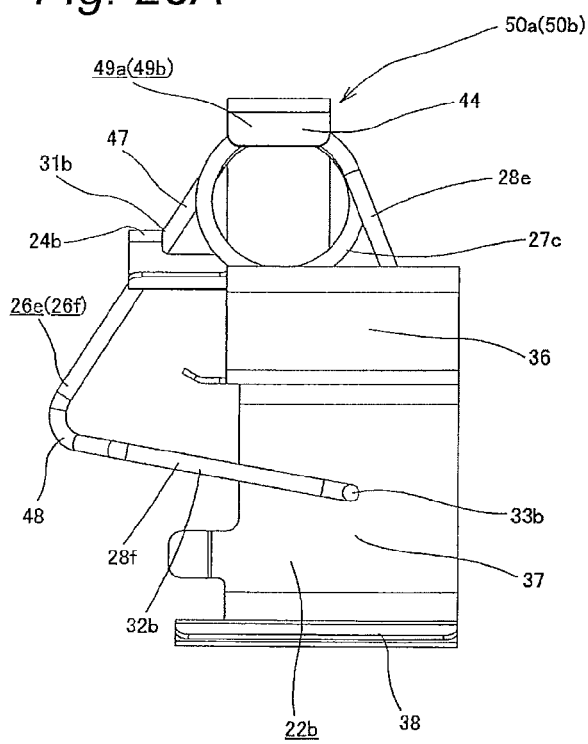
Figure 26C:
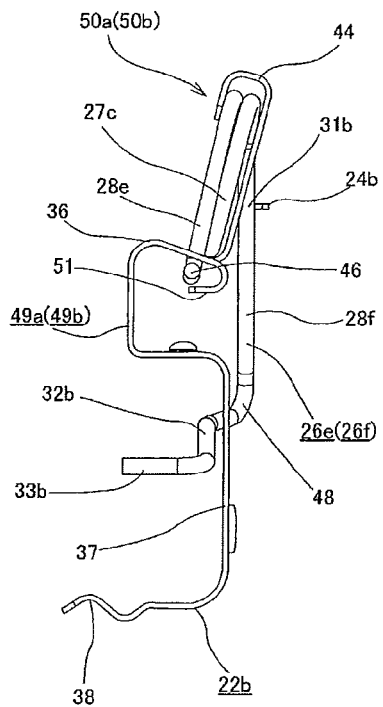

FIGS. 24 to 26 show a fifth embodiment of the invention. The features of the fifth embodiment relate to the shape of the pad clip 15c of the fourth embodiment. That is, a pad clip 15d of the fifth embodiment has a shape in which the connection section 23b is omitted from the pad clip 15c of the fourth embodiment and is configured by an inner clip element 49a and an outer clip element 49b, which are separate elements and have the leg sections 22b, 22b, respectively.

In the fifth embodiment having the pad clip 15d, when assembling the floating disc brake, as shown in FIGS. 25 and 26, the inner spring element 26e and the outer spring element 26f configuring the return spring 16d are mounted (preset) to the inner clip element 49a and the outer clip element 49b, respectively. That is, an assembly of the pad clip 15d (inner clip element 49a and outer clip element 49b) and the return spring 16d (inner spring element 26e and outer spring element 26f) is configured. Then, as shown in FIG. 24, an inner assembly 50a configured by the inner clip element 49a and the inner spring element 26e and an outer assembly 50b configured by the outer clip element 49b and the outer spring element 26f are mounted to the support 3 separately (or at the same time).

In the fifth embodiment having the above configuration, like the fourth embodiment, it is possible to make the pad clip 15d (inner and outer clip elements 49a, 49b) smaller/lighter, compared to the configuration where the pad clip 15c is integrally formed. Therefore, it is possible to improve the handling property of each pad clip 15d, thereby improving the mounting operability of the respective pad clips 15d. Also, it is possible to reduce the material cost for forming the respective pad clips 15d.

The other configurations and operational effects are the same as those of the first and fourth embodiments.

Sixth Embodiment

FIGS. 27 to 37 show a sixth embodiment of the invention. Also in the sixth embodiment, a pair of return springs 16d, 16e that is provided at the rotation input side and the rotation output side is respectively configured by an inner spring element 26g and an outer spring element 26h. Also, each of a pair of leg sections 22c, 22c, which is provided to each of a pair of pad clips 15e, 15 mounted to the rotation input side and the rotation output side of the support 3, is provided at a diametrically central portion thereof with a positioning step section 36a, 36a having a substantially U-shaped section and circumferentially protruding toward each of the inner and outer pads 9a, 9b. The positioning step sections 36a, 36a are elastically fitted to outer sides of protrusion sections 39a, 39a formed at both circumferential end portions of an inner surface of a maintaining section that is provided to the support 3, with a diametrically outer side thereof being opened, so as to maintain parts of the support 3, i.e., the respective pads 9a, 9b. The protrusion sections 39a, 39a are held from both diametrical sides thereof by the respective positioning step sections 36a, 36a, so that the respective pad clips 15e, 15e are diametrically positioned.

Particularly, in the structure of the sixth embodiment, the respective protrusion sections 39a, 39a are held over the entire width thereof by the respective positioning step sections 36a, 36a. That is, in the fourth and fifth embodiments, the positioning step section 36 holds the protruding section 39 (refer to FIG. 24) by a pressing piece 51 (refer to FIGS. 24 and 26C) folded over only a part of the positioning step section 36 in the width direction. Thus, it may not be said that the support rigidity of the respective pad clips 15c, 15d to the support 3 is sufficient. Particularly, in the fifth embodiment shown in FIGS. 24 to 26, when the pad clip is divided into the inner and outer clip elements 49a, 49b, the rigidity of the inner and outer spring elements 26e, 26f (refer to FIGS. 19 to 26) may be insufficient in the applying direction of the elastic urging force of the respective spring elements 26e, 26f. However, in the sixth embodiment, since the respective positioning step sections 36a, 36a holds the respective protrusion sections 39a, 39a over the entire width (the respective sections 36a, 36a contact over the entire width in the width direction with the sufficient high surface pressure), it is possible to sufficiently secure the rigidity.

Also, in the sixth embodiment, a protruding amount of each of the positioning step sections 36a, 36a in the circumferential direction is made to be larger than that of each of the protrusion sections 39a, 39a, so that a gap 52 (refer to FIG. 35) is formed between an inner surface of the leading end portion of each positioning step section 36a, 36a and a leading end surface of each protrusion section 39a, 39a. Engaging sections 46a, 46a, which are provided at one end portions of the inner spring element 26g and the outer spring element 26h configuring both the return springs 16e, 16e, are inserted into engaging holes 45a, 45a that are formed at the leading end portions of the respective positioning step sections 36a, 36a, which leading end portions are formed at parts more protruding the leading end surfaces of the respective protrusion sections 39a, 39a.

Figure 34:
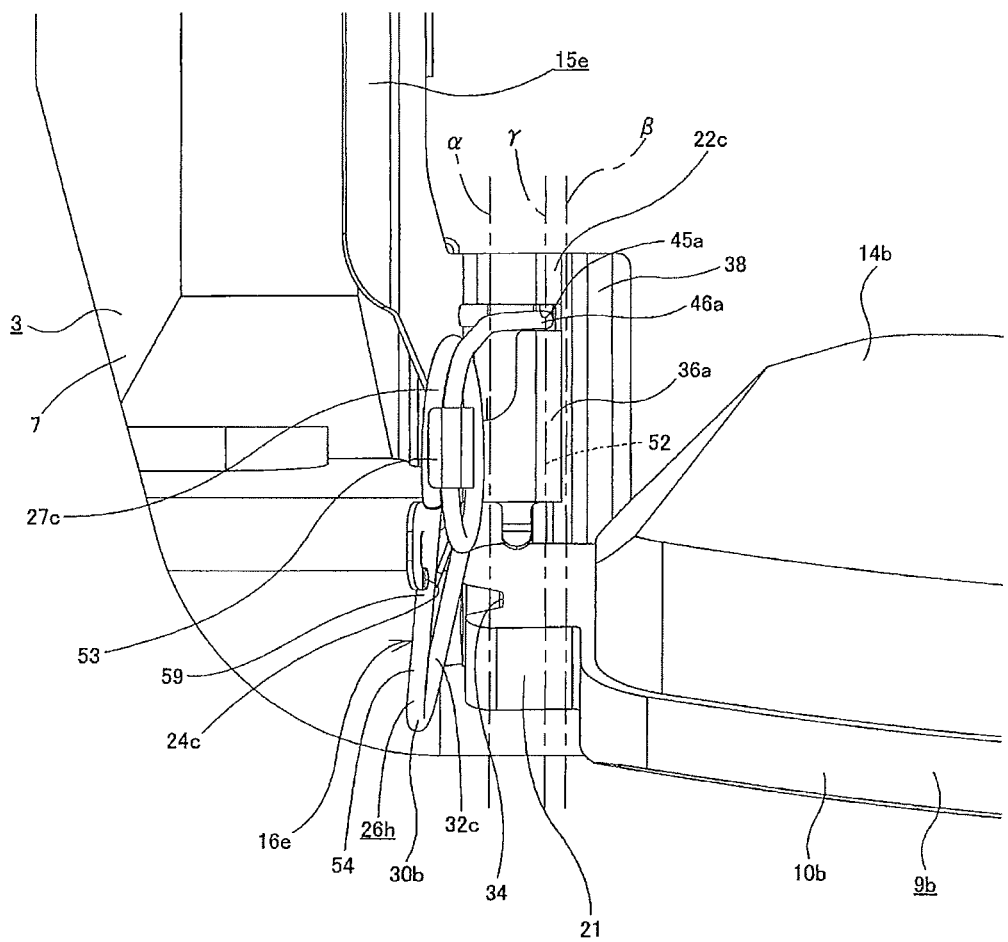
FIG. 34 is an orthographic view showing a state where the pad is mounted to the support to which the pad clip and the return spring shown in FIG. 27 are mounted, which is seen from a diametrically outer side.
Figure 35:
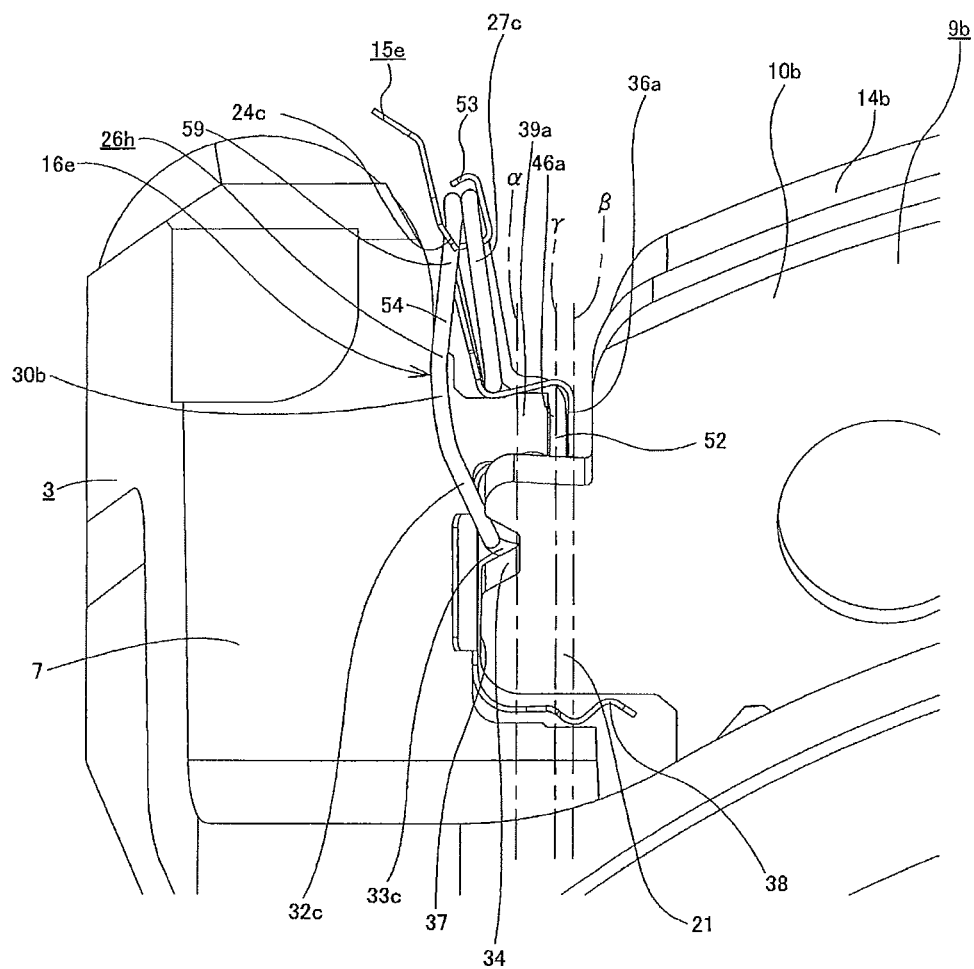
FIG. 35 is an orthographic view showing a state where the pad is mounted to the support to which the pad clip and the return spring shown in FIG. 27 are mounted, which is seen from an outer side.

In the structure of the sixth embodiment, by the above configuration, the mounting positions of the respective engaging sections 46a, 46a are made to come close to the circumferential central portion of the support 3, and in the circumferential direction, positions at which returning sections 33c, 33c provided at the other end portions of the respective spring elements 26g, 26h and the pressure plates 10a, 10b of the inner and outer pads 9a, 9b contact each other and positions of the respective engaging sections 46a, 46a are substantially matched. That is, the respective returning sections 33c, 33c and the respective pressure plates 10a, 10b contact each other within a length range (length range between the dashed-dotted line α and the dashed-dotted line β shown in FIGS. 34 and 35) in the circumferential direction. In the sixth embodiment, the circumferential positions of the respective engaging sections 46a, 46a (the dashed-dotted line γ shown in FIGS. 34 and 35) are within the length range. That is, as shown in FIGS. 34 and 35, the dashed-dotted line γ lies between the dashed-dotted line α and the dashed-dotted line β. Therefore, even when the respective spring elements 26g, 26h are elastically deformed in the direction along which the returning sections 33c, 33c provided at both end portions thereof and the engaging sections 46a, 46a are made to come close to each other, as the respective pads 9a, 9b are mounted to the support 3, the moment of a direction rotating about the diametrical axis of the rotor is not caused in the respective spring elements 26g, 26h. Hence, it is possible to prevent the respective spring elements 26g, 26h from inadvertently separating from the pad clip 15e.

Also, in the sixth embodiment, the direction along which the respective returning sections 33c, 33c press the respective pressure plates 10a, 10a and the direction along which the respective engaging sections 46a, 46a press the pad clips 15e are the substantially axial direction and are the opposite directions each other. Therefore, it is possible to effectively transfer the elastic urging force of the respective spring elements 26g, 26h to both the pads 9a, 9b, as the force separating both the pads 9a, 9b. Thus, even though a thick wire rod, particularly a member having high elastic urging force is not used as the respective spring elements 26g, 26h, it is possible to securely separate both the pads 9a, 9b. Accordingly, it is possible to suppress the processing cost of the respective spring elements 26g, 26h and to facilitate the mounting operation of the respective spring elements 26g, 26h.

Also, in the sixth embodiment, the pad clip 15e is formed at both axial end portions, which are diametrically outer end portions, with folding sections 53, 53 having a substantially U-shaped section, which are opened in the diametrically outer side. The coil sections 27c, 27c configuring the respective spring elements 26g, 26h are latched to the respective folding sections 53, 53 (the folding section 53 is inserted into the coil section 27c). In the sixth embodiment, since the insertion direction of the engaging sections 46a, 46a into the respective engaging holes 45a, 45a and the latching direction of the respective coil sections 27c, 27c to the respective folding sections 53, 53 are the same, it is possible to facilitate the mounting operation of the respective spring elements 26g, 26h. In the meantime, the leading end portions of the respective folding sections 53, 53 are provided with curved sections, so that a width size of an opening end portion of each folding section 53, 53 is made to be smaller than that of each coil section 27c, 27c. Therefore, at a state where the respective coil sections 27c, 27c are latched to the respective folding sections 53, 53, the respective coil sections 27c, 27c are not inadvertently separated from the respective folding sections 53, 53.

Figure 37:
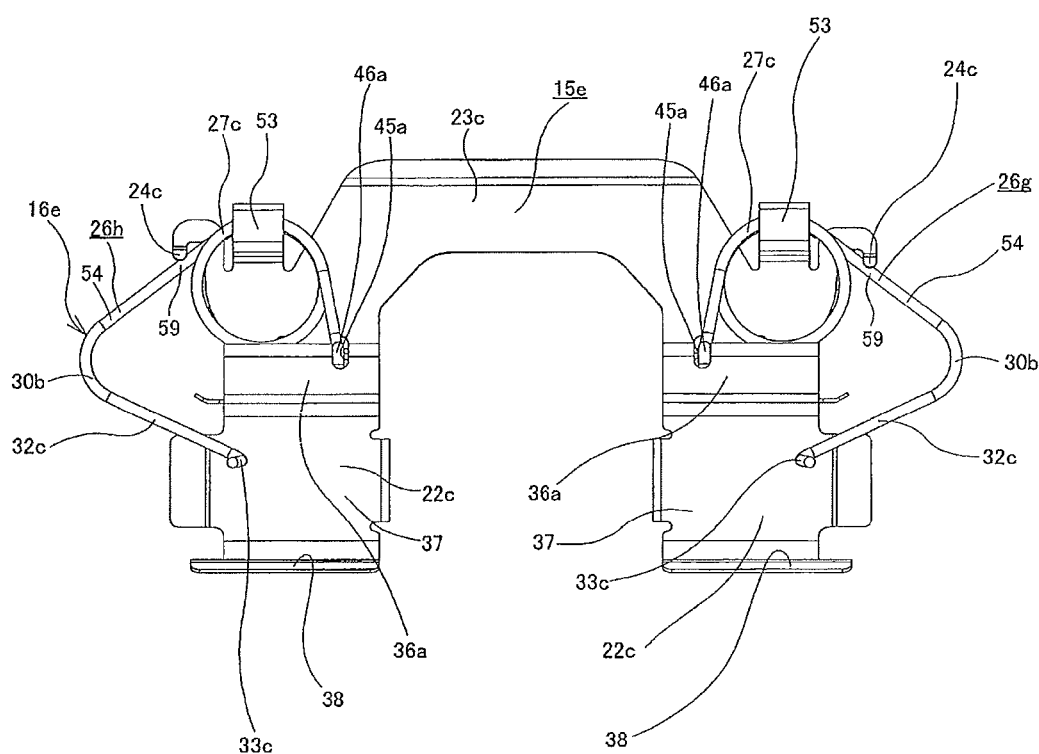
FIG. 37 is a front view showing an assembly of the pad clip and return spring shown in FIG. 27.
Figure 38:
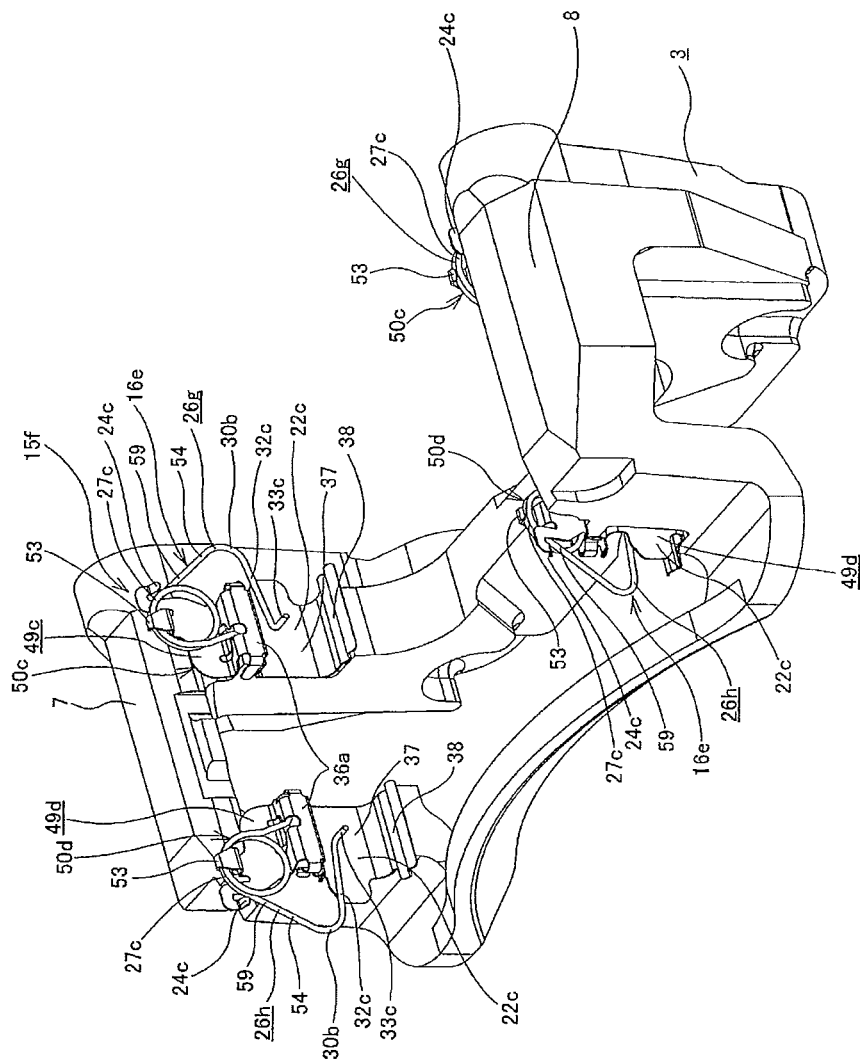
FIG. 38 is a perspective view of a floating disc brake according to a seventh embodiment of the invention, which is seen from an outer diameter side and an outer side with a pad and a caliper being omitted.
Figure 39:
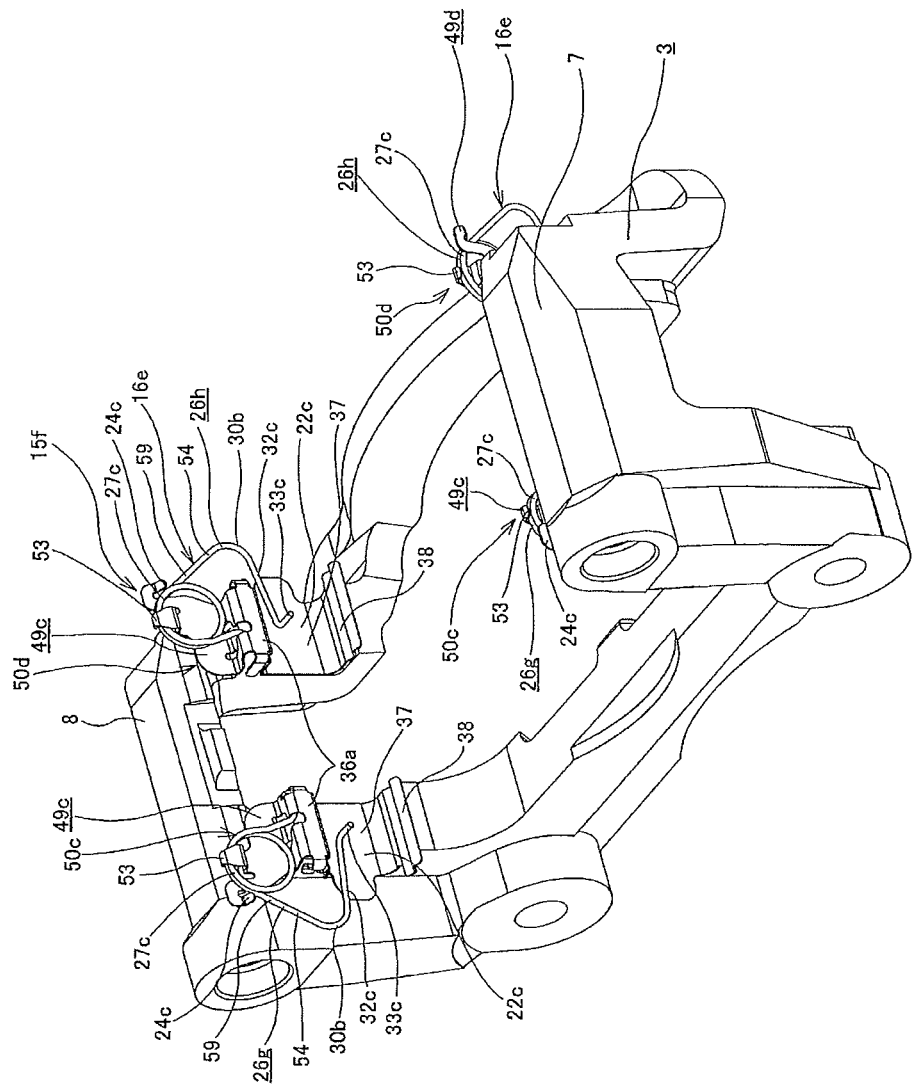
FIG. 39 is a perspective view showing the floating disc brake shown in FIG. 38, which is seen from an outer diameter side and an inner side.
Figure 40:
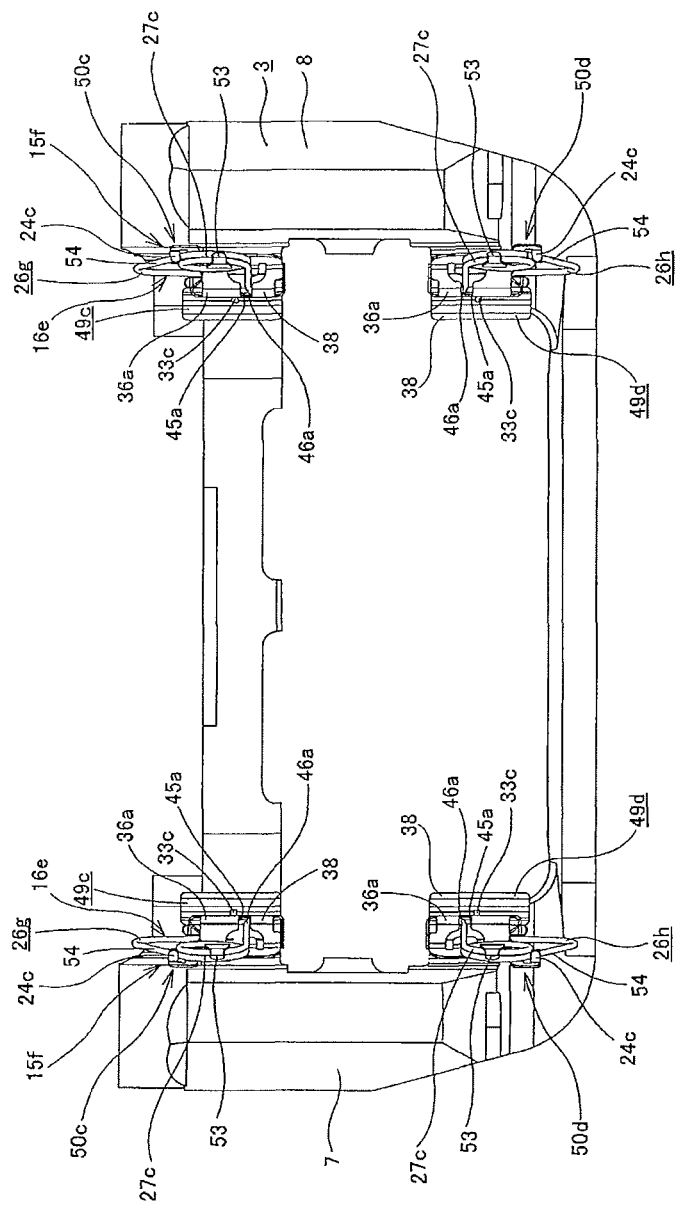
FIG. 40 is an orthographic view showing the floating disc brake shown in FIG. 38, which is seen from an outer diameter side.
Figure 41:
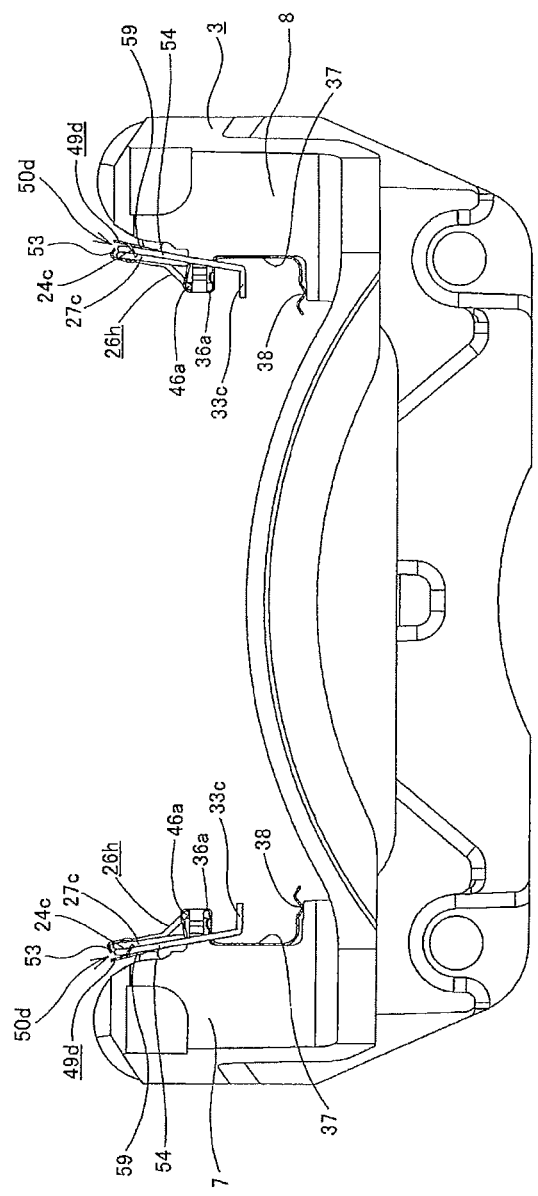
FIG. 41 is an orthographic view showing the floating disc brake shown in FIG. 38, which is seen from an outer side.
Figure 42:
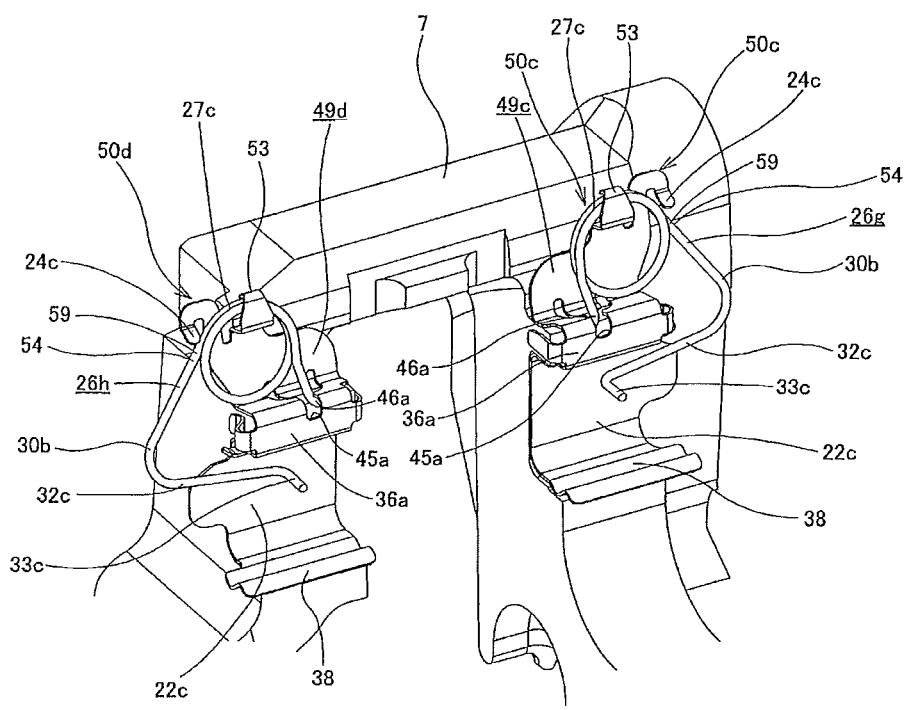
FIG. 42 is a partially enlarged view of FIG. 38.

Also, in the sixth embodiment, the hook-shaped constraining sections 24c, 24c having an opened lower part are provided at both axial end portions of the pad clip 15e, which are diametrically outer end portions (shoulder sections of the pad clip 15e). The leading end portions (diametrically inner half portions, lower parts in FIGS. 30 to 33) of the respective constraining sections 24c, 24c are circumferentially bent in the direction coming close to the pads 9a, 9b. Also, the parts of the respective spring elements 26g, 26h between the respective coil sections 27c, 27c and the respective returning sections 33c, 33c are provided with a base end side linear section 54 having an abutting section 59 at a base end side part thereof, a curved section 30b and an extension arm section 32c in order from the respective coil sections 27c, 27c. As shown in FIG. 37, at a state where the respective return springs 16e (spring elements 26g, 26h) are mounted to the respective pad clips 15e to thus configure the assemblies of the respective pad clips 15e and the respective return springs 16e, the abutting sections 59, 59 of the respective spring elements 26g, 26h are abutted on the respective constraining sections 24c, 24c. Also, at a state before both the pads 9a, 9b are mounted after the pad clips 15e and the respective spring elements 26g, 26h (assemblies of the pad clips 15e and the return springs 16e) are mounted to the support 3, the abutting sections 59, 59 of the respective spring elements 26g, 26h are engaged (abutted) to the respective constraining sections 24c, 24c, as shown with the solid line in FIGS. 31 and 33.

Figure 31:
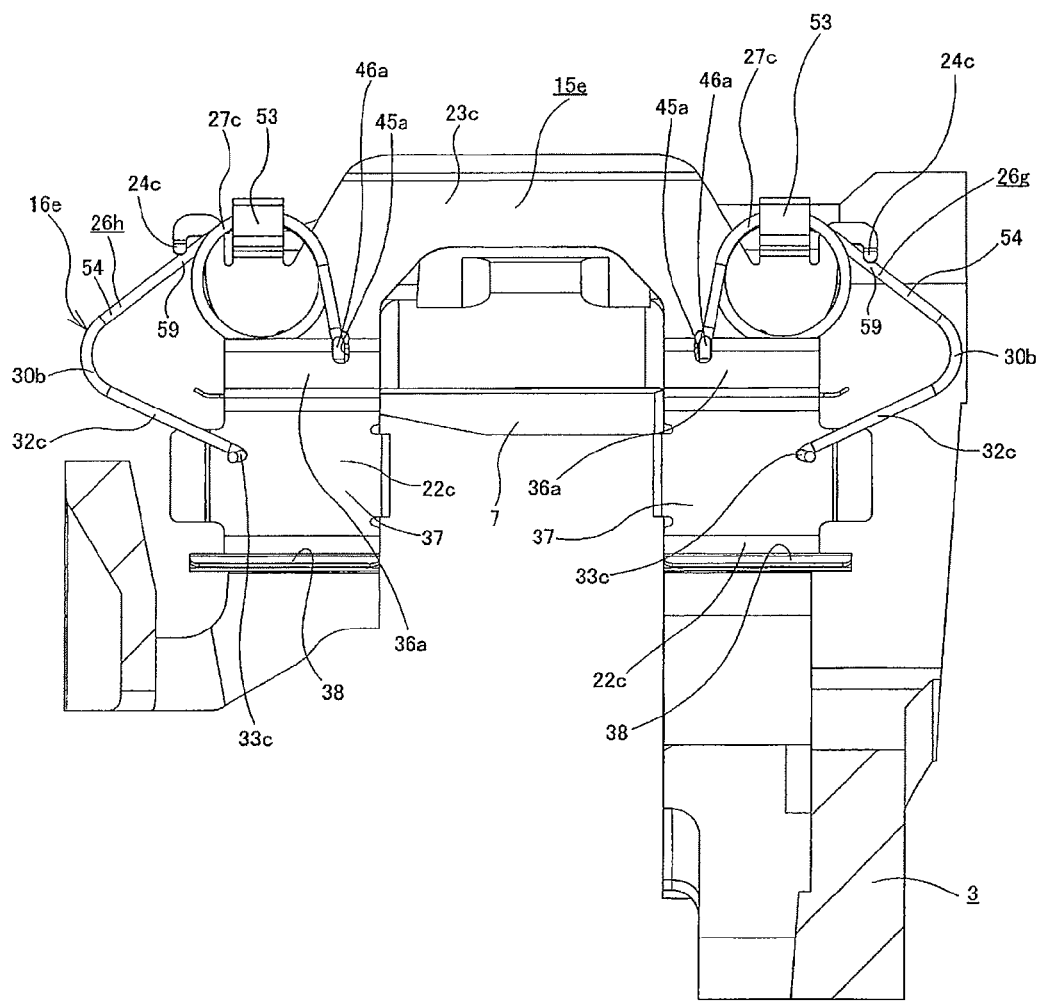
FIG. 31 is a sectional view taken along a line Y-Y of FIG. 29, which shows the return spring of FIG. 29 before it is mounted to a pad.
Figure 36:
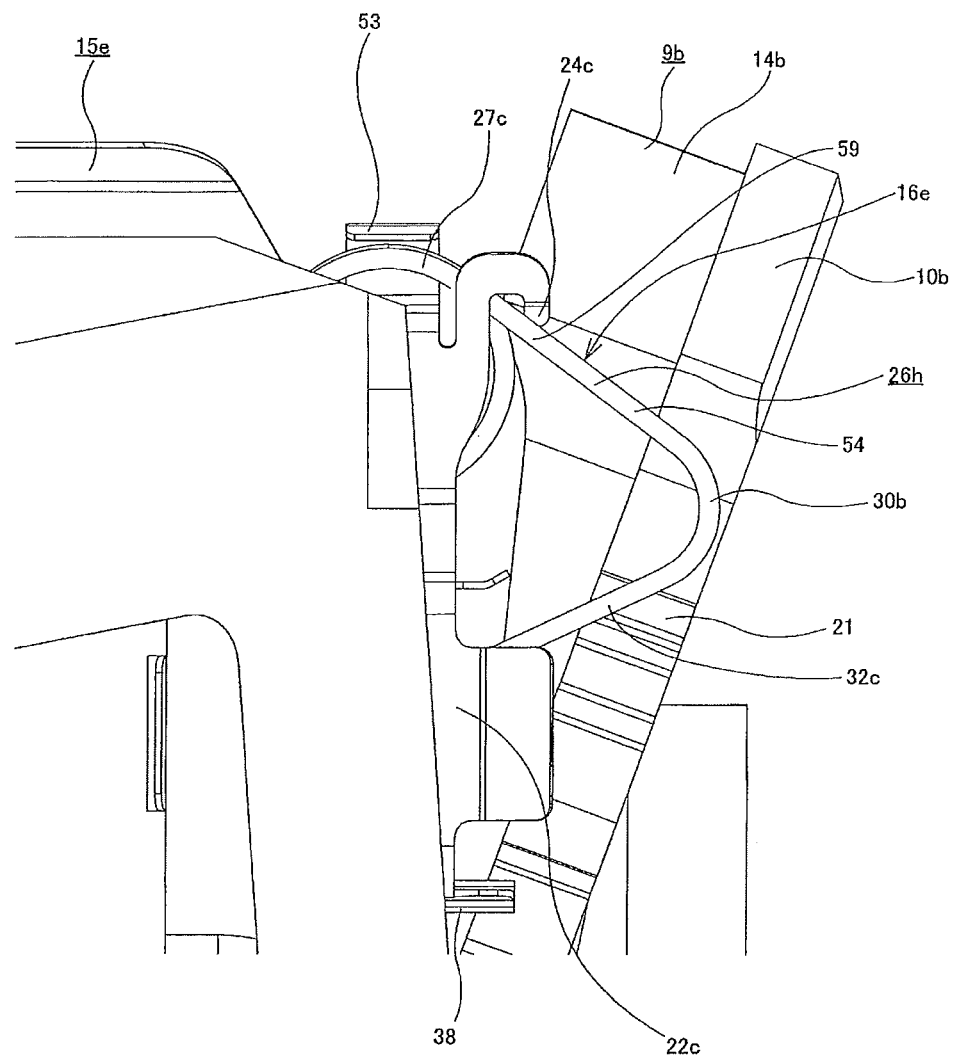
FIG. 36 is an orthographic view showing a state where the pad is mounted to the support shown in FIG. 35, which is seen from a left side.

At a state where the abutting sections 59, 59 are engaged to the respective constraining sections 24c, 24c, the respective constraining sections 24c, 24c prevent the respective returning sections 33c, 33c from displacing in the direction getting away from each other more than the state shown in FIGS. 31 and 37 and both the constraining sections 24c, 24c hold the respective abutting sections 59, 59. The constraining sections prevent parts of the respective spring elements 26g, 26h except for the returning sections 33c, 33c from being inclined to protrude toward the center of the support 3 in the circumferential direction of the rotor. At this state, when axially translating and mounting both the pads 9a, 9b to the support 3, the respective spring elements 26g, 26h do not interfere with each other, so that it is possible to facilitate the mounting operation. In order to mount both the pads 9a, 9b to the support 3, as shown in FIGS. 34 to 36, the bent sections 38 of the pad clip 15e are elastically deformed in a crushing direction by the circumferential end portions (engaging protruding pieces 21) of both the pads 9a, 9b, as shown in FIGS. 34 to 36, and the circumferential end portions are pushed in the torque receiving sections 37 of the pad clip 15e.

Figure 32:
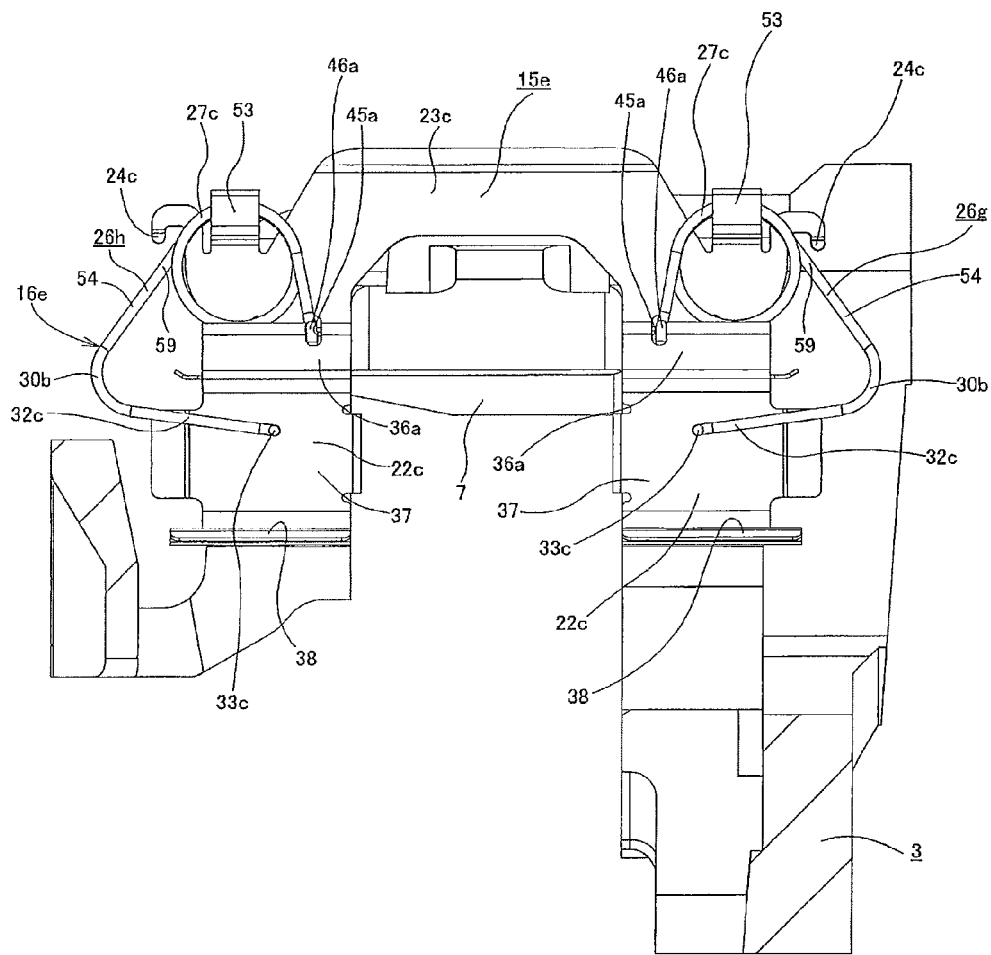
FIG. 32 is a sectional view taken along a line Y-Y of FIG. 29, which shows the return spring of FIG. 29 after the return spring is elastically deformed as it is mounted to the pad.
Figure 33:
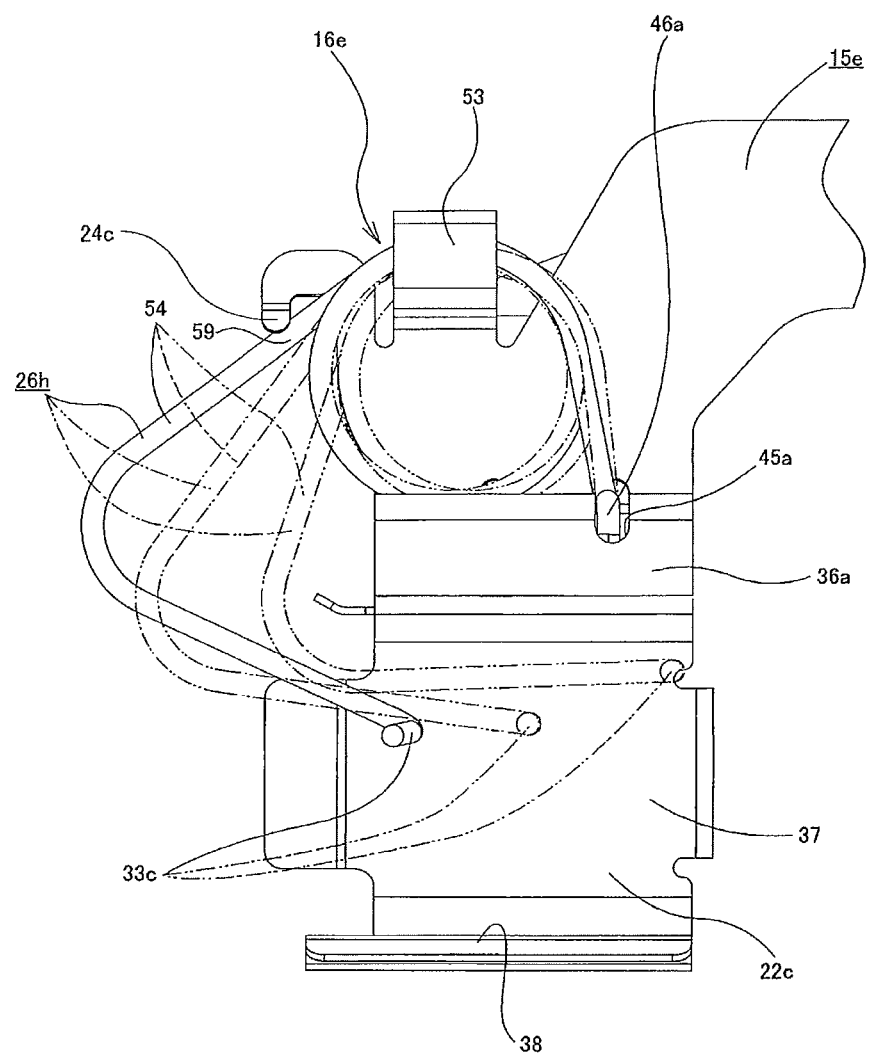
FIG. 33 is a view corresponding to a left side of FIGS. 31 and 32, which shows that the return spring is elastically deformed as it is mounted to the pad.

In correspondence to the pushing-in operation, while both the circumferential end portions of the pressure plate 10a, 10b of both the pads 9a, 9b elastically deform the respective returning sections 33c, 33c from a state shown in FIG. 31 to a state shown in FIG. 32 and from a state shown with the solid line to a state shown with the dashed-two dotted line in FIG. 33, the pads are mounted to the support 3. In the meantime, the shape of the return spring 16e shown in FIGS. 29 and 30 indicates the state where the respective pads 9a, 9b (and caliper 2) are elastically deformed and mounted to the support 3.

The other configurations and operational effects are the same as those of the first embodiment.

Seventh Embodiment

FIGS. 38 to 43 show a seventh embodiment. In the meantime, the shape of the return spring 16e (inner spring element 26g, outer spring element 26h) shown in FIGS. 38 to 43 indicates a state where the pads 9a, 9b (refer to FIGS. 1 to 3, for example) are elastically deformed and mounted to the support 3. In the seventh embodiment, a pad clip 15f is used in which the connection section 23c is omitted from the pad clip 15e of the sixth embodiment. Specifically, the pad clip 15f is configured by an inner clip element 49c and an outer clip element 49d, which have the leg sections 22c, 22c, respectively, and are separate elements.

Figure 43:
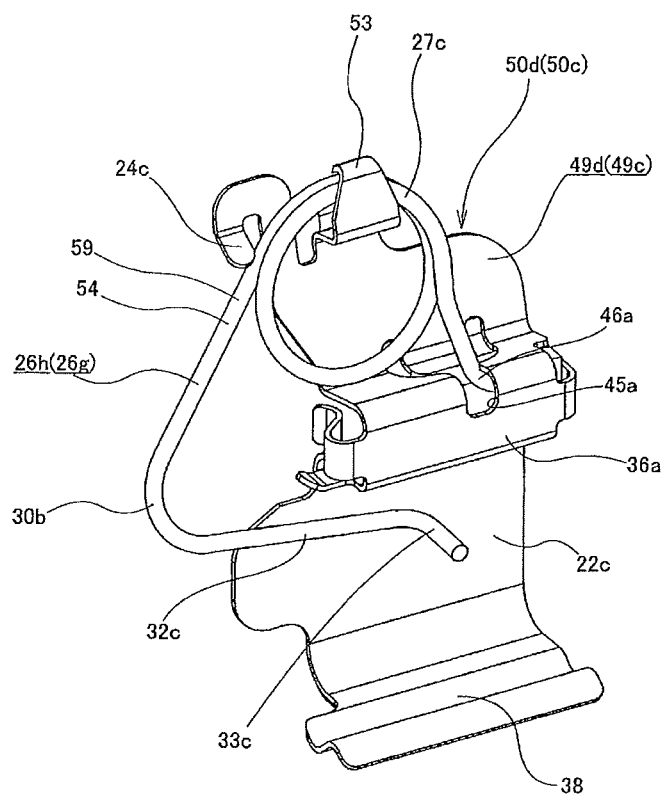
FIG. 43 is a perspective view showing an assembly of the pad clip (element) and return spring (element) shown in FIG. 38.

In the seventh embodiment having the pad clip 15f, at a state before the respective pads 9a, 9b are mounted to the support 3, the inner spring element 26g and the outer spring element 26h configuring the return spring 16e are respectively mounted (preset) to the inner clip element 49c and the outer clip element 49d, as shown in FIG. 43. That is, an assembly of the pad clip 15f (inner clip element 49c and outer clip element 49d) and the return spring 16e (inner spring element 26g and outer spring element 26h) is configured. Then, an inner assembly 50c configured by the inner clip element 49c and the inner spring element 26g and an outer assembly 50d configured by the outer clip element 49d and the outer spring element 26h are mounted to the support 3 separately (or at the same time).

In the seventh embodiment having the above configuration, like the sixth embodiment, it is possible to make the pad clip 15f (inner and outer clip elements 49c, 49d) smaller/lighter, compared to the configuration where the pad clip 15e is integrally formed. Therefore, it is possible to improve the handling property of each pad clip 15f, thereby improving the mounting operability of the respective pad clips 15f. Also, it is possible to reduce the material cost for forming the respective pad clips 15f.

The other configurations and operational effects are the same as those of the first and sixth embodiments.

Eighth Embodiment

FIGS. 44 to 49 show an eighth embodiment. In the meantime, the shape of the return spring 16e (inner spring element 26g, outer spring element 26h) shown in FIGS. 44 to 49 also indicates the state where the pads 9a, 9b (refer to FIGS. 1 to 3, for example) are elastically deformed and mounted to the support 3. In the eighth embodiment, a pad clip 15g is used in which the constraining sections 24c, 24c of the pad clip 15e of the sixth embodiment are replaced with the constraining sections 24, 24 of the pad clip 15a of the first embodiment. That is, the constraining sections 24, 24 of the pad clip 15g of the eighth embodiment are respectively formed by bending a central portion of the torque receiving section toward each of the pads 9a, 9b in the circumferential direction with extending in a direction axially separating from each of the torque receiving sections 37, 37 provided at the inner-diametrically biased parts of the leg sections 22, 22.

Figure 44:
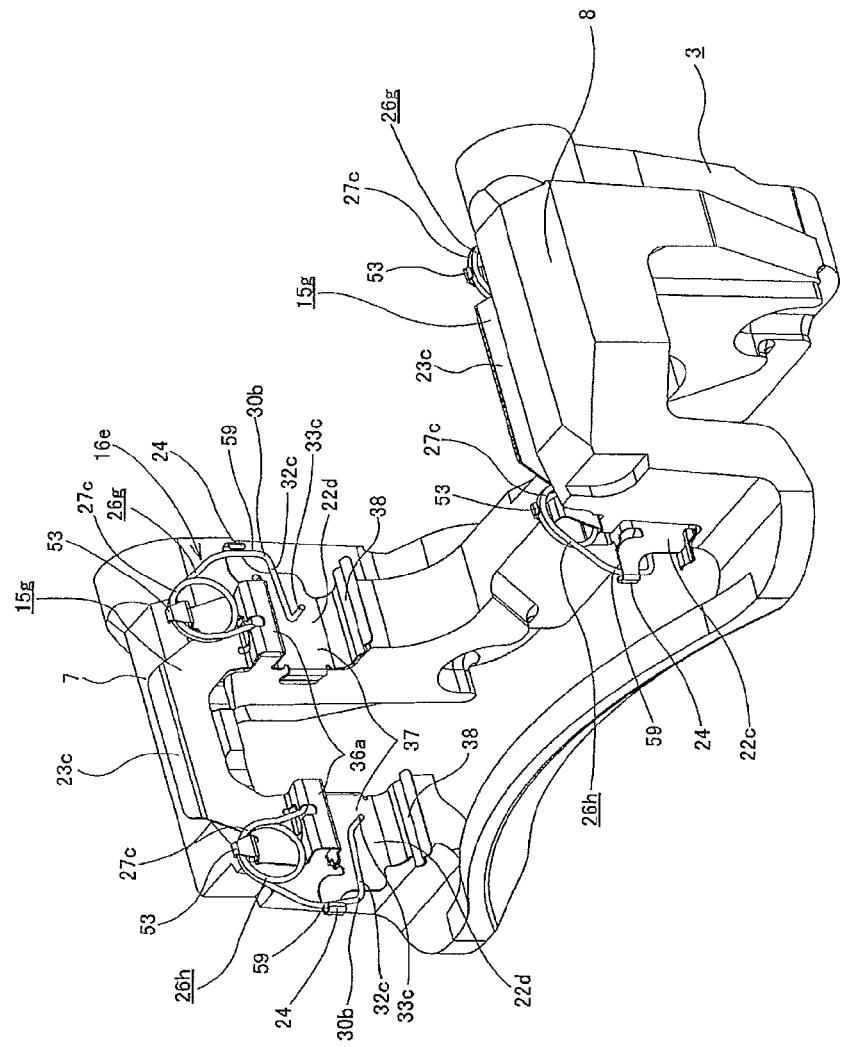
FIG. 44 is a perspective view of a floating disc brake according to an eighth embodiment of the invention, which is seen from an outer diameter side and an outer side with a pad and a caliper being omitted.
Figure 45:
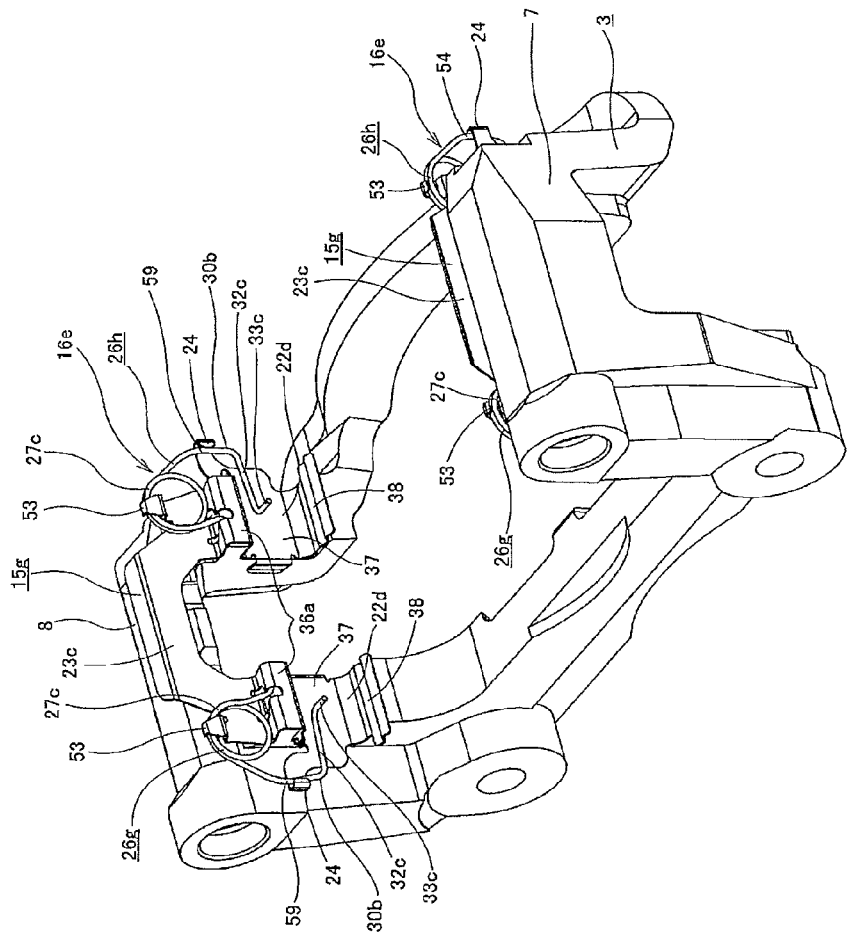
FIG. 45 is a perspective view showing the floating disc brake shown in FIG. 44, which is seen from an outer diameter side and an inner side.
Figure 46:
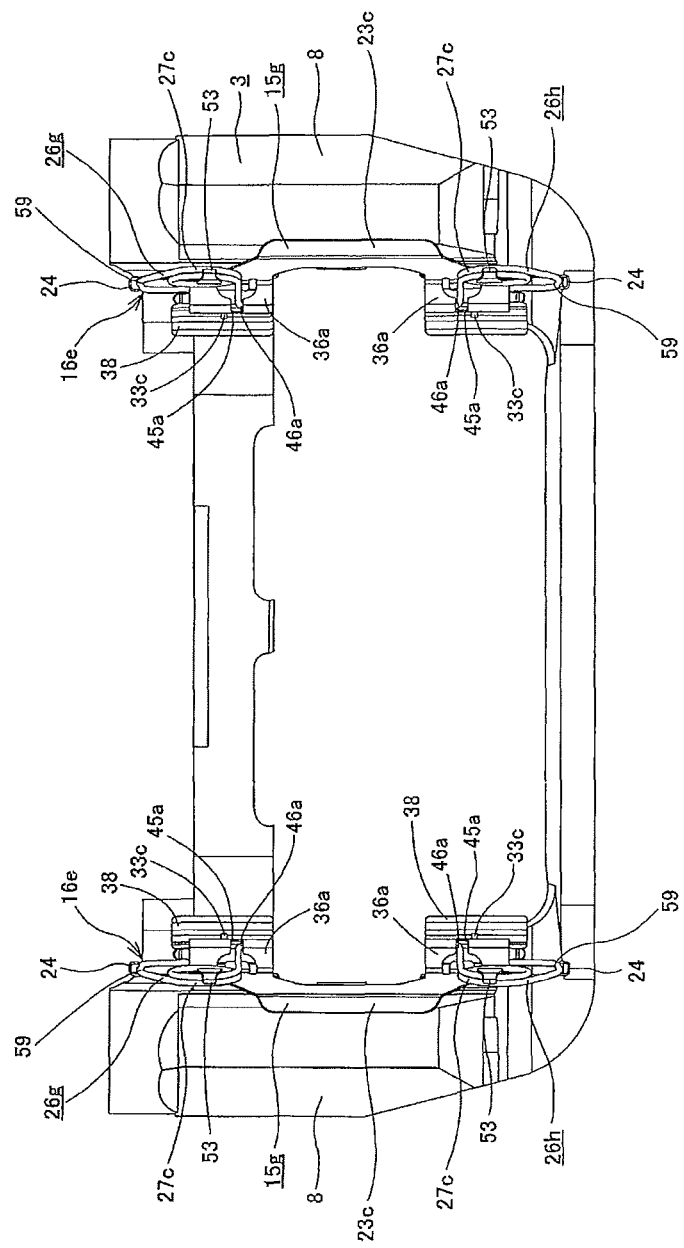
FIG. 46 is an orthographic view showing the floating disc brake shown in FIG. 44, which is seen from an outer diameter side.
Figure 47:
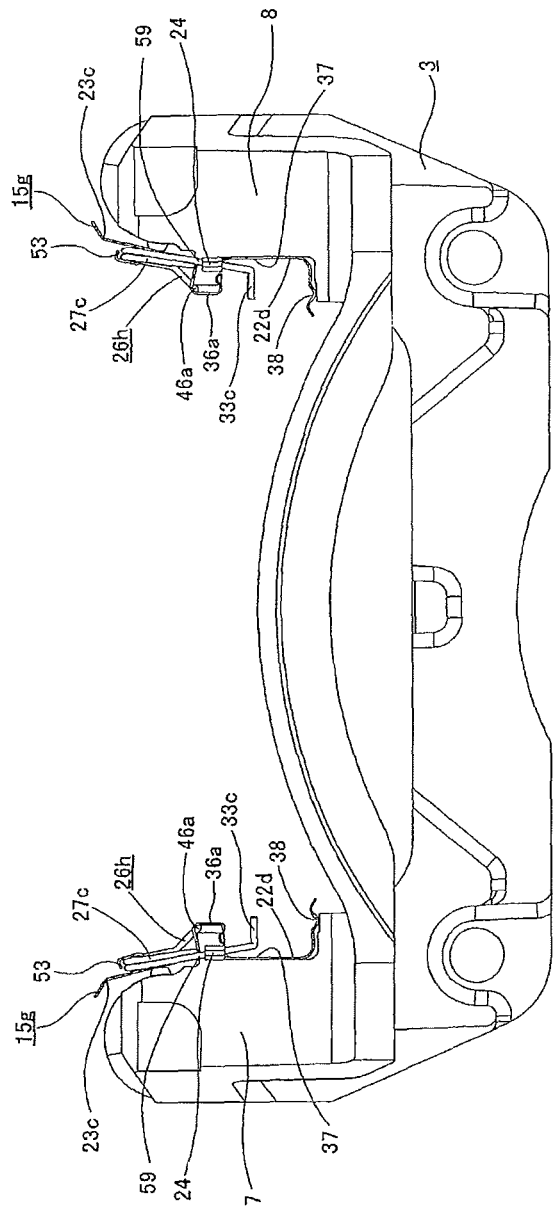
FIG. 47 is an orthographic view showing the floating disc brake shown in FIG. 44, which is seen from an outer side.
Figure 48:
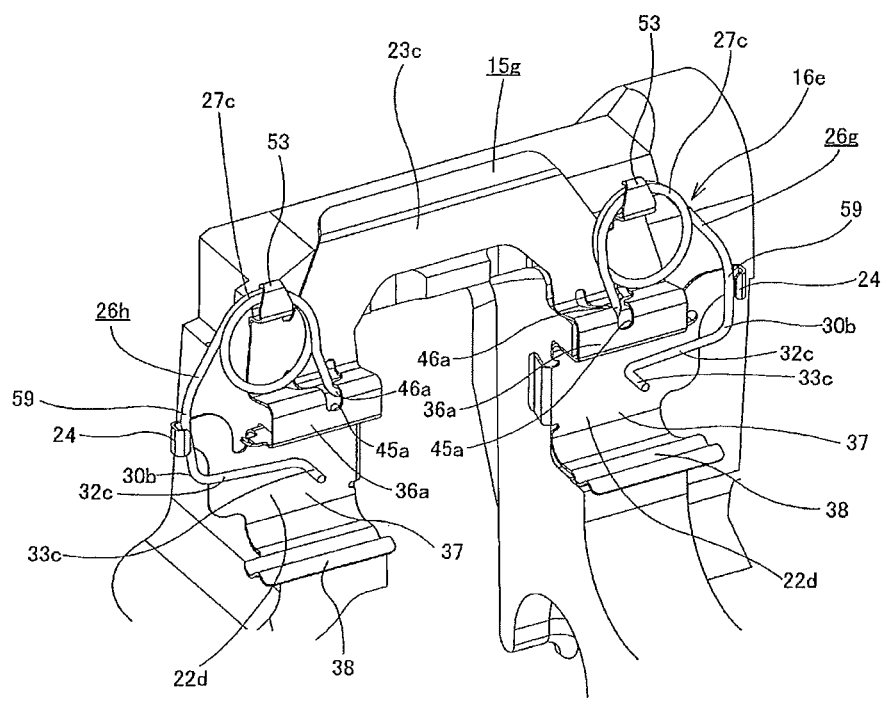
FIG. 48 is a partially enlarged view of FIG. 44.
Figure 49:
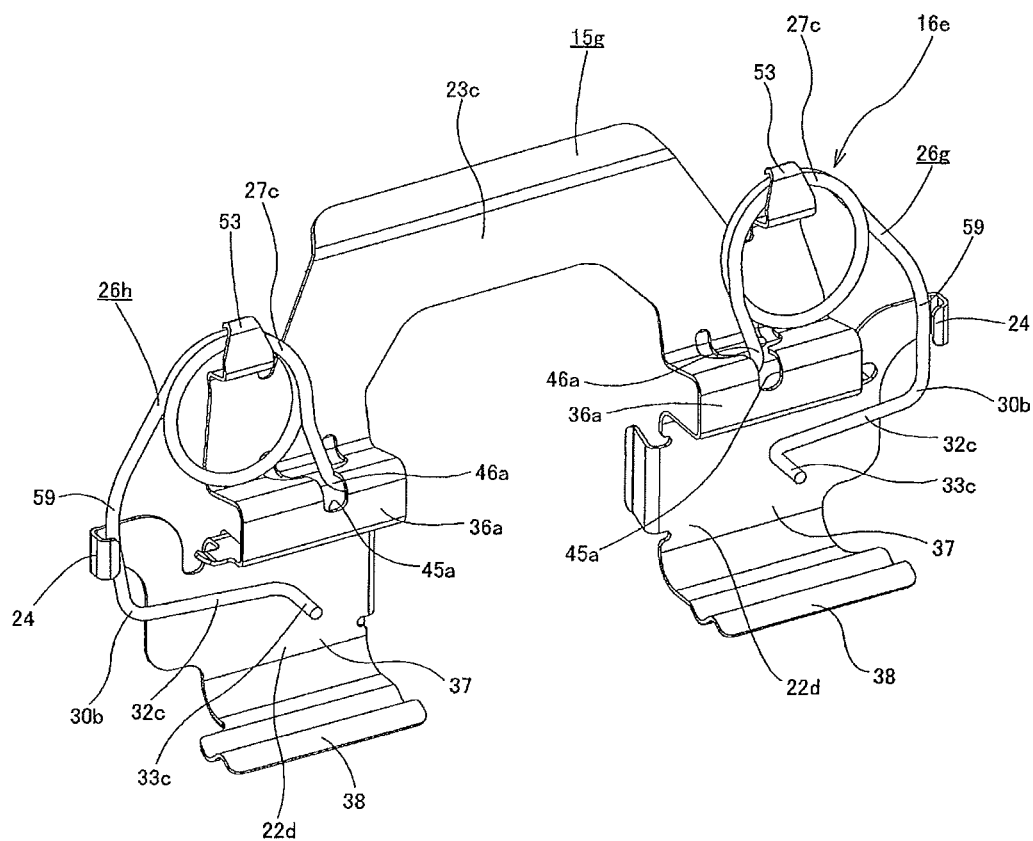
FIG. 49 is a perspective view showing an assembly of the pad clip and return spring shown in FIG. 44.
Figure 50:
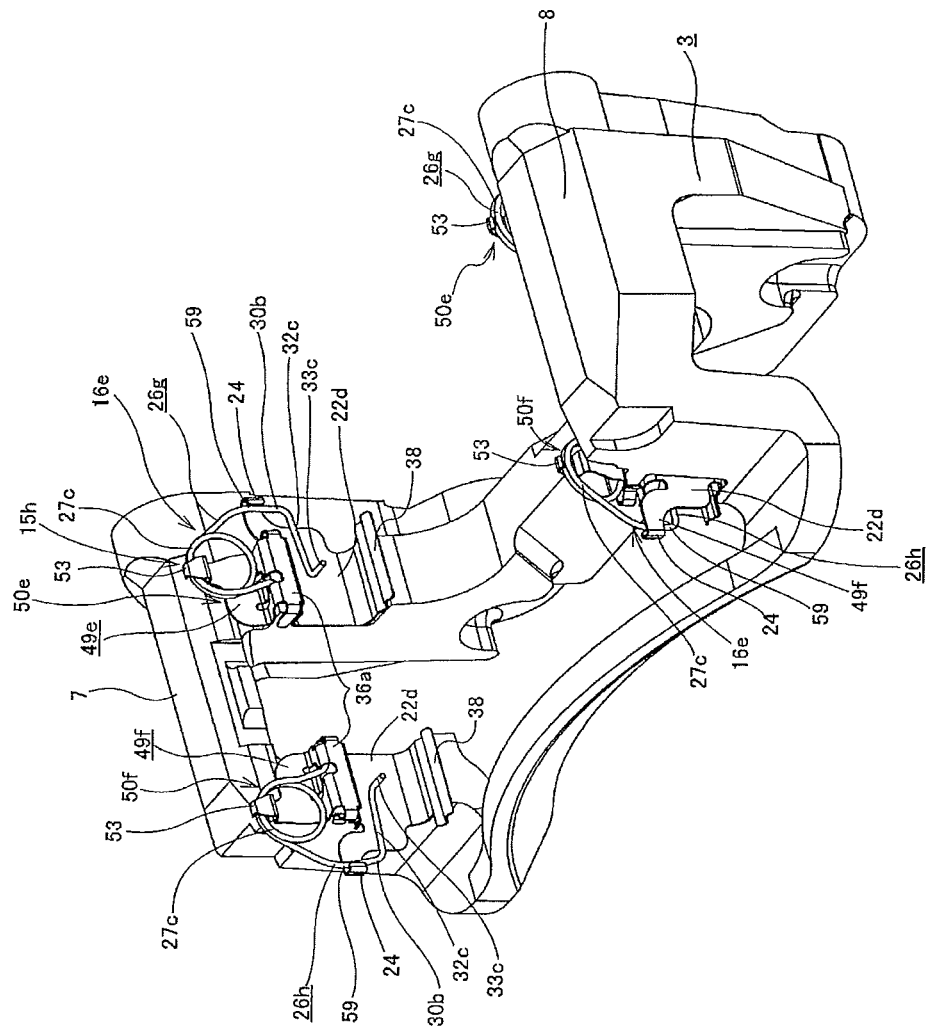
FIG. 50 is a perspective view of a floating disc brake according to a ninth embodiment of the invention, which is seen from an outer diameter side and an outer side with a pad and a caliper being omitted.
Figure 51:
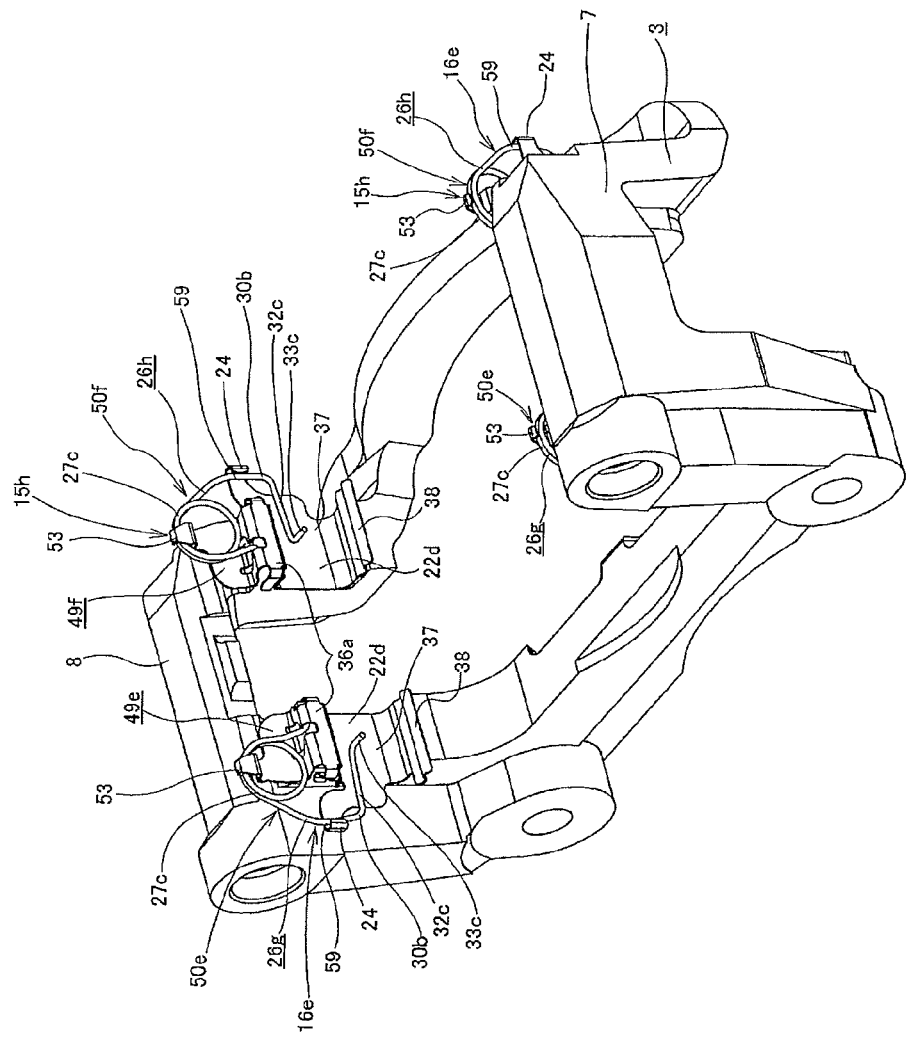
FIG. 51 is a perspective view showing the floating disc brake shown in FIG. 50, which is seen from an outer diameter side and an inner side.
Figure 52:
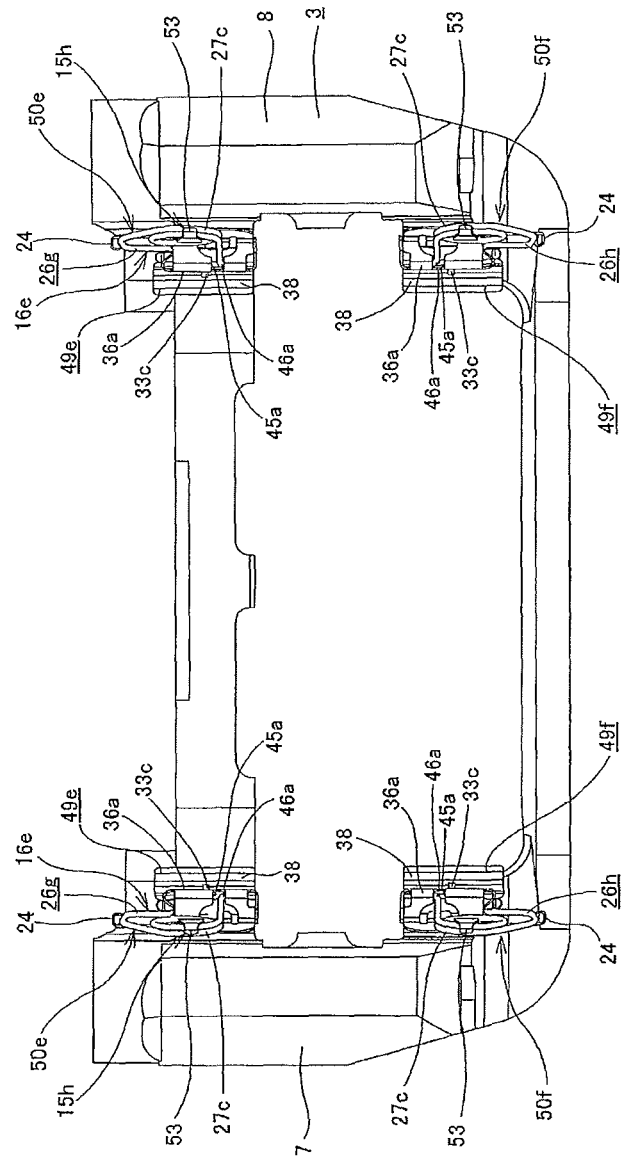
FIG. 52 is an orthographic view showing the floating disc brake shown in FIG. 50, which is seen from an outer diameter side.
Figure 53:
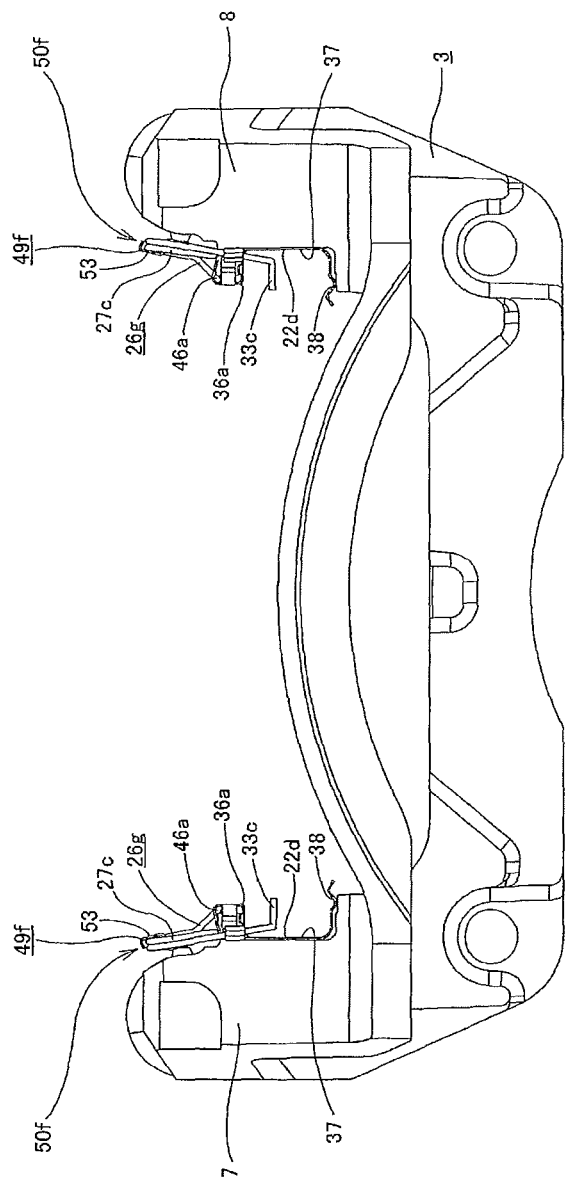
FIG. 53 is an orthographic view showing the floating disc brake shown in FIG. 50, which is seen from an outer side.
Figure 54:
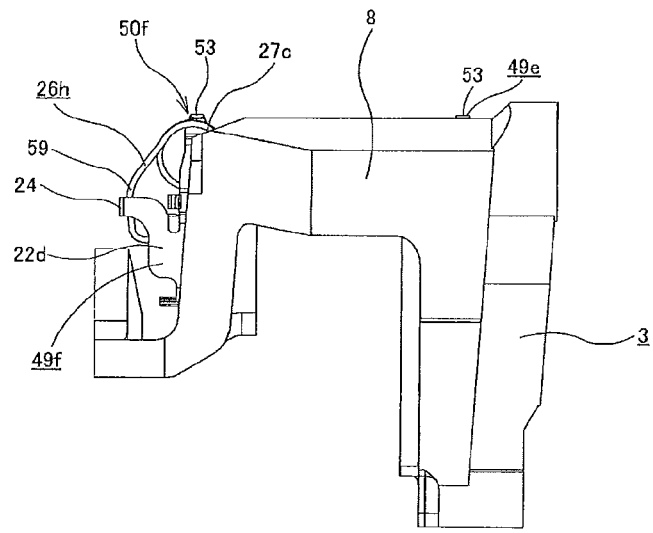
FIG. 54 is an orthographic view showing the floating disc brake shown in FIG. 53, which is seen from a right side.
Figure 55:
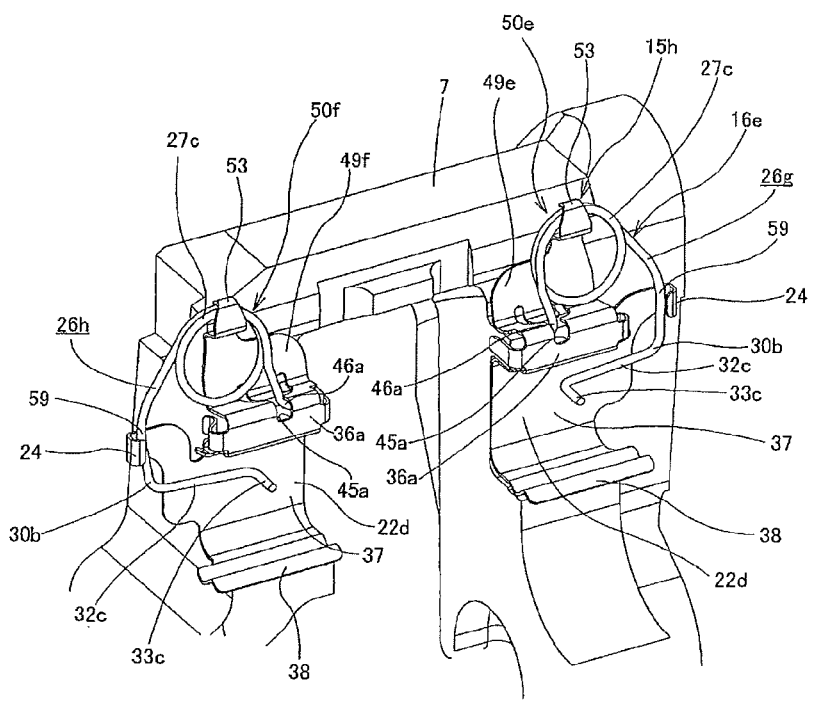
FIG. 55 is a partially enlarged view of FIG. 50.

Also in the eighth embodiment having the pad clip 15g, when assembling the floating disc brake, the inner spring element 26g and the outer spring element 26h configuring the return spring 16e are respectively mounted (preset) to the pad clip 15g, as shown in FIG. 49. That is, an assembly of the pad clip 15g and the return spring 16e (inner spring element 26g and outer spring element 26h) is configured. Then, as shown in FIGS. 44, 45 and the like, the assembly of the pad clip 15g and the return spring 16e is mounted to the support 3.

The other configurations and operational effects are the same as those of the first and sixth embodiments.

Ninth Embodiment

FIGS. 50 to 56 show a ninth embodiment. In the meantime, the shape of the return spring 16e (inner spring element 26g, outer spring element 26h) shown in FIGS. 50 to 56 also indicates the state where the pads 9a, 9b (refer to FIGS. 1 to 3, for example) are elastically deformed and mounted to the support 3. In the ninth embodiment, a pad clip 15h is used in which the connection section 23c is omitted from the pad clip 15g of the eighth embodiment. Specifically, the pad clip 15h is configured by an inner clip element 49e and an outer clip element 49f, which have the leg sections 22d, 22d, respectively, and are separate elements.

Figure 56:
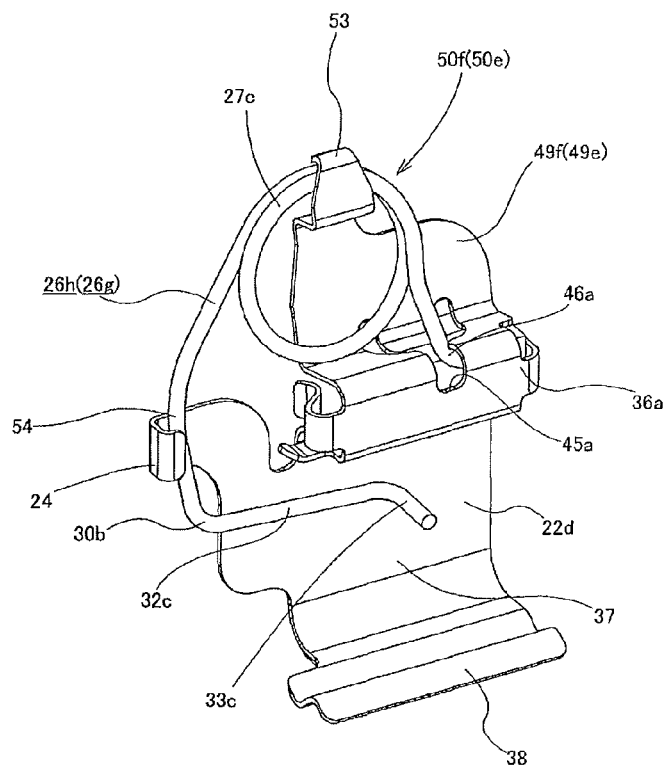
FIG. 56 is a perspective view showing an assembly of the pad clip (element) and return spring (element) shown in FIG. 50.

In the ninth embodiment having the pad clip 15h, at a state before the respective pads 9a, 9b are mounted to the support 3, the inner spring element 26g and the outer spring element 26h configuring the return spring 16e are respectively mounted (preset) to the inner clip element 49e and the outer clip element 49f, as shown in FIG. 56. That is, an assembly of the pad clip 15h (inner clip element 49e and outer clip element 49f) and the return spring 16e (inner spring element 26g and outer spring element 26h) is configured. Then, an inner assembly 50e configured by the inner clip element 49e and the inner spring element 26g and an outer assembly 50f configured by the outer clip element 49f and the outer spring element 26h are mounted to the support 3 separately (or at the same time).

In the ninth embodiment having the above configuration, like the eighth embodiment, it is possible to make the pad clip 15h (inner and outer clip elements 49e, 49f) smaller/lighter, compared to the configuration where the pad clip 15g is integrally formed. Therefore, it is possible to improve the handling property of each pad clip 15h, thereby improving the mounting operability of the respective pad clips 15h. Also, it is possible to reduce the material cost for forming the respective pad clips 15h.

The other configurations and operational effects are the same as those of the first and eighth embodiments.

Although the invention has been specifically described with reference to the specific embodiments, it is obvious to one skilled in the art that a variety of changed and modifications can be made without departing from the spirit and scope of the invention.

This application is based on Japanese Patent Application Nos. 2010-090770 filed on Apr. 9, 2010, 2010-226785 filed on Oct. 6, 2012 and 2011-055045 filed on Mar. 14, 2011, the disclosures of which are incorporated herein by way of reference.

INDUSTRIAL APPLICABILITY

In the respective embodiments, the mounting method of mounting the return spring to the pad clip (the assembly of the pad clip and the return spring is configured) and then mounting the pad clip and the return spring to the support at the same time has been described. However, when implementing the invention, a mounting method of mounting the pad clip unitary body to the support and then mounting the return spring to the pad clip may be also implemented.

In the respective embodiments, the leg sections configuring the pad clip are respectively arranged between the support and the inner and outer pads, and when the braking is released, both the pads are separated from the rotor by using the elastic urging force of the return spring. However, the invention is not limited thereto. That is, the leg section configuring the pad clip may be arranged between the support and only one pad, and only the one pad may be separated from the rotor by using the elastic urging force of the return spring. When such configuration is adopted, only the assembly consisting of the inner clip element (or outer clip element) and the inner spring element (or outer spring element) is mounted to the support. The mounting position of the assembly having the elements can be freely selected, such as inner side, outer side, anchor side and opposite side to the anchor. Also, regarding the assemblies to be mounted at inner side, outer side, anchor side and opposite side to the anchor, it is possible to mount the assemblies having different configurations.

REFERENCE SIGNS LIST

1: rotor
2: caliper
3: support
4: guide pin
5: guide hole
6: boots
7: rotation input side engaging section
8: rotation output side engaging section
9a, 9b: pad
10a, 10b: pressure plate
11: cylinder section
12: claw section
13: piston
14a, 14b: lining
15, 15a to 15h: pad clip
16, 16a to 16e: return spring
17, 17a, 17b: coil section
18: engaging hole
19: protruding piece
20: engaging recess
21: engaging protruding piece
22, 22a, 22b, 22c, 22d: leg section
23, 23a, 23b, 23c: connection section
24, 24a, 24b, 24c: constraining section
25: protruding piece
26a, 26c, 26e, 26g: inner spring element
26b, 26d, 26f, 26h: outer spring element
27, 27a, 27b, 27c: coil section
28a, 28c, 28e: inner arm section
28b, 28d, 28f: outer arm section
29, 29a: engaging section
30, 30a, 30b: curved section
31, 31a, 31b: abutting section
32, 32a, 32b, 32c: extension arm section
33, 33a, 33b, 33c: returning section
34, 34a: recess
35: connection arm section
36, 36a: positioning step section
37: torque receiving section
38: bent section
39, 39a: protrusion section
40, 40a, 40b: deviation preventing section
41: engaging notch
42: outer diameter-side bent section
43: inner diameter-side bent section
44: folding section
45, 45a: engaging hole
46, 46a: engaging section
47: base end portion
48: bent section
49a, 49c, 49e: inner clip element
49b, 49d, 49f: outer clip element
50a, 50c: inner assembly
50b, 50d: outer assembly
51: pressing piece
52: gap
53: folding section
54: based end side linear section 55: coil section
56: return spring
57: anti-rattle spring
58: pressing section
59: abutting section

The invention claimed is:

1. A floating disc brake comprising:
a support, fixed to a vehicle body in a vicinity of a rotor rotating together with wheels;
a pair of pads, arranged at both axial sides of the rotor, moveably guided in an axial direction of the rotor by the support, and having a lining provided on a surface of a pressure plate, respectively;
a caliper, configured to be axially displaced in the axial direction of the rotor in a state where the caliper is supported by the support;
a pad clip, provided between the respective pads and the support, and configured to prevent the respective pads from moving with respect to the support; and
a return spring, pressing the pads in a direction away from the rotor,
wherein at a state before the pad is mounted, a part of the pad clip includes a constraining section receiving an elastic urging force of the return spring to support the return spring with the return spring mounted to the pad clip,
wherein the pad clip is arranged between the support and the pressure plate and has a leg section having the constraining section provided at a part thereof,
wherein the return spring is a bent wire rod and includes an abutting section abutted to the constraining section by an elastic restoring force thereof, a returning section provided at a rotor-side end portion so as to extend toward a side of the rotor, an engaging section engaged to a part of the pad clip and receiving a reactive force due to pressing of the returning section to the pad, and a coil section provided between the returning section and the engaging section and having a central axis substantially oriented in a rotational direction of the rotor, and
wherein the returning section contacts a surface of a part of a circumferential end portion of the pressure plate, the surface facing a side surface of the rotor.

2. The floating disc brake according to claim 1, wherein at least a part of the returning section is positioned on a virtual plane passing through the coil section of virtual planes orthogonal to the central axis of the coil section.

3. The floating disc brake according to claim 1, wherein the coil section and the returning section overlap each other in the axial direction of the rotor.

4. The floating disc brake according to claim 1, wherein a diametrical position of the returning section substantially matches with a friction center of the pad.

5. The floating disc brake according to claim 1, wherein a position at which the returning section contacts the pressure plate and a position of the engaging section substantially match in a circumferential direction of the rotor.

6. The floating disc brake according to claim 1, wherein a direction in which the returning section presses the pressure plate and a direction in which the engaging section presses the pad clip substantially match the axial direction of the rotor and are the opposite directions each other.

7. The floating disc brake according to claim 1, wherein a positioning step section having a substantially U-shaped section and protruding toward the pad in a circumferential direction is provided at a diametrically central portion of the leg section of the pad clip,
wherein the positioning step section is elastically fitted onto an outer side of a protrusion section formed on a part of the support and holds the protrusion section, so as to position the pad clip in a diametrical direction, and
wherein the engaging section of the return spring is engaged into an engaging hole formed at a part of a leading end portion of the positioning step section, the part protruding more than a leading end surface of the protrusion section.

8. The floating disc brake according to claim 1, wherein the constraining section and the abutting section are offset toward an opposite side to the pad in the circumferential direction more than a surface of the pad clip circumferentially facing a circumferential end surface of the pressure plate.

9. The floating disc brake according to claim 1, wherein the constraining section extends from a torque receiving section of the leg section toward an opposite side to the rotor in the axial direction of the rotor, the torque receiving section being provided so as to elastically press a circumferential end portion of the pad in a circumferential direction.

10. The floating disc brake according to claim 1, wherein the constraining section extends from a step section of the leg section toward an opposite side to the rotor in the axial direction of the rotor, the step section being provided so as to be engaged with a part of the support so as to diametrically position the pad clip with respect to the support.

11. The floating disc brake according to claim 1, wherein the pad clip has a pair of leg sections each of which is arranged between the support and each of the pads, and
wherein the return spring has an abutting section, a returning section and a coil section in a pair, respectively.

12. The floating disc brake according to claim 11, wherein both end portions of the pad clip are provided with constraining sections,
wherein at a state where the abutting sections of the return spring are abutted to both the constraining sections, both the constraining sections engage a central portion of the return spring to prevent a part of the return spring except for the returning sections from protruding toward a center of the support in a circumferential direction of the rotor, so as to prevent interference when mounting both the pads to the support.

13. The floating disc brake according to claim 11, wherein the return spring includes an inner spring element and an outer spring element separated to each other, and
wherein each of the inner and outer spring elements is provided with the abutting section, the returning section, the engaging section and the coil section, respectively.

14. The floating disc brake according to claim 11, wherein the pad clip includes an inner clip element and an outer clip element that respectively have the constraining section and are separated to each other.

15. The floating disc brake according to claim 11, wherein the return spring includes an inner spring element and an outer spring element which respectively have a coil section and a pair of arm sections and are separated to each other,
wherein each leg section configuring the pad clip is provided with a step section that is engaged with a part of the support to position the pad clip with respect to the support in a diametrical direction and a folding section that is formed by folding a diametrically central portion of the step portion into a substantial U shape with bent at a substantial right angle from a diametrically outer surface of the step section toward a diametrically outer side,
wherein the abutting section provided to a part of an outer arm section of the arm sections forming the inner and outer spring elements is abutted to each constraining section with an elastic urging force being applied in a direction getting away from the rotor in the axial direction of the rotor, the outer arm section extending from each coil section to an opposite side to the rotor in the axial direction of the rotor, wherein the engaging section, which is provided to a part of an inner arm section extending from each coil section toward the rotor in the axial direction of the rotor, is engaged to a part of the pad clip with an elastic urging force being applied toward the rotor in the axial direction of the rotor, and wherein each coil section is mounted to a part surrounded by the diametrically outer surface of each step portion and each folding section.

16. The floating disc brake according to claim 11, wherein the return spring includes an inner spring element and an outer spring element which respectively have a coil section and a pair of arm sections and are separated to each other, wherein each leg section forming the pad clip is provided with a step section that is engaged with a part of the support to thus position the pad clip with respect to the support in a diametrical direction and a folding section that is formed by folding a diametrically central portion of the step portion into a substantial U shape with bent at a substantial right angle from a diametrically outer surface of the step section toward a diametrically outer side, wherein the abutting section provided to a part of an outer arm section of the arm sections configuring the inner and outer spring elements is abutted to each constraining section with an elastic urging force being applied in a direction getting away from the rotor in the axial direction of the rotor, the outer arm section extending from each coil section to an opposite side to the rotor in the axial direction of the rotor, wherein the engaging section, which is provided to a leading end portion of an inner arm section extending from each coil section toward the rotor in the axial direction of the rotor, is engaged into an engaging hole formed on a diametrically outer surface of each step section, and wherein each coil section is mounted to a part surrounded by the diametrically outer surface of each step portion and each folding section.

17. A method of assembling the floating disc brake according to claim 11, the method comprising:

after elastically deforming the return spring, releasing the elastic deformation to abut the abutting section provided to a part of the return spring to a constraining section of the pad clip by an elastic restoring force of the return spring, after mounting the return spring to the pad clip, mounting the pad clip and the return spring to the support at the same time, and mounting both the pads to the support.

18. An assembly of a pad clip and a return spring, the assembly comprising:

a pad clip having a leg section that is arranged between a support and a pad of a disc brake and a constraining section that is formed at a part of the leg section, and a return spring, being a bent wire rod, and including a coil section, an abutting section provided at a part of an arm section extending from the coil section, and a returning section provided at a leading end portion of the arm section and contacting a part of the pad to press the pad in a direction getting away from the rotor, wherein the coil section is arranged so that a central axis thereof is substantially perpendicular to both opposite surfaces of the leg section, and wherein the abutting section is abutted to the constraining section by an elastic restoring force of the return spring, so that the return spring is supported to the pad clip.

19. A method of assembling a floating disc brake, the method comprising:

preparing: a support, fixed to a vehicle body in a vicinity of a rotor rotating together with wheels; a pair of pads, arranged at both axial sides of the rotor, moveably guided in an axial direction of the rotor by the support, and having a lining provided on a surface of a pressure plate, respectively; and a caliper, configured to be axially displaced in the axial direction of the rotor in a state where the caliper is supported by the support;

deforming a wire rod by bending to form a return sprint;

after elastically deforming the return spring, mounting the return spring to the pad clip, and releasing an elastic deformation of the return spring to abut an abutting section provided to a part of the return spring to a constraining section of the pad clip by an elastic restoring force of the return spring:

after mounting the return spring to the pad clip, mounting the pad clip and the return spring to the support at the same time so that the pad clip is provided between the respective pads and the support; and after mounting the pad clip and the return spring to the support, mounting both the pads to the support so that the return spring presses the pads in a direction away from the rotor, wherein at a state before the pads are mounted to the support, the constraining section receives an elastic urging force of the return spring to support the return spring with respect to the pad clip, wherein the pad clip is arranged between the support and the pressure plate and has a leg section having the constraining section, wherein the return spring includes a returning section provided at a rotor-side end portion so as to extend toward a side of the rotor, an engaging section engaged to a part of the pad clip and receiving a reactive force due to pressing of the returning section to the pad, and a coil section provided between the returning section and the engaging section and having a central axis substantially oriented in a rotational direction of the rotor, and wherein the returning section contacts a surface of a part of a circumferential end portion of the pressure plate, the surface facing a side surface of the rotor.

* * * * *